United States Patent
Doctor et al.

(10) Patent No.: US 12,551,730 B2
(45) Date of Patent: Feb. 17, 2026

(54) SYSTEMS AND METHODS FOR ULTRASOUND NEUROMODULATION OF DESIRED ANATOMICAL TARGETS

(71) Applicant: Surf Therapeutics, Inc., Austin, TX (US)

(72) Inventors: Nishant Doctor, Pflugerville, TX (US); Alexander Sackeim, San Francisco, CA (US); Muhammad Zubair, San Francisco, CA (US); Omar T. Yunis, Memphis, TN (US); Christopher R. Bawiec, San Francisco, CA (US)

(73) Assignee: Surf Therapeutics, Inc., Austin, TX (US)

( * ) Notice: Subject to any disclaimer, the term of this patent is extended or adjusted under 35 U.S.C. 154(b) by 0 days.

(21) Appl. No.: 19/295,127

(22) Filed: Aug. 8, 2025

(65) Prior Publication Data
US 2025/0360345 A1 Nov. 27, 2025

Related U.S. Application Data

(63) Continuation-in-part of application No. PCT/US2024/058199, filed on Dec. 3, 2024.
(Continued)

(51) Int. Cl.
*A61N 7/00* (2006.01)
*B06B 1/06* (2006.01)

(52) U.S. Cl.
CPC .............. *A61N 7/00* (2013.01); *B06B 1/0622* (2013.01); *B06B 1/0651* (2013.01);
(Continued)

(58) Field of Classification Search
CPC ................ A61N 7/00; A61N 2007/006; A61N 2007/0026; A61N 2007/0073; B06B 1/0622; B06B 1/0651; B06B 2201/76
See application file for complete search history.

(56) References Cited

U.S. PATENT DOCUMENTS

| | | |
|---|---|---|
| 8,414,495 B2 | 4/2013 | Halmann et al. |
| 11,596,812 B2 | 3/2023 | Ebbini |

(Continued)

FOREIGN PATENT DOCUMENTS

| | | |
|---|---|---|
| CN | 114533125 A | 5/2022 |
| KR | 102140560 B1 | 8/2020 |

(Continued)

OTHER PUBLICATIONS

"International Application Serial No. PCT/US2024/058199, International Search Report mailed Mar. 7, 2025", 6 pgs.

(Continued)

*Primary Examiner* — Dixomara Vargas
(74) *Attorney, Agent, or Firm* — Schwegman Lundberg & Woessner, P.A.

(57) ABSTRACT

Ultrasound energy therapy devices, systems, and methods for the treatment of a condition via neuromodulation of a nerve in a tissue, such as a spleen or liver. A therapy device having a transducer array configured to transmit ultrasound energy to the spleen or liver for neuromodulation. One or more transducers configured to transmit and receive ultrasound energy to detect the presence of bone or air between the spleen or liver and the therapy device. Detection of an obstruction can be used to guide an operator to adjust the alignment of the therapy device with the skeletal structure of the patient to minimize reflection of the energy transmitted from the transducer array to the spleen or liver.

30 Claims, 26 Drawing Sheets

Related U.S. Application Data

(60) Provisional application No. 63/681,694, filed on Aug. 9, 2024, provisional application No. 63/606,805, filed on Dec. 6, 2023.

(52) U.S. Cl.
CPC .......................... *A61N 2007/0026* (2013.01); *A61N 2007/006* (2013.01); *A61N 2007/0073* (2013.01); *B06B 2201/76* (2013.01)

(56) References Cited

U.S. PATENT DOCUMENTS

| | | | |
|---|---|---|---|
| 11,602,330 | B2 | 3/2023 | El Kaffas |
| 2019/0053784 | A1 | 2/2019 | Beri |
| 2021/0015454 | A1 | 1/2021 | Puleo et al. |
| 2021/0346725 | A1* | 11/2021 | Rousso ................... A61N 7/02 |
| 2023/0011644 | A1* | 1/2023 | Zhao ..................... A61B 6/5282 |
| 2023/0264049 | A1* | 8/2023 | Zachs .................. A61B 8/4209 |
| | | | 600/439 |
| 2023/0330443 | A1* | 10/2023 | Agarwal ............ A61K 41/0033 |

FOREIGN PATENT DOCUMENTS

| | | |
|---|---|---|
| KR | 102541234 B1 | 6/2023 |
| WO | WO-2018071908 A1 | 4/2018 |

OTHER PUBLICATIONS

"International Application Serial No. PCT/US2024/058199, Written Opinion mailed Mar. 7, 2025", 19 pgs.

\* cited by examiner

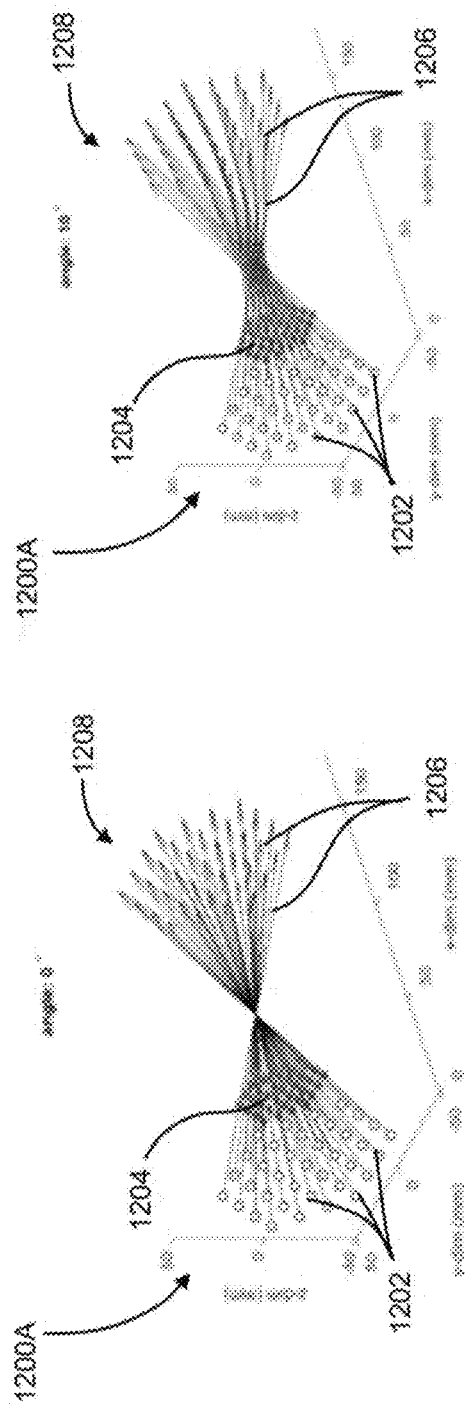
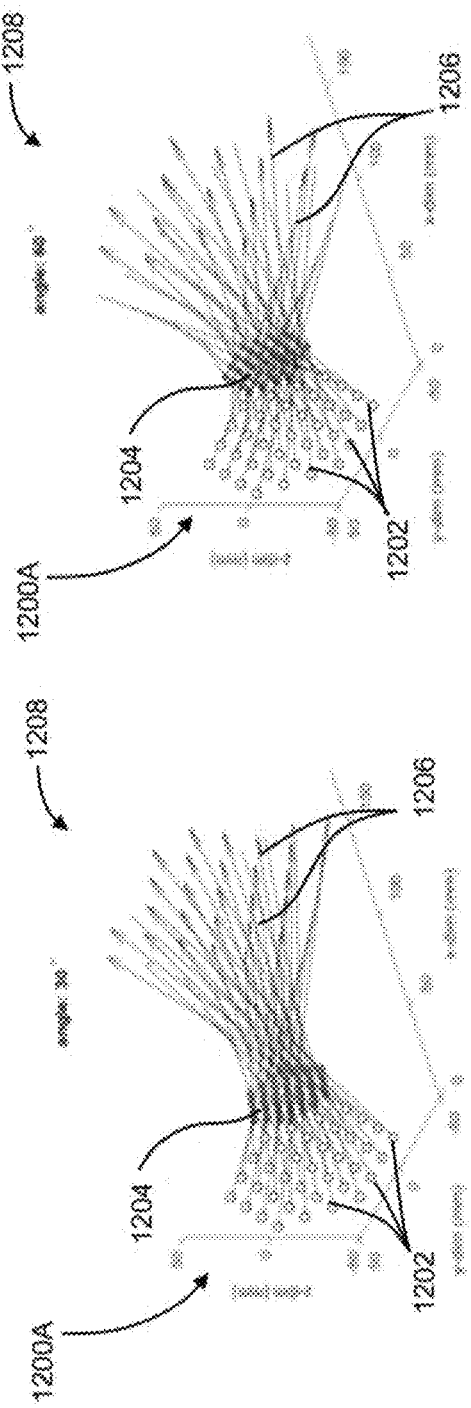
FIG. 12A  FIG. 12B  FIG. 12C  FIG. 12D

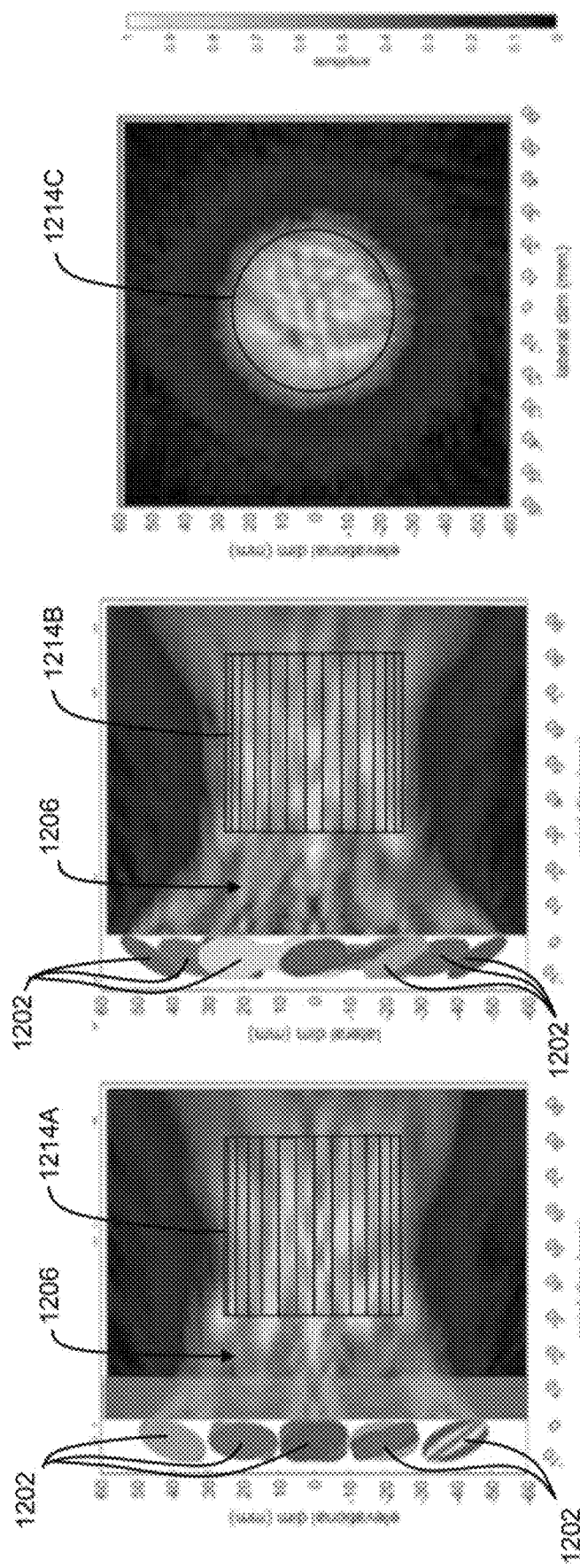

SYSTEMS AND METHODS FOR ULTRASOUND NEUROMODULATION OF DESIRED ANATOMICAL TARGETS

CLAIM OF PRIORITY AND RELATED APPLICATIONS

This application claims benefit of priority of:
(1) U.S. Provisional Application No. 63/681,694 filed Aug. 9, 2024 titled "Systems and Methods For Ultrasound Neuromodulation Of Desired Anatomical Targets"; and
(2) as a continuation-in-part of PCT/US2024/058199 filed Dec. 3, 2024 titled "Systems and Methods For Ultrasound Neuromodulation Of Desired Anatomical Targets," through which priority is also claimed to
(3) U.S. Provisional Application No. 63/606,805 filed Dec. 6, 2023 titled "Systems And Methods For Ultrasound Neuromodulation Through A Rib Cage";
with each of these patent documents hereby incorporated by reference herein in its entirety.

TECHNICAL FIELD

The present disclosure relates to the field of neuromodulation.

BACKGROUND

Medical technology for treatment of systemic inflammatory disorders through modulation of neural activity using electronics to transmit energy, such as ultrasound signals and/or pulses.

SUMMARY

The present disclosure relates to, for example, treating systemic inflammatory disorders through modulation of neural activity using electronics, such as via neuromodulation to parts of the body. Treatment is provided in several embodiments using ultrasound to an organ such as the spleen or the liver, including without limitation devices, systems, kits, and methods for treating a nerve (e.g., including one or more nerves, nerve bundles), such as a splenic nerve or a hepatic nerve.

Several embodiments of systems for neuromodulation, such as ultrasound neuromodulation are provided herein. Advantageously, according to several embodiments, such systems, devices and/or methods include one or more features that, for example, treat tissue (e.g., organ, nerve) in proximity to one or more bones (e.g., ribs, spine). In several embodiments, noninvasive systems, devices and/or methods can be configured for detecting an orientation (e.g., position, location) and/or treating the spleen or the liver through or between bones, such as one or more ribs in a rib cage.

Medical transducers can transmit energy, such as electrical signals and/or pulses, to subdermal tissue to alter and/or modulate nerve activity via neuromodulation in order to treat a condition. Neuromodulation can work by applying electrical signals and/or pulses to a subdermal target site. In some embodiments, a subdermal target site includes a nerve associated with a particular condition (e.g., illness, disease, and/or symptom). In various embodiments, a nerve may include a nerve bundle. The electrical signals can modulate the nerve and can be used to alter the electrical signals passing from the nerve to the brain. Neuromodulation can be applied to any area of the body and can treat numerous conditions (illness, disease, and/or symptoms such as inflammation, rheumatoid arthritis, psoriatic arthritis, ankylosing spondylitis, juvenile idiopathic arthritis, osteoarthritis, gout, fibromyalgia, multiple sclerosis, acute kidney injury, Parkinson's disease, dementia, depression, uveitis, lupus, inflammatory bowel disease, irritable bowel syndrome, colitis, ulcerative colitis, Crohn's Disease, arthrosclerosis, eczema, psoriasis, diabetes, hidradenitis, wound healing, chronic obstructive pulmonary disease, etc.).

Neuromodulation can be effective for a time after a particular treatment. Repeated treatment sessions may be used to treat chronic conditions in several embodiments. Visiting a hospital, clinic, or other healthcare provider for continual out-patient therapeutic sessions can be costly and take significant amounts of time. Accordingly, there is a need to provide for a home-based neuromodulation therapy device that can be operable by the patient or other individual, such as a family member.

Several internal organs are located within and protected by the patient's rib cage. Bone, including the patient's ribs, can absorb ultrasound energy and may hinder or prevent treatment from reaching a target site within the volume of the rib cage. Bone can significantly attenuate an ultrasound signal, which can result in little to no ultrasound penetrating through bone to a target site, such as a spleen or a liver. Bone can heat up quickly when exposed to ultrasound energy, potentially causing pain and soreness to the patient. In several embodiments, ultrasound neuromodulation increases nerve excitation as a desirable outcome. In several embodiments, treatments seek to reduce or prevent heating because heating can have the opposite effect of nerve excitation: excessive heating can instead cause nerve inhibition which can make the desired therapy less effective and may raise safety issues. In several embodiments, avoiding or reducing heating of bone is desirable for an effective treatment. Accordingly, there is a need to provide for a therapy device that can account for the orientation and alignment of therapeutic transducers relative to the patient's skeletal structure (e.g., ribs) and for therapeutic treatment of tissue (e.g., nerves) the patient and/or for the home use operation.

According to several embodiments, the systems and methods described herein are directed towards medical devices, systems, and methods for applying ultrasound energy to a subdermal target site and detecting hard tissue that may interfere with the transmission of ultrasound energy to the subdermal target site. For example, provided herein are several embodiments using ultrasound energy for neuromodulation, including without limitation devices, systems, and methods for treating and/or detecting an organ, such as a spleen or a liver, and/or a nerve, such as a splenic nerve bundle or a hepatic nerve. Several embodiments address systems and methods for ultrasound energy delivery to a spleen or a liver through ribs, and provide ways to avoid bones, such as ribs, while delivering the therapy. The energy delivery device may be operated by a patient at home via a wearable device, and as such, embodiments are provided that reliably place the wearable device such that the ultrasound neuromodulation is not blocked by the ribs and successfully sonicate the region of interest for increased efficacy of treatment and ease of use for the patient. Bone can be a strong reflector of ultrasound and it can be visualized with a variety of ultrasound imaging devices. Bone can also prevent ultrasound from passing into the body efficiently. Accordingly, ultrasound may be less effective for modulating tissue positioned behind bone. In several embodiments, bone detection and/or avoidance may be implemented to aid in the proper location (position, translation, rotation, angle) of the therapy device with respect to the targeted tissue for treatment.

In several embodiments, an ultrasound treatment of a condition in a patient may include one or more of: (i) identifying a location of the organ such as the spleen or the liver in the patient using ultrasound imaging; (ii) marking a surface of the skin over the spleen or the liver and ribs with a multipurpose indicator that adheres to the patient; (iii) attaching the multipurpose indicator to an ultrasound therapy device via a mechanical connector to orient ultrasound energy emitted from the device to the spleen or the liver. In various embodiments, a multipurpose indicator is used for alignment, targeting, and/or activation. In several embodiments, a multipurpose indicator may include a sensor and/or a marker. The ultrasound therapy device may be wrapped around the ribs of the patient using one or more of a variety of devices including, but not limited to: a belt/strap, a harness, a pillow, a chair/sofa, a garment, a wearable patch with an adhesive, and/or a vest; and/or (iv) stimulating the patient's splenic nerve at the spleen or the hepatic nerve at the liver through the patient's ribs at using the ultrasound therapy device.

In various embodiments, the ultrasound from the device stimulates the splenic nerve via mechanical force with low duty cycle for more uniform sonication, such as via a diffuse focus or unstructured focusing (thereby reducing heating, cavitation effects, and ablation). In several embodiments, the device stimulates a nerve bundle. In one embodiment, the device does not stimulate general spleen or general liver cells.

The patient can receive treatment for a treatment period. The treatment period can be a duration of time including one or more treatment sessions daily. In some embodiments, the treatment period can be one or more weeks, one or more months, and/or one or more years.

As described herein, the treatment period can include one or more treatment sessions. Each treatment session can correspond to a distinct treatment event. For example, a treatment session can be a distinct event for modulating or applying energy to a target site for a treatment duration. The treatment period or duration may be between 5 to 30 minutes (e.g., 5, 10, 15, 20, 25, 30 minutes, and any ranges or values therein) per day. For example, the treatment period or duration can be 10 minutes or less. In various embodiments, each treatment session can alternate between an active state and an inactive state. In some embodiments, the active state can include applying one or more pulses of ultrasound energy to a patient (e.g., a pulsing duty cycle). The inactive state can be a state wherein ultrasound energy is not applied to the patient. For example, the active state can have a duration of 10-30 s and the inactive state can have a duration of 20-30 s.

The ultrasound therapy may have a pulsing duty cycle. For example, in various embodiments, the therapy includes a duty cycle with on period in a range of 1 ms-5 ms (e.g., 1, 2, 3, 4, 5 ms and any values and ranges therein) and an off period in range of 4 ms-50 ms (e.g., 4, 5, 6, 7, 8, 9, 10, 12, 15, 20, 25, 30, 35, 40, 45, 50 ms, 5 ms-20 ms, 9 ms-15 ms, 10 ms-30 ms, 15 ms-45 ms, and any values and ranges therein). In some embodiments, the on period can have a duration between 5-150 ms (e.g., 5, 10, 25, 50, 75, 100, 125, 150 ms and values and ranges therein). The pulsing duty cycle may be constant within this range, or possibly modified within the on/off period ranges. In various embodiments, the ultrasound treatment frequency is provided in a range of 100 kHz-500 kHz (e.g., 100, 150, 200, 250, 300, 350, 400, 450, 500 kHz and any values and ranges therein).

The ultrasound treatment frequency may be provided in a frequency sweep in fixed range, such as 100 kHz-2 MHz (e.g., 100, 150, 200, 250, 300, 350, 400, 450, 500, 550, 600, 650, 700, 750, 800, 850, 900, 950 kHz, 1 MHz, 1.2 MHz, 1.4 MHz, 1.5 MHz, 1.6 MHz, 1.8 MHz, 2 MHz, and any values and ranges therein). In some embodiments, the ultrasound treatment frequency of each ultrasound transducer can be in the range between 400 kHz and 800 kHz. For example, each ultrasound transducer can be programmed to output ultrasound energy at an independent frequency in the range between 400 kHz and 800 kHz. Outputting independent frequencies from the ultrasound transducer arrays can result in an unstructured waveform and a broad beam. The unstructured waveform can provide simultaneous stimulation of multiple nerves.

In various embodiments, the ultrasound therapy may have a pulsing duty cycle and/or a pulse train. The pulse train can be a non-sinusoidal waveform that is configured to alternate between a high output and a low output. A period of the pulse train can correspond to a time between a full cycle (e.g., the time to complete a high output and a low output). Each period can further include an "on" period corresponding to a pulse. The "on" period can have a pulse duration corresponding to the duration of only the high output. For example, the pulse duration can correspond to a time interval between a first time corresponding to when the amplitude of the pulse reaches a specified value and a second time corresponding to when the pulse amplitude drops. In various embodiments, the pulse duration or can be long enough for stimulation of the cells with a duty-cycle that enables a cellular refractory period. For example, the pulse duration can be in a range of 10 microseconds ($\mu$s)-500 milliseconds (ms) (e.g., 10, 100 $\mu$s, 1, 10, 100, 200, 300, 400, 500 ms, 10 $\mu$s-100 $\mu$s, 10 $\mu$s-1 ms, 10 $\mu$s-10 ms, 10 $\mu$s-100 ms, 10 $\mu$s-200 ms, 10 $\mu$s-300 ms, 10 $\mu$s-400 ms, 10 $\mu$s-500 ms, and any values and ranges therein). For example, in some embodiments, the pulse duration can be in a range of 100 $\mu$s-100 ms. In some embodiments, the pulse duration can be in a range of 1 ms-5 ms (e.g., 1, 2, 3, 4, 5 ms etc. and any values and ranges therein). In some embodiments, the pulse duration can be in a range of 1 ms-50 ms (e.g., 1, 2, 3, 10, 50 ms etc. and any values and ranges therein). The period between respective pulses (i.e., the duration of the low output) can be in the range of 10 $\mu$s-10 seconds (sec) (e.g., 10, 100 $\mu$s, 1, 10, 100 ms, 1, 10 sec, 10 $\mu$s-100 $\mu$s, 10 $\mu$s-1 ms, 10 $\mu$s-10 ms, 10 $\mu$s-100 ms, 10 $\mu$s-1 sec, 10 $\mu$s-10 sec and any values and ranges therein). In some embodiments, the period between respective pulses can be in the range of 100 $\mu$s-1 sec. In some embodiments, the period between respective pulses can be in the range of 4 ms-50 ms (e.g., 4, 5, 6, 7, 8, 9, 10, 12, 15, 20, 25, 30, 35, 40, 45, 50 ms, 5 ms-20 ms, 9 ms-15 ms, 10 ms-30 ms, 15 ms-45 ms, and any values and ranges therein). In some embodiments, the period between respective pulses can be in the range of 10 ms-500 ms (e.g., 4, 5, 6, 7, 8, 9, 10, 12, 15, 20, 25, 30, 35, 40, 45, 50 ms, 5 ms-20 ms, 9 ms-15 ms, 10 ms-30 ms, 15 ms-45 ms, 45 ms-500 ms and any values and ranges therein). The pulse duration and respective pulses determine the duty cycle of each stimulation burst. A duty cycle ranging from 5%-20% within the range of pulse duration and respective pulses is particularly advantageous from efficacy and safety standpoint. In some embodiments, the duty cycle can range from 5%-15% within the range of pulse duration. This range based on our testing is deemed most advantageous from efficacy standpoint without affecting the thermal limits from safety. The pulse train may be constant within these ranges, or possibly modified within the "on"/"off" period ranges. In various embodiments, the ultrasound treatment frequency is provided in a range of 100 kHz-500 kHz, 500 kHz-1 MHz, and/or 100 kHz-1 MHz (e.g., 100, 150, 200, 250, 300, 350, 400, 450, 500, 550, 600, 650, 700, 750, 800, 850, 900, 950 kHz, 1 MHz and any values and ranges therein). In some embodiments, the ultrasound treatment frequency can be provided in a range of 500 kHz-1 MHz. The ultrasound treatment frequency may be provided in a frequency sweep in fixed range, such as 100 kHz-2 MHz (e.g., 100, 150, 200, 250, 300, 350, 400, 450, 500, 550, 600, 650, 700, 750, 800, 850, 900, 950 kHz, 1 MHz, 1.2 MHz, 1.4 MHz, 1.5 MHz, 1.6 MHz, 1.8 MHz, 2 MHz, and any values and ranges therein). In some embodiments, the fixed range may be 300 kHz-1.5 MHz (e.g., 300, 400, 500, 600, 700, 800, 900, 1000, 1100, 1200, 1300, 1400, 1500 kHz and any values and ranges therein). In some embodiments, the bandwidth can be 20%-50% (e.g., 20%, 30%, 40%, 50%, 60% and any values and ranges therein). In several embodiments, providing a bandwidth of 20%-50%, such as 40% or about 40%, can advantageously provide for unstructured focusing.

In one embodiment an ultrasound therapy transducer array reads the reflection intensity in the near field, with a strong reflection from any given transducer indicating that that transducer at least partially or fully covers a rib.

In one embodiment, one or more small, higher frequency transducers may be positions around the main therapy array to provide higher resolution in both time and space. In one embodiment, smaller higher frequency transducers may be placed inside therapeutic ring array transducers to help to ensure a clear path through the ribs. The transducers can be strategically placed to help ensure a rib is not blocking the therapy transducer or is located/oriented correctly above a rib. In one embodiment, an ultrasound transducer device having a therapeutic transducer array and a second transducer array wherein the therapeutic transducer array that is configured to apply ultrasound energy to neuromodulate the spleen or the liver and the second transducer array that is configured to detect the position of the patient's ribs with respect to the therapeutic transducer array. In various embodiments bone may be detected via (1) ultrasound reflections from the bone can be detected based on time of flight and reflected intensity and these signals may optionally be correlated to correct positioning of the therapy device, (2) recognition models (e.g., implementing artificial intelligence and/or machine learning) can be trained to recognize when a therapy array is in the correct position, and/or (3) use of feedback to the user can be in the form of visual, auditory, or text communication.

In one embodiment, ultrasound energy levels are configured for uniform sonication (such as with diffuse focusing and/or unstructured focusing) with a frequency range and/or a low transducer pressure to allow for uniform low intensity treatment over a large area (e.g., over the ribs and spleen or liver or other parts of the body) such that a rough alignment is used.

In one embodiment, the ultrasound therapy transducer(s) may be automatically rotated a one or more rates thereby shifting a directionality of the ultrasound delivery configured to maximize therapy over a larger region of interest (e.g., entire organ such as a spleen or a liver). As the transducer(s) and/or transducer array(s) are rotated, the fixed ultrasound beam may be rotated and/or translated over the treatment region of interest. In one embodiment, this configuration can pass over the bones (e.g., ribs) but due to the periodic rotational motion, the thermal effects can be significantly reduced. In various embodiments, an ultrasound device can optionally implement (i) mechanical steering, (ii) electronic beam steering, (iii) both mechanical steering and electronic beam steering, (iv) mechanical steering without using electronic beam steering, and/or (v) electronic beam steering without using mechanical steering.

In one embodiment, one or more of the ultrasound therapy device components (e.g., transducer(s), array(s), interfaces, fasteners, etc.) may be disposable.

In one embodiment, one or more connections in the device may be connected via magnetism and/or pins (e.g., pogo pins).

In one embodiment, an absorbing material (e.g., a mask, tape, acoustic shielding material, etc.) may be placed over the ribs to help block stray ultrasound energy. A doctor placing any alignment sticker can also place an ultrasound masking layer comprised of highly attenuating regions to cover the ribs. This optionally allows for significant misalignment over the ribs as the bone will be protected from excess ultrasound energy. This also optionally allows the therapy device to have a full array of transducers not needing to specifically avoid ribs.

In one embodiment, one or more device components (e.g., housing, transducer, transducer array) be custom fit to the patient as a personalized medical device. Rapid manufacturing has opened a wide variety of options for custom medical devices. A patient may optionally be scanned to determine an optimal interface and location of the transducers. The scan can be used to make a custom housing where transducer stacks are preassembled to keep the cost down and turnaround time fast via rapid modelling techniques. In various embodiments, the housing may optionally have (i) inserts that are 3D printed, (ii) CNC machined, and/or (iii) utilize a grid array for finite adjustment.

In one embodiment, the ultrasound frequency is configured sweep across a fixed range. For example, a range of 300 kHz-1.5 MHz (e.g., 300, 400, 500, 600, 700, 800, 900, 1000, 1100, 1200, 1300, 1400, 1500 kHz and any values and ranges therein) may be used.

In various embodiments, the ultrasound may be focused, unfocused, and/or defocused. Ultrasound transducers may be focused, planar, defocused, concave, convex, curved, flat, symmetric, asymmetric, round, square, rectangular, triangular, polygonal, ring-shaped, ellipsoid, and/or other shaped, and any combinations thereof. Ultrasound arrays may be curved, flat, symmetric, asymmetric, or arranged in other shapes. In various embodiments, ultrasound arrays may contain one or more ultrasound transducers that may be focused, planar, defocused, concave, convex, curved, flat, symmetric, asymmetric, round, square, rectangular, triangular, polygonal, ring-shaped, ellipsoid, and/or other shaped, and any combinations thereof. In various embodiments, an ultrasound array may comprise one or more: (i) planar transducers, (ii) concave transducers, (iii) convex transducers, (v) piezoelectric transducers, and/or combinations of any thereof. In various embodiments, an ultrasound array may implement one or more focusing methods: (i) constant path, (ii) constant depth, (iii) constant offset, and (iv) natural. In various embodiments, concave transducers or configurations may have elements of focusing. In one embodiment, a concave configuration has some elements of focusing but is not strictly focused. In some embodiments, the ultrasound array may implement electronic focusing using one or more piezoelectric transducers.

Optionally sweeping the frequency with a fixed array and fixed diameter elements can shift the natural focus and side lobes to more completely sonicate the region of interest, such as by diffuse and/or unstructured focusing. The wider frequency range can help to sonicate more or all mechanosensitive channels, such as that have a frequency dependence. In various embodiments, (i) each burst can be configured with a different frequency, (ii) the waveform can be programmable to be asymmetric to achieve maximum therapy, (iii) have a peak positive and peak negative waveforms that are optimized using input pulse shaping from the electronics, which can enable sharper peak negative pressures that can improve the strain and improve the neuromodulation.

In various embodiments, patient compliance and usage may be improved via optional software that may include: (i) application with push notifications, (ii) application can monitor usage and will send reminders as needed, (iii) reminders would be helpful for forgetful patients, (iv) optional software lock after maximum home use/day or period, (v) a notice can be sent if an attempt is made to use the device more than the prescribed amount, (vi) the doctor can be notified if the patient fails to successfully apply the therapy based on setup rules, and/or (vii) rules are defined based on the prescription.

The technology described herein, including ultrasound based neurostimulation of a nerve are used in several embodiments including the technology described in International Patent Application No. PCT/US2023/024133 filed Jun. 1, 2023, entitled Methods And Systems For Treatment Of Systemic Inflammatory Disorders, and the technology described in U.S. Patent Ser. No. 63/347,860 filed Jun. 1, 2022, entitled Methods And Systems For Treatment Of Systemic Inflammatory Disorders Using Acoustic Wave Energy, all herein incorporated by reference.

In various embodiments, a non-invasive therapeutic device for providing ultrasound energy to a nerve within a spleen or a liver includes a base surface, a therapeutic transducer array disposed on the base surface, wherein the therapeutic transducer array is configured to transmit ultrasound energy toward the spleen or the liver, wherein the therapeutic transducer array is configured to automatically rotate with respect to the base surface; and an interface configured for detachable mechanical connection to a multipurpose indicator. In various embodiments, a multipurpose indicator is used for alignment, targeting, and/or activation. In several embodiments, a multipurpose indicator may include a sensor and/or a marker. The multipurpose indicator can include an adhesive surface configured for attachment to a skin surface over the spleen or the liver. The interface can be configured to align the therapeutic transducer array to transmit the ultrasound energy toward the nerve within the spleen or the liver. In one embodiment, the nerve within the spleen is a splenic nerve. In one embodiment, the nerve within the liver is a hepatic nerve. The base surface can have a first dimension and a second dimension orthogonal to the first dimension, wherein the therapeutic transducer array can be configured for arrangement along the first dimension of the base surface, and wherein the second dimension can be configured for an alignment with an intercostal space between ribs.

In various embodiments, a non-invasive therapeutic device for providing ultrasound energy to a nerve within a spleen or a liver includes a base surface and a therapeutic transducer array comprising one or more therapeutic transducers disposed within the base surface; wherein the therapeutic transducer array is configured to automatically rotate with respect to the base surface; and wherein the one or more therapeutic transducers provide ultrasound energy to a nerve within the spleen or the liver.

In one embodiment the therapeutic transducer array comprises two or more ultrasound transducers. In various embodiments of the therapeutic device, (i) the therapeutic transducer array is configured for mechanical steering, (ii) the therapeutic transducer array is configured to operate without electrical steering, (iii) components of the therapeutic device may include a magnetic connection, (iv) components of the therapeutic device may include a pogo pin connection, (v) the therapeutic transducer array is disposable, (vi) the therapeutic device is configured to operate with an acoustic absorbing material configured for placement between the therapeutic transducer array and a bone, and/or (VII) the base surface is configured for connection to a body fastener, wherein the body fastener comprises at least one of a strap, a belt, or a band. In one embodiment, the therapeutic transducer array transmits ultrasound at a frequency between 100 kHz and 2 MHz. In one embodiment, the therapeutic transducer array transmits ultrasound via a signal, wherein the signal comprises a duty cycle and/or pulse train. For example, the duty cycle and/or pulse train may include an "on" period having a pulse duration in a range of 1 ms-5 ms, and an "off" period in a range of 9 ms-15 ms. Alternatively, the duty cycle and/or pulse train may include an "on" period having a pulse duration in a range of 1 ms-50 ms, and an "off" period in a range of 10 ms-500 ms. In some embodiments, each pulse of ultrasound energy can have a duration within the range of 50-150 ms. The therapeutic transducer array may be configured to deliver a treatment between 5-30 minutes. The therapeutic transducer array may include one or more therapy ring transducers. The therapeutic transducer array may be arranged along a central longitudinal axis of the base surface. In one embodiment, at least one transducer in the therapeutic transducer array is configured to detect bone.

In various embodiments, the therapeutic device may include a second transducer array disposed on the base surface, wherein the second transducer array is configured to detect bone. In various embodiments, (i) the second transducer array is configured to align with the therapeutic transducer array, (ii) the second transducer array comprises one or more sensing transducers, (iii) the second transducer array comprises the same number of transducers as the therapeutic transducer array, (iv) each of the transducers of the second transducer array are centrally aligned with a corresponding transducer of the therapeutic transducer array, (v) the second transducer array comprises more transducers than the therapeutic transducer array, (vi) each transducer of the therapeutic transducer array is surrounded at least in part by one or more transducers of the second transducer array, (vii) the second transducer array comprises a matrix of sensing transducers, (viii) the second transducer array comprises a 2 by 4 matrix of sensing transducers, (ix) the therapeutic transducer array is aligned between two columns of sensing transducers, (x) the second transducer array is positioned laterally of the therapeutic transducer array, (xi) the second transducer array detects an alignment of the therapeutic transducer array relative to an intercostal space between two adjacent ribs, (xii) the therapeutic transducer array is configured to transmit energy to the spleen or the liver in response to finding an adequate alignment, and/or (xiii) the therapeutic transducer array is configured to standby in response to finding an inadequate alignment.

In one embodiment, the therapeutic transducer array is configured to transmit ultrasound energy according to a pulsing duty cycle and/or pulse train having one or more "on" periods with a pulse duration between 1 ms and 5 ms and one or more "off" periods between 9 ms and 15 ms. In another embodiment, the therapeutic transducer array is configured to transmit ultrasound energy according to a pulsing duty cycle and/or pulse train having one or more "on" periods with a pulse duration between 1 ms and 50 ms and one or more "off" periods between 10 ms and 500 ms. The pulsing duty cycle and/or pulse train can be constant.

In one embodiment, a burst pattern can include intermittently sending a burst of stimulation every few seconds. For example, a burst of 10 pulses with each pulse 1 ms "on" and 9 ms "off" can be delivered, and after 10 such pulses are delivered, there can be an "off" time of 5-30 seconds (e.g., 5, 10, 15, 20, 25, 30 seconds and any values and ranges therein) and then this pattern is repeated for a duration of therapy (e.g., 1, 2, 3, 4, 5, 8, 10, 12, 15, 20 minutes and any values and ranges therein). In one embodiment, a duty cycle of 20% or less (e.g., 20%, 15%, 10% or other values and ranges therein) can help in avoiding a heating effect of energy transmission to the ribs, and can also allow the target nerve(s) to undergo a resting period for a more effective therapy.

In various embodiments, artificial intelligence and/or machine learning can be employed to identify a location of bone or an organ, such as a spleen or a liver, or a landmark on the body for reference. In some embodiments, augmented reality (AR) or virtual reality (VR) may be implemented to identify a location of bone or an organ or a landmark on the body for reference.

In various embodiments, a method of treating a nerve located in the spleen or the liver with ultrasound energy includes identifying a location of the spleen or the liver, marking a surface of the skin located over the spleen or the liver and ribs with a multipurpose indicator, and providing ultrasound energy to the spleen or the liver according to a treatment plan. In several embodiments, the treatment plan may include one or more of (i) positioning a therapy device toward a position of the spleen or the liver; (ii) rotating the therapy device with respect to the position of the spleen or the liver; (iii) transmitting a first ultrasound energy from the therapy device into the approximate position of the spleen or the liver; (iv) detecting reflections of the first energy from the patient's skeletal structure; (v) aligning the therapy device with the skeletal structure of the patient; and/or (vi) applying a second ultrasound energy from the therapy device to the spleen or the liver, wherein the second ultrasound energy is transmitted from the therapy device to the spleen or the liver through an intercostal space defined by the patient's skeletal structure. The therapy device may be removably secured to the multipurpose indicator. The therapy device may be connectable to the multipurpose indicator via a male/female mechanical connector.

In some therapeutic ultrasound applications and embodiments, the correct placement and alignment of a transducer are configured for ensuring that the therapeutic ultrasound is delivered to the appropriate anatomical target. Misplacement or misalignment of the transducer may risk delivering therapy to the wrong area, which can result in ineffective treatment or potential harm. Furthermore, without adequate feedback on the device's position and the dose being administered, there can be a risk of suboptimal therapy outcomes, as the delivered dose may not achieve the intended physiological effects. This problem can be exacerbated in applications where anatomical targets are small, deep within the body, or adjacent to sensitive tissues, such as in neurostimulation or immune system modulation. In certain embodiments, precise alignment and verification of dose delivery may be paramount to therapeutic success. In one embodiment, the effectiveness of ultrasound therapy may be contingent on proper coupling and alignment between the device and the target tissue. Inconsistent or incorrect placement of the transducer can compromise the therapy by either missing the target area or delivering excess energy to unintended tissues. In such scenarios, the patient is at risk of receiving a subtherapeutic or excessive dose, leading to ineffective outcomes or potential side effects. In the absence of reliable verification methods, a barrier to ensuring optimal therapy in real-world applications can be present, particularly when therapy is administered without continuous oversight by a skilled technician.

Feedback systems can be used to ensure correct placement and alignment of a transducer. In one embodiment, aligning the therapy device with the skeletal structure of the patient includes providing feedback to the operator to guide the therapy device into alignment with the one or more ribs to minimize the amount of hard tissue positioned between the spleen or the liver and the therapy device. Feedback may be provided as auditory instructions, visual cues, and/or haptic feedback in several embodiments. In one embodiment, the method includes securing the therapy device to the patient in proper alignment with respect to the spleen or the liver and the patient's ribs. The therapy device may include a body fastener configured to extend around the patient's torso to secure the therapy device in place. In one embodiment, the second ultrasound energy is applied according to a pulsing duty cycle and/or pulse train.

In several embodiments, a therapy device for targeting a subdermal target site, the therapy device comprising: a wearable device; an ultrasound transducer array coupled to the wearable device; and a power supply electrically coupled to the ultrasound transducer array; wherein: the wearable device is configured to direct the ultrasound transducer array toward the subdermal target site; and the power supply provides power to the ultrasound transducer array. The therapy device may be a harness, a garment, a vest, or a chest strap.

In several embodiments, harness may include a torso strap, one or more shoulder straps having a first end coupled to the torso strap and a second end opposite the first end, and a back strap coupled to the second end and the torso strap. The torso strap may comprise one or more fasteners, and/or a grasping mechanism configured to aid in closing and/or tightening the torso strap. In several embodiments, (i) the ultrasound transducer array is positioned along the torso, (ii) the torso strap is configured to cover the subdermal target site, (iii) the subdermal target site is an organ (such as a spleen or a liver), (iv) the torso strap comprises an engagement element configured to secure the torso strap to a tag multipurpose indicator positioned at a predetermined position on a patient's body, (v) the engagement element is configured to magnetically couple to the tag multipurpose indicator, (vi) the harness comprises an adjustment strap, (vii) the harness comprises an alignment bar, (viii) the harness comprises an opening configured to receive an alignment sensor, and/or (ix) the alignment sensor is configured to ensure precise placement of a tag multipurpose indicator relative to the subdermal target site.

In several embodiments, a therapy device for targeting a subdermal target site may include: a wearable device; a secondary therapy device removably couplable to the wearable device, the secondary therapy device comprising an ultrasound transducer array; and a power supply electrically coupled to the ultrasound transducer array; wherein: the wearable device is configured to direct the ultrasound transducer array toward the subdermal target site; and the power supply provides power to the ultrasound transducer array.

In several embodiments, (i) wearable device is a harness, a wearable garment, a vest, a chest strap, or an adhesive sticker, (ii) the secondary therapy device comprises one or more pillows (e.g., maternity pillow, wedge pillow, etc.), (iii) the device is configured to engage a patient in a prone position, (iv) the harness comprises a torso strap, one or more shoulder straps having a first end coupled to the torso strap and a second end opposite the first end, and a back strap coupled to the second end and the torso strap, (v) the torso strap comprises one or more fasteners, (vi) the torso strap comprises a grasping mechanism configured to aid in closing and/or tightening the torso strap, (vii) the ultrasound transducer array is configured to couple to the harness along the torso strap, (viii) the torso strap is configured to cover the subdermal target site, (ix) the subdermal target site is an organ (e.g., spleen, liver, etc.), (x) the torso strap comprises an engagement element configured to secure the torso strap to a tag multipurpose indicator positioned at a predetermined position on a patient's body, (xi) the engagement element is configured to magnetically couple to the tag multipurpose indicator, and/or (xii) the harness comprises an adjustment strap and/or an alignment bar. The harness may include an opening configured to receive an alignment sensor. The alignment sensor may be configured to ensure precise placement of a tag multipurpose indicator relative to the subdermal target site. The ultrasound transducer array may comprises a plurality of ultrasound transducers arranged along a first plane and a plurality of targets arranged along a second plane parallel to the first plane, wherein the plurality of ultrasound transducers are configured to direct ultrasound energy toward a corresponding one of the plurality of targets and the plurality of targets are configured to be rotated about a longitudinal axis.

In several embodiments, an ultrasound transducer array may include: a plurality of ultrasound transducers arranged along a first plane; and a plurality of targets arranged along a second plane parallel to the first plane; wherein the plurality of ultrasound transducers are configured to direct ultrasound energy toward a corresponding one of the plurality of targets; and the plurality of targets are configured to be rotated about a longitudinal axis, The plurality of ultrasound transducers may be arranged in a first shape and the plurality of targets are arranged in a second shape, and may include (i) the second shape is the same as the first shape, (ii) the first shape is a square pattern and the second shape is a square pattern, (iii) the first shape is a spiral pattern and the second shape is a spiral pattern, (iv) the first shape is a hexagonal pattern and the second shape is a hexagonal pattern, (v) the ultrasound energy emitted from the plurality of ultrasound transducers forms a focal pattern, (vi) rotation of the plurality of targets adjusts the focal pattern, (vii) further comprising an array lens, wherein the array lens is configured to direct ultrasound energy to a focal point, (viii) the array lens comprises a plurality of array elements wherein each of the plurality of array elements are individual driven by an excitation frequency, (ix) the plurality of array elements are radially nested, (x) the array lens is configured to redirect ultrasound energy to a focal point, (xi) the ultrasound transducer array is configured to implement an unstructured focusing scheme, (xii) the unstructured focusing scheme provides each ultrasound transducer with a pseudo random unique frequency, (xiii) the waveform does not have a pure one frequency sinusoid, and/or (xiv) the resulting waveform is asymmetrical.

In several embodiments, a therapy device for targeting a subdermal target site may include: a pillow comprising an ultrasound transducer array; a harness comprising an opening, wherein the harness is removably couplable to the pillow, wherein the harness comprises an alignment sensor configured to align the opening with the ultrasound transducer array, a power supply electrically coupled to the ultrasound transducer array, wherein the power supply is configured to provide power to the ultrasound transducer array; wherein the alignment sensor is configured to direct the ultrasound transducer array toward the subdermal target site. The alignment sensor may include a magnet configured for magnetic coupling. The device may be configured to engage a patient in a prone position. The subdermal target site may be an organ (e.g., spleen, liver, etc.). The pillow can be configured to support a patient (e.g., a wedge pillow, a maternity pillow, etc.). The ultrasound transducer array positioned in the pillow can be configured to apply ultrasound energy.

In several embodiments, the therapeutic transducer array may be configured to output ultrasound energy having a center frequency between 400 and 800 kHz. In one embodiment, each channel is programmed to one of the frequencies in this range configured for providing an unstructured waveform and the broad beam (multi-foci) which allows for simultaneous stimulation of multiple areas. The therapeutic transducer array may be configured to output ultrasound energy having an RMS pressure between 350 and 600 kPa. The therapeutic transducer array may be configured to output ultrasound energy in pulses having a duration between 50 and 150 ms. The therapeutic transducer array may be configured to output ultrasound energy in pulses having a duration between 10 and 150 ms (e.g., 10, 20, 30, 40, 50, 60, 70, 80, 90, 100, 110, 120, 130, 140, 150 ms and values and ranges therein). The therapeutic transducer array may have a duty cycle between 5% and 15%. The therapeutic transducer array may be configured to alternate between an active state and an inactive state. The active state may have a duration between 10 and 30 seconds and the inactive state may have a duration between 20 and 30 seconds. In several embodiments, these parameters are effective for nerve stimulation while avoiding generating significant heating (e.g., >4 C) around the bone for safety reasons as well as avoiding nerve inhibition.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the embodiments of the present disclosure.

FIGS. 12A-12D illustrate hexagonal packed ultrasonic array elements with emitted ray lines traced through hexagonal packed targets.

FIGS. 17A-17C illustrate respective 2D pressure plots of the 3D pressure plot of FIG. 16.

DETAILED DESCRIPTION

Figure 1A:
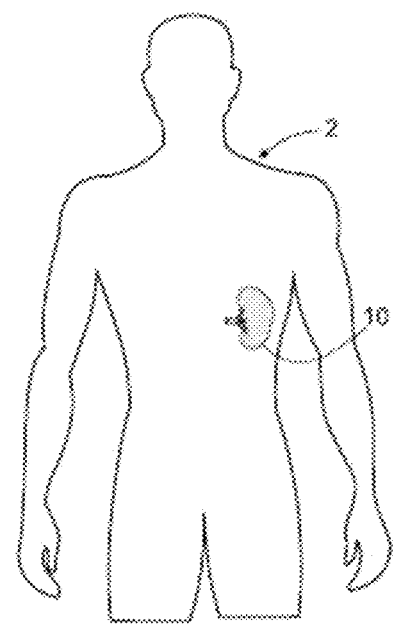
FIG. 1A provides an illustration of a patient and an approximate location of the spleen according to one embodiment.

According to several embodiments, the systems and methods described herein are directed towards medical devices, systems, and methods for applying ultrasound energy to a subdermal target site and detecting hard tissue that may interfere with the transmission of ultrasound energy to the subdermal target site. For example, provided here are several embodiments using ultrasound energy for neuromodulation of the spleen or the liver, including without limitation devices, systems, and methods for treating and/or detecting an organ, such as a spleen or a liver, and/or a nerve, such as a splenic nerve or a hepatic nerve. Several embodiments address systems and methods for ultrasound energy delivery to the spleen or the liver through ribs, and provide ways to avoid bones, such as ribs, while delivering the therapy. The energy delivery device may be operated by a patient at home via a wearable device, and as such, for increased efficacy of treatment and ease of use for the patient, embodiments are provided that reliably place the wearable device such that the ultrasound neuromodulation is not blocked by the ribs and successfully sonicate the region of interest. Bone and/or air can be strong reflectors of ultrasound and can be visualized with a variety of ultrasound imaging devices. Bone and/or air can also prevent ultrasound from passing into the body efficiently. In several embodiments, bone and/or air detection may be implemented to aid in the proper location (position, translation, rotation, angle) of the therapy device with respect to the targeted tissue for treatment. In one embodiment, strong reflections due to an air pocket as compared to bone may be distinguished based on differences in time of flight and reflected intensity. In some embodiments, detection of air interfaces or pocket that may either arise due to improper/poor coupling of the device to the patient skin surface may be advantageous for repositioning the device for better coupling. In one embodiment, the device may also detect the presence of lung tissue (i.e., tissue filled with air) between the transducer and targets. In one embodiment, of poor coupling (i.e., air pocket), a feedback mechanism may instruct the patient to improve the coupling perhaps by increasing the applied pressure between the device and patient skin surface.

In several embodiments, an ultrasound treatment of a condition in a patient may include one or more of: (i) identifying a location of the spleen or the liver in the patient using ultrasound imaging; (ii) marking a surface of the skin over the spleen or the liver and ribs with a tag multipurpose indicator that adheres to the patient; (iii) attaching the tag multipurpose indicator to an ultrasound therapy device via a mechanical connector to orient ultrasound energy emitted from the device to the spleen or the liver. The ultrasound therapy device may be wrapped around the ribs of the patient using a belt/strap; and/or (iv) stimulating the patient's splenic nerve at the spleen or the liver through the patient's ribs at using the ultrasound therapy device. In several embodiments, a multipurpose indicator may include a sensor and/or a marker. In various embodiments, a multipurpose indicator is used for alignment, targeting, and/or activation.

In various embodiments, the ultrasound from the device stimulates the splenic nerve (and does not stimulate general spleen or liver cells) via mechanical force with low duty cycle for more uniform sonication (thereby reducing heating, cavitation effects, and ablation). The treatment period may be 5 to 30 minutes (e.g., 5, 10, 15, 20, 25, 30 minutes, and any ranges or values therein) per day. The ultrasound therapy may have a pulsing duty cycle and/or pulse train. For example, in one embodiment, the therapy includes a pulse train with "on" period with a pulse duration in a range of 1 ms-5 ms and an "off" period in range of 9 ms-15 ms. The pulsing duty cycle and/or pulse train may be constant within this range, or possibly modified within the "on"/"off" period ranges. In various embodiments, the ultrasound treatment frequency is provided in a range of 100 kHz-500 kHz (e.g., 100, 150, 200, 250, 300, 350, 400, 450, 500 kHz and any values and ranges therein). The ultrasound treatment frequency may be provided in a frequency sweep in fixed range, such as 300 kHz-2 MHz (e.g., 300, 400, 500, 600, 700, 800, 900 kHz, 1 MHz, 1.2 MHz, 1.4 MHz, 1.5 MHz, 1.6 MHz, 1.8 MHz, 2 MHz and any values and ranges therein).

In one embodiment an ultrasound therapy transducer array reads the reflection intensity in the near field, with a strong reflection from any given transducer indicating that that transducer at least partially or fully covers a rib and/or air pocket. In one embodiment, strong reflections due to an air pocket as compared to bone may be distinguished based on differences in time of flight and reflected intensity.

In one embodiment, one or more smaller, higher frequency transducers may be positions around the main therapy array to provide higher resolution in both time and space. In one embodiment, smaller higher frequency transducers may be placed inside therapeutic ring array transducers to help to ensure a clear path through the ribs. The transducers can be strategically placed to help ensure the rib is not blocking the therapy transducer or is located/oriented correctly above a rib. In one embodiment, an ultrasound transducer device having a first transducer array and a second transducer array wherein the first transducer array that is configured to apply ultrasound energy to neuromodulate the spleen or the liver and the second transducer array that is configured to detect the position of the patient's ribs with respect to the first transducer array. In various embodiments bone and/or air pockets may be detected via (1) ultrasound reflections from the bone can be detected based on time of flight and reflected intensity and these signals may optionally be correlated to correct positioning of the therapy device, (2) recognition models (e.g., implementing artificial intelligence and/or machine learning) can be trained to recognize when a therapy array is in the correct position, and/or (3) use of feedback to the use can be in the form of visual, auditory, or text communication.

In one embodiment, ultrasound energy levels are configured for uniform sonication with a frequency range and/or a low transducer pressure to allow for uniform low intensity treatment over a large area (e.g., over the ribs and spleen or liver) such that a rough alignment is used.

In one embodiment, the ultrasound therapy transducer(s) may be automatically rotated a one or more rates thereby shifting a directionality of the ultrasound delivery configured to maximize therapy over a larger region of interest (e.g., entire organ such as a spleen or a liver). As the transducer(s) and/or transducer array(s) are rotated, the fixed ultrasound beam may be rotated and/or translated over the treatment region of interest. In one embodiment, this configuration can pass over the bones (e.g., ribs) but due to the periodic rotational motion, the thermal effects can be significantly reduced. In various embodiments, an ultrasound device can optionally implement (i) mechanical steering, (ii) electronic beam steering, (iii) both mechanical steering and electronic beam steering, (iv) mechanical steering without using electronic beam steering, and/or (v) electronic beam steering without using mechanical steering.

In one embodiment, one or more of the ultrasound therapy device components (e.g., transducer(s), array(s), interfaces, fasteners, etc.) may be disposable.

In one embodiment, one or more connections in the device may be connected via magnetism and/or pins (e.g., pogo pins).

In one embodiment, an absorbing material (e.g., a mask, tape, acoustic shielding material, etc.) may be placed over the ribs to help block stray ultrasound energy. A doctor placing any alignment sticker can also place an ultrasound masking layer comprised of highly attenuating regions to cover the ribs. This optionally allows for significant misalignment over the ribs as the bone will be protected from excess ultrasound energy. This also optionally allows the therapy device to have a full array of transducers not needing to specifically avoid ribs.

In one embodiment, one or more device components (e.g., housing, transducer, transducer array) be custom fit to the patient as a personalized medical device. Rapid manufacturing has opened a wide variety of options for custom medical devices. A patient may optionally be scanned to determine an optimal interface and location of the transducers. The scan can be used to make a custom housing where transducer stacks are preassembled to keep the cost down and turnaround time fast via rapid modelling techniques. In various embodiments, the housing may optionally have (i) inserts that are 3D printed, (ii) CNC machined, and/or (iii) utilize a grid array for finite adjustment.

In one embodiment, the ultrasound frequency is configured sweep across a fixed range. For example, a range of 300 kHz-1 MHz (e.g., 300, 400, 500, 600, 700, 800, 900, 1000 kHz and any values and ranges therein) may be used.

In various embodiments, the ultrasound may be focused, unfocused, and/or defocused. Ultrasound transducers may be focused, planar, defocused, concave, convex, curved, flat, symmetric, asymmetric, round, square, rectangular, triangular, polygonal, ring-shaped, ellipsoid, and/or other shaped, and any combinations thereof. Ultrasound arrays may be curved, flat, symmetric, asymmetric, or arranged in other shapes. In various embodiments, ultrasound arrays may contain one or more ultrasound transducers that may be focused, planar, defocused, concave, convex, curved, flat, symmetric, asymmetric, round, square, rectangular, triangular, polygonal, ring-shaped, ellipsoid, and/or other shaped, and any combinations thereof. In various embodiments, an ultrasound array may comprise one or more: (i) planar transducers, (ii) concave transducers, (iii) convex transducers, and/or combinations of any thereof. In various embodiments, concave transducers or configurations may have elements of focusing. In one embodiment, a concave configuration has some elements of focusing but is not strictly focused.

Optionally sweeping the frequency with a fixed array and fixed diameter elements can shift the natural focus and side lobes to more completely sonicate the region of interest. The wider frequency range can help to sonicate more or all mechanosensitive channels, such as that have a frequency dependence. In various embodiments, (i) each burst can be configured with a different frequency, (ii) the waveform can be programmable to be asymmetric to achieve maximum therapy, (iii) have a peak positive and peak negative waveforms that are optimized using input pulse shaping from the electronics, which can enable sharper peak negative pressures that can improve the strain and improve the neuromodulation.

In various embodiments, patient compliance and usage may be improved via optional software that may include: (i) application with push notifications, (ii) application can monitor usage and will send reminders as needed, (iii) reminders would be helpful for forgetful patients, (iv) optional software lock after maximum home use/day or period, (v) a notice can be sent if an attempt is made to use the device more than the prescribed amount, (vi) the doctor can be notified if the patient fails to successfully apply the therapy based on setup rules, and/or (vii) rules are defined based on the prescription.

The immune system can play an important role in human immunity. Without it, humans would likely be more susceptible to a variety of pathogens. However, an overactive immune system can also be a central pathway to a variety of human conditions and/or diseases, such as inflammation, arthritis, autoimmune diseases such as Rheumatoid Arthritis, ankylosing spondylitis, psoriatic arthritis, Crohn's disease, and Ulcerative Colitis, atopic dermatitis, irritable bowel syndrome, chronic obstructive pulmonary disease, as well as infectious disease when those infections result in systemic inflammatory response syndrome (SIRS) or septic shock. The immune system can also worsen a variety of other diseases including metabolic disorders such as obesity and Type 2 diabetes, cardiovascular disease, or ischemic reperfusion injuries in organ transplant or hypoperfusion. The underlying mechanisms of each of these disease processes can be different, but in several embodiments, a unifying factor is that pro-inflammatory cytokines can be released by monocytes, macrophages, and dendritic cells that create a positive feedback loop leading to greater systemic inflammation. These cytokines and chemokines include but are not limited to, TNF-alpha, IL-1b, IL-6, IL-8, IL-12, IL-18, IFN-gamma, and HMGB1.

In the case of Rheumatoid Arthritis (RA), the immune system recognizes proteins in the synovium as foreign, causing inflammation in the joints and surrounding tissues, which slowly destroys the joints and tissues. This process is amplified by the release of pro-inflammatory cytokines by innate immune cells, which in turn leads to further joint destruction. This destruction of cartilage and bone can cause pain, discomfort, and/or stiffness, and the condition is estimated to affect a large number of adults every year, with a current prevalence of about 1.3 million people in the United States. RA carries a substantial disease burden, causing pain, disability, and impaired health-related quality of life. RA patients develop work disability that can cost them their jobs. Studies report that approximately 35-50% of RA patients stopped participating in certain activities, with about 30% reported retiring from work, quitting a job, or switching jobs as a result of the disease. Beyond the patient impact, the disease is estimated to cost the US healthcare system $19.3 billion annually. Some of the most expensive medications for private and public payers are for the treatment of RA.

Pharmaceuticals can be used for the treatment for symptomatic RA patients where clinical guidelines define the goal of RA treatment to be remission or low disease activity if remission is not possible. Currently, there are two major medication treatment options to meet these goals, 1) conventional synthetic DMARDs (csDMARD), or 2) targeted biologic (bDMARD) or targeted synthetic DMARDs (tsDMARD). While studies have shown that these targeted therapies result in improved clinical outcomes and a reduction in disability, 20-30% of the RA patients do not achieve meaningful clinical benefit and response to the therapy. Of the patients who respond to therapy, studies have shown that approximately half of the patients remain on the initial therapy after 5 years. Surveys indicate that treatment side effects and the number/frequency of medications are the top reasons to discontinue the existing therapies. Roughly, about 60% or more of RA patients are taking pain relief medications, along with their DMARDs, to help manage their disease.

Many of the currently available treatments for systemic chronic inflammatory disorders can have significant shortcomings. Paramount among these is lack of efficacy. Approximately 50% of patients who fail first-line treatment for RA with Methotrexate respond to a TNF-a blocker. Furthermore, these medications can cause adverse effects such as rashes, headaches, nausea, and joint pains. In some cases, these reactions can be severe, causing hypotension, anaphylaxis, or severe infection.

In view of these shortcomings with the current standard of care for RA, there remains a need for an alternative noninvasive neuromodulation therapy that can treat chronic inflammatory disorders that improve the current standard of care to improve efficacy and reduce side effects in patients.

Several embodiments of the present disclosure includes methods of applying an energy to one or more target nerves within a patient. For example, a variation of such a method includes providing an energy device having a multipurpose indicator, where the multipurpose indicator is detachable from the energy device and where the energy device comprises an nesting area permitting coupling of the multipurpose indicator and the energy device; determining an area on an exterior surface of the patient that allows passage of energy from the energy device through the exterior surface to the one or more target nerves; affixing the multipurpose indicator on the area at the exterior surface; coupling the energy device to the multipurpose indicator and to the patient such that the multipurpose indicator aligns the energy device towards the one or more target nerves; applying energy from the energy device to the one or more target nerves through the exterior surface of the patient; and detaching the energy device from the multipurpose indicator and the patient, where the multipurpose indicator remains affixed to the patient to permit subsequent attachment of the energy device to the multipurpose indicator and the patient and where the multipurpose indicator permits alignment of the energy device to the one or more target nerves.

In one embodiment, the method includes determining the area on the exterior surface of the patient by noninvasive imaging of the patient to identify a target area containing the one or more target nerves. The determination can occur by palpitation or application of energy until a sufficient effect is achieved. Variations of the methods and systems may include the use of ultrasound energy as the therapeutic energy.

Neuromodulation can be applied to any area of the body and can treat numerous conditions (illness, disease, and/or symptoms such as inflammation, rheumatoid arthritis, psoriatic arthritis, ankylosing spondylitis, juvenile idiopathic arthritis, osteoarthritis, gout, fibromyalgia, multiple sclerosis, acute kidney injury, Parkinson's disease, dementia, depression, uveitis, lupus, inflammatory bowel disease, irritable bowel syndrome, colitis, ulcerative colitis, Crohn's Disease, arthrosclerosis, eczema, psoriasis, atopic dermatitis, diabetes, hidradenitis, wound healing, chronic obstructive pulmonary disease, etc.).

The multipurpose indicators described herein can comprise radio frequency identification (RFID) sensors and electrical sensors. In one embodiment, the multipurpose indicators can also be magnetically coupled to the energy device. The magnetic features of the multipurpose indicator and device can provide a fail safe such that the energy device is configured activate only when the multipurpose indicator is coupled to the energy device.

The energy device can also be configured to monitor a respiration cycle of the patient according to some embodiments. The energy device can include one or more actuators to reposition the energy device in response to movement of the patient.

In several embodiments, methods and devices can include applying energy from the energy device by applying a series of energy treatments to stimulate the one or more target nerves and varying a dosing parameter of one or more of the series of energy treatments to prevent nerve adaption of the one or more target nerves. Varying the dosing parameter can include altering a frequency of one or more of the series of energy treatments in a fixed step rate or a random step rate manner, such as with unstructured focusing. In addition, varying the dosing parameter can include altering frequency of one or more of the series of energy treatments.

In one embodiment, the method can include performing a repeat therapy to treat one or more target nerves with energy, where a multipurpose indicator is affixed to a patient such that the multipurpose indicator is previously positioned on an exterior surface of the patient in alignment with the one or more target nerves within the patient. For example, such a method can include coupling an energy device to the multipurpose indicator such that the multipurpose indicator aligns the energy device with the one or more target nerves; applying energy from the energy device to the one or more target nerves through the exterior surface of the patient; and detaching the energy device from the multipurpose indicator and the patient, where the multipurpose indicator remains affixed to the patient to permit subsequent attachment of the energy device to the multipurpose indicator and the patient and where the multipurpose indicator permits alignment of the energy device to the one or more target nerves.

Systems for providing a repeated therapy to an internal organ within a patient are provided in several embodiments. In one example, the system can include a multipurpose indicator configured to be affixed to an exterior of the patient; and an energy device having an energy treatment portion and having a fastener configured to permit securing of the energy device to an exterior of the patient, the energy device further including a mating surface to couple the multipurpose indicator and the energy device, such that when the multipurpose indicator is affixed to the exterior of the patient the energy device can be coupled to the multipurpose indicator allowing for automatic alignment of the energy treatment portion to the internal organ from the exterior of the patient.

The multipurpose indicator can include an adhesive for affixing to the exterior of the patient or one or more suture openings for affixing to the exterior of the patient using a suture.

The system can include one or more actuators to reposition the energy device in response to movement of the patient in several embodiments. Such actuators can be controlled independently or by the controller.

The energy device can include a controller that is configured to apply a series of energy treatments to stimulate the one or more target nerves and varies a dosing parameter of one or more of the series of energy treatments to prevent nerve adaption of the one or more target nerves. The controller can alter a frequency of one or more of the series of energy treatments in a step rate manner or in a random manner. The controller can also be configured to vary the dosing parameter by altering an intensity of one or more of the series of energy treatments.

Embodiments of the system can be user-friendly and easy to accurately apply over the target region, at home by an average user, with product and directions/guidance for use that are simple and easy to understand. The system can also monitor the movement of the spleen or the liver using imaging or building complex AI models for detection in some embodiments.

In several embodiments, the systems and methods described herein can provide a therapeutic ultrasound device that modulates the activity of neurons, nerves, and nerve plexuses, specifically, but not limited to neurons in the vagus nerve and splenic nerve that make up the Cholinergic Anti-Inflammatory Pathway (CAP), which regulates the innate immune response to injury, pathogens, and tissue ischemia. This pathway is the efferent, or motor arm of the inflammatory reflex, which is the neural circuit that responds to and regulates the inflammatory response.

Stimulating efferent fibers of the vagus nerve can lead to an anti-inflammatory effect in several embodiments. Studies using electrical nerve stimulation, genetic knock-outs, and pharmacologic antagonists have isolated the associated afferent and efferent nerve pathways. The afferent limb has inputs from multiple organs via vagal paraganglia as well as the auricular branch of the vagus nerve. These neurons pass through the nodose ganglia where their cell bodies lie and synapse in the solitary nucleus (NTS). There can be some afferent signaling as well via the sciatic nerve. The efferent limb begins in the dorsal motor nucleus (DMN), with its cell bodies lying in the nodose ganglia, after which it synapses in the celiac ganglia in the abdomen. The post-synaptic branch is the splenic nerve which follows the splenic artery and its branches into the spleen. Here the splenic nerve fibers can synapse on T-cells located in the periarterial lymphoid sheath (PALS). Here local binding of norepinephrine and epinephrine with adrenergic receptors on T-cells can lead to the release of acetylcholine. This can bind to a 7-nicotinic acetylcholine receptor on monocytes and macrophages, which in turn can downregulate the release of pro-inflammatory cytokines by these cells.

The present disclosure includes embodiments of methods, systems, and devices that can modulate the activity of nerves (e.g., splenic nerve, vagus nerve) to have an excitatory or inhibitory effect based on the parameters used. In one embodiment involving the CAP, these technologies excite targeted nerves. While different variations of the treatment described herein can include energy from different sources, such as including ultrasound, electromagnetism, electrical, transcutaneous electricity, infrared light, optical, magnetic, other modalities, and/or a combination thereof. Different energy modalities can excite neurons in different ways based on the technology. The effect of more frequent depolarizations and the release of specific neurotransmitters can lead to a decrease in the pro-inflammatory response of innate immune cells in several embodiments.

In one embodiment, the application of ultrasound energy modulates neural activity along the CAP and can optimize the number and shape of the transducers, the acoustic energy intensity (both positive and negative acoustic pressure), focal zone, acoustic wave frequency, pulse duration, pulse repetition frequency (PRF), and/or treatment duration in order to activate the cholinergic anti-inflammatory response.

In one embodiment, a noninvasive or transcutaneous approach to modulate the activity of nerves and immune cells in the cholinergic anti-inflammatory pathway is provided. The treatment can target anywhere along this pathway, including, but not limited to, the NTS or DMN of the medulla, the superior ganglia (SG), the nodose ganglia (NG), the auricular branches of the vagus nerve (ABVN), the cervical vagus nerves (CVN), the celiac ganglion (CG), the splenic nerve (SN), and the splenic nerve fibers and their end terminals in the spleen, nerve fibers and their end terminals in the intestines and pancreases. In various embodiments, a nerve can include any of a superior ganglia of a vagus nerve, an inferior ganglia of the vagus nerve, a cervical vagus nerve, a thoracic vagus nerve, an abdominal vagus nerve, a celiac plexus nerve, and/or a splenic nerve. These targets may include afferent or efferent branches of the vagus nerve. Two or more targets specified herein can be stimulated at the same time or in sequential order to enhance the end outcomes effects. For example, methods and devices can stimulate the spleen and the intestine at the same time or in sequential, that is, stimulate the spleen first and then the intestine, or vice versa.

In one embodiment, the treatment targets the splenic nerve for innervation of the spleen. In one embodiment, targeting of the splenic nerve can focally target the efferent signaling of the CAP without stimulating other efferent branches of the vagus nerve, which can result in off-target effects in other organs such as the muscles in the throat, the heart, lungs, liver, stomach, and intestines. The location of the spleen is also a fairly accessible target for noninvasive neuromodulation. FIG. 1A provides an illustration of a patient 2 and an approximate location of the spleen 10, which is located in the retroperitoneum. The spleen 10 can often be located 1-2 centimeters from the skin surface. When at rest after exhalation, the spleen 10 is usually tucked beneath the left rib cage superolateral to the left kidney and posterolateral to the stomach. The superior pole of the spleen can be obscured posterior by the inferior lobe of the left lung. In another embodiment, the treatment can target the hepatic nerve for innervation of the liver. Applying energy to the hepatic nerve can be used in the treatment of weight loss and/or the treatment of type I and type II diabetes.

Figure 1B:
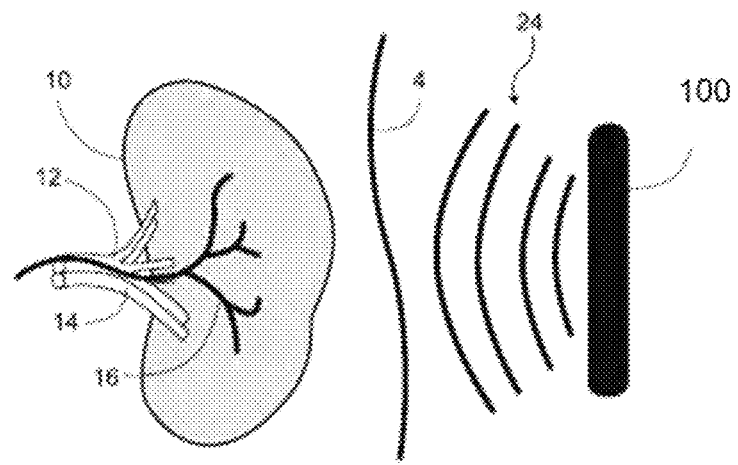
FIG. 1B is an illustration showing an energy device applying a therapeutic energy treatment exterior to the patient to produce a neural response in a splenic nerve according to one embodiment.

FIG. 1B illustrates an embodiment of an energy device 100 that can apply a therapeutic energy treatment 24 across a surface 4 of the patient to produce a neural response in the splenic nerve 16, which can generally run along the splenic artery 12 and splenic vein 14.

In several embodiments, when using ultrasound energy, the positive pressure (also referred to as the compressional pressure or acoustic radiating force) can help in generating a neural response, and pressure levels below a certain threshold do not appear to generate depolarization of neurons. In one embodiment, the threshold pressure to trigger a response in the focal zone is between 100-200 kPa RMS pressure. In some embodiments, the threshold pressure to trigger a response in the focal zone is between 200-300 kPa RMS pressure (2-3× atmospheric pressure), but higher pressures tend to recruit more neurons and trigger a larger response. For example, in some embodiments, the RMS pressure can be between 350-600 kPa. However, positive pressures that exceed a certain pressure threshold can also be deleterious in some embodiments. The higher the pressure, both positive (compression) and negative (rarefaction), the more likely there can be tissue injury of some kind. Human tissues appear to tolerate higher positive pressure thresholds up to about 15 MPa as long as they are very short pulse durations and low pulse repetition frequencies. On the other hand, negative pressures can be lower, usually not to exceed 4 MPa, to avoid cavitation and the resultant tissue injury in one embodiment. This is particularly true at ultrasound frequencies less than 1 MHz. In several embodiments, cavitation at ultrasound frequencies less than 1 MHz-2 MHz can be avoided with higher positive pressure thresholds up to about 15 MPa with short pulse durations and low pulse repetition frequencies, and/or negative pressures that do not to exceed 4 MPa. However, the present disclosure can include any range that produces the desired therapeutic effect. For example, the peak negative pressure can be between 600 kPa-1.7 MPa for center frequency between 100 kHz-800 kHz to be below FDA limit of MI of 1.9.

In one embodiment, the focal zone for ultrasound treatment can be a three-dimensional space where the ultrasound field is at least ½ the peak spatial-temporal positive pressure (MPa) (e.g., as measured with a hydrophone in a degassed water bath). For example, in one embodiment, when the spatial-temporal peak is 3 MPa then the focal area can be anywhere where the spatial temporal peak is at least 1.5 MPa. For a smaller focus, it is possible to use a concave transducer design that creates a cone shaped field with a focal zone from 1-10 cm^3 in one embodiment. For a larger focus, the device can use a planar design or slightly concave design that creates a columnar or cuboidal shaped field depending on the transducer and can have a focal zone of 20-150 cm^3 in one embodiment. In some embodiments, the device can use a planar design or slightly concave design that creates a columnar or cuboidal shaped field depending on the transducer and can have a focal zone of 20-350 cm^3. In some embodiments, the focal zone can have one of a variety of shapes. The variety of shapes can include spherical, cylindrical, cubic, ellipsoidal, star, or any random shape that provides the necessary coverage of the focal volume.

In one embodiment, the pulse duration of the ultrasound treatment can be as short as 1 microsecond and as long as 1 second, and/or be continuous. In one embodiment, the pulse duration of the ultrasound treatment can be as short as 10 μs and as long as 500 ms, and/or be continuous. For example, in some embodiments, the pulse duration can be in a range of 100 μs-100 ms. Alternatively, in some embodiments, the pulse duration can be in a range of 1 ms-50 ms. In some embodiments, the pulse duration can be in a range of 1 ms-5 ms (e.g., 1, 2, 3, 4, 5 ms and any values and ranges therein). In some embodiments, the pulse duration can be in a range of 1 ms-50 ms (e.g., 1, 2, 3, 4, 5, 6-50 ms and any values and ranges therein). In one embodiment, a pulse duration is several hundred microseconds, as this appears to balance the need for successive positive pressure waves to elicit a response while balancing the time-averaged intensity of the ultrasound beam and the associated tissue heating. The PRF can range from less than 1 Hz to greater than 200 Hz. In some embodiments, the PRF can range from less than 1 Hz to greater than 1 kHz. In several embodiments, the PRF can be in the 1-10 Hz range as this tends to be stimulatory to neurons.

The treatment duration or period can range from less than 1 minute to more than 1 hour (e.g., 1 second, 30 seconds, 1 minute, 2, 3, 5, 8, 9, 10, 11, 12, 15, 20, 25, 30, 35, 40, 45, 50, 55, 60, 70, 80, 90 minutes, 2 hours, 3 hours or more) per day. In one embodiment the treatment duration may be a continuous therapy to be applied throughout the day. In some embodiments, the treatment period can range from between 5 to 30 minutes (e.g., 5, 10, 15, 20, 25, 30 minutes, and any ranges or values therein) per day. In various embodiments, treatment duration can be dictated by the need to achieve the desired effect while being comfortable and usable for the patient.

In one embodiment, when performing successive sessions of noninvasive ultrasound neuromodulation therapy, the energy device is removed from the patient after a session and then reattached to the patient at a later time for more treatment. If the treatment is performed at the patient's home, the patient (or caregiver) is able to position the device in an orientation directed toward the anatomical structure being targeted. The spleen 10 is located behind ribs 6 of the ribcage. Untrained individuals may not know how to locate the target structures in their base or where to locate the treatment device on an exterior surface of the base. To complicate matters, some of the structures targeted for treatment, such as the spleen 10, can move several centimeters with respiration and/or a change in base position. Even with training using external landmarks, like rib counting, it can be hard to accurately locate the spleen. Therefore, improper placement of the energy device can reduce effectiveness of the therapy or produce other undesirable effects. In several embodiments, proper placement of an energy device can improve effectiveness of the therapy and/or produce other desirable effects.

To address these challenges, embodiments of the methods and systems of the present disclosure allow for a trained medical caregiver to locate the spleen (or other targeted nerve area) and locate an area on an exterior of the patient 2 that will be sufficient for applying the therapy. The spleen 10 is typically between 8-12 ribs on the left side of the back of a patient. The caregiver can locate the area on the surface of the patient using any number of methods. For example, the caregiver can feel for the various ribs to identify the area and/or any noninvasive imaging such as X-ray, ultrasound diagnostic equipment, etc. to identify an area for treatment targeting tissue, such as a spleen 10 or a liver.

Figure 2:
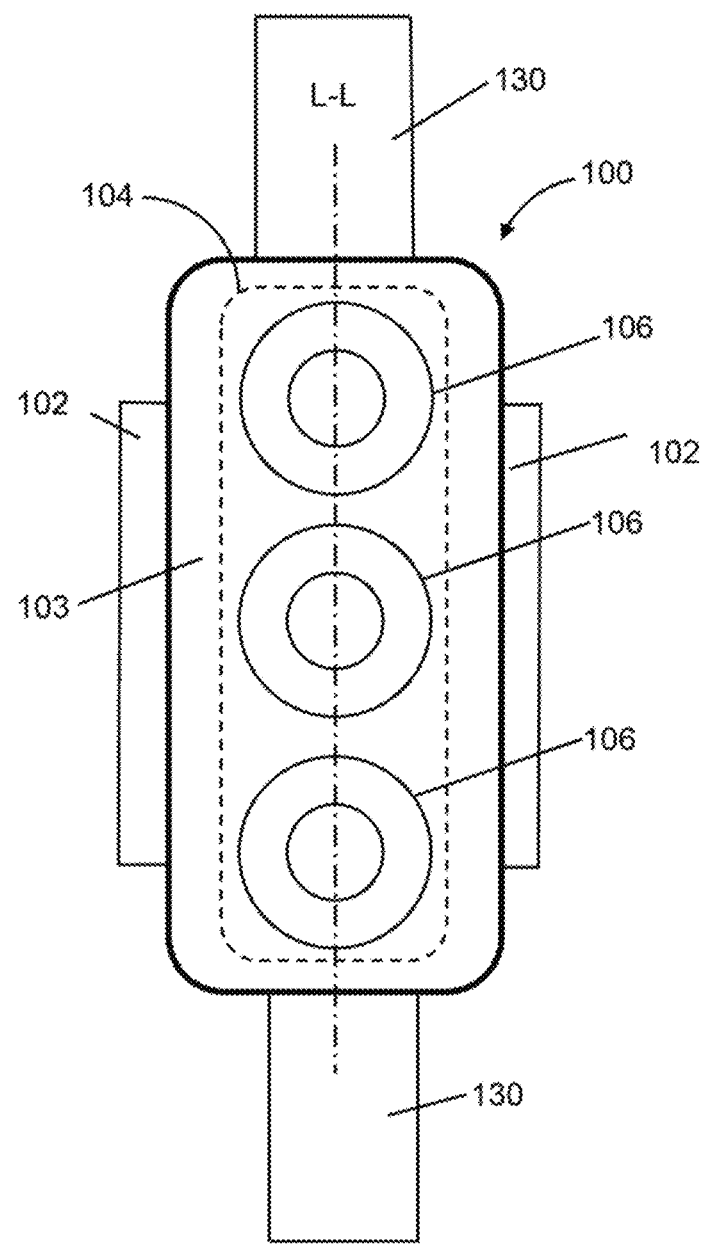
FIG. 2 illustrates an embodiment of a therapy device for transmitting energy to a tissue at a subdermal target site.

In several embodiments, the caregiver can position the device 100 and apply therapeutic treatment to determine proper positioning of the device 100. In one embodiment, once the caregiver identifies an acceptable area on the skin surface of the patient for directing treatment, the caregiver can attach a biocompatible multipurpose indicator 102 on the area on the surface of the patient, as shown in FIG. 2. This multipurpose indicator 102 can include any number of attachment features 104 such as adhesive, tape, and/or suture openings (for temporary suturing of the multipurpose indicator 102 to the individual). Once placed, the multipurpose indicator 102 can provide precise location for treatment that can be visualized by anyone, including the patient.

In several embodiments, the multipurpose indicator 102 is configured for removable attachment to the treatment device 100. In several embodiments, the multipurpose indicator 102 is removably attachable to the treatment device 100 via an interface, such as a mechanical interface (e.g., snap, buckle, lock, etc.) In some embodiments, the multipurpose indicator 102 can comprise an electromagnetic device ("sensing and guidance device") as small as size of two to three stacked pennies, dimes, or quarters. In one embodiment, the multipurpose indicator 102 can be placed on the middle region of the area, such that it sits directly over the hilum of the spleen 10, on the skin. In some embodiments, the multipurpose indicator 102 may include an attachment feature that permits the multipurpose indicator 102 to remain affixed to the patient 2 for up to 90 days (e.g., 1 hour, 1 day, 1 week, 1 month, 60 days, 90 days and any ranges or values therein). It is noted that the caregiver can also temporarily mark the area on the patient's skin on which the multipurpose indicator is placed in one embodiment. The multipurpose indicator 102 can comprise one or more interfaces (such as a mechanical interface such as a snap, lock, attachment), RFID, electrical sensor, and/or a simple magnet in various optional embodiments.

In one embodiment, an energy device 100 configured to provide therapy that can include a base surface 103 with one or more ultrasound transducers 106. In various embodiments, ultrasound transducer 106 may be configured to receive, transmit, and/or receive and transmit ultrasound. The base surface 103 may be coupled to a body fastener 130 (e.g., a strap, belt, elastic band, or other fixation structure, etc.) that is configured to secure the energy device to an exterior of the patient. In various embodiments, the body fastener 130 can include one or more interfaces (e.g., snap, attachment, buckle, adhesive regions, hook-and-loop, magnets, etc.) that allow the device 100 to be secured to a patient. In addition, the energy device 100 is configured to removably attach to a multipurpose indicator 102. The base surface 103 may be configured for attachment at an interface with the multipurpose indicator 102. The multipurpose indicator 102 can be configured to be affixed to an exterior of the patient (e.g., via an adhesive, suture, or other temporary fixation means) and can also be configured to couple to a mating surface on the device 100. In several embodiments, the mating surface is located in the device 100 such that when the device 100 and multipurpose indicator 102 are coupled when the multipurpose indicator is affixed to a patient, the one or more ultrasound transducers 106 on the device 100 are automatically oriented towards a target nerve region within the patient. In one embodiment, the multipurpose indicator 102 can be coupled adjacent to the transducer(s) 106 (e.g., on the fastener 130). In one embodiment, the device comprises a non-imaging therapeutic ultrasound transducer. Some embodiments of the device 100 allow for the mating surface to comprise an opening in the transducer(s) 106 to allow seating of the multipurpose indicator 102 within the opening. In some embodiments, the multipurpose indicator 102 is configured to permit ultrasound energy to pass through to the tissue.

In several embodiments, the energy device 100 includes a controller that controls delivery of energy as described herein. The controller can connect to a display screen that can allow an individual to control the energy delivery device 100. The display screen can include treatment time information and a touch screen to initiate the treatment. The controller may be coupled to the transducer via a cable (e.g., for an ultrasound energy modality). In one embodiment, the controller can control energy delivery wirelessly.

The multipurpose indicator 102 can act as detection mechanism and, in some embodiments, can send a signal to the ultrasound transducer for easy snap and fit of the therapeutic transducer over the electromagnetic device. The sensing and guidance device can also serve two additional purposes. The multipurpose indicator 102 can act as a navigation/guidance tool for accurate identification/landmark of the targeted nerve and assist the user to accurately place the therapeutic device over the target site once the multipurpose indicator is properly positioned. For example, in various embodiments, the multipurpose indicator 102 may be configured for alignment with a spleen, liver, heart, lung, stomach, gall bladder, intestine, bladder, kidney, gland, or other tissue. For example, in various embodiments, the multipurpose indicator 102 may be configured for identification of a spleen, liver, heart, lung, stomach, gall bladder, intestine, bladder, kidney, gland, or other tissue. In several embodiments, the multipurpose indicator 102 may be configured for activation of a device, component, system, kit and/or therapy. In various embodiments, coupling the transducer (or other energy delivery modality) can reduce the chances of (e.g., reduce or prevent) any off-target therapy delivery that might result in lower effectiveness of the therapy or result in the application of energy to an unintended target area.

In one embodiment, the multipurpose indicator 102 can provide a sensing function that allows activation of the therapeutic device 100 only when the multipurpose indicator 102 is properly seated in a receiving area. This receiving area 122 can comprise a pocket, cavity, or other structure that allows a user to confirm positioning of the transducer 120 (or other part of the device 100) with the multipurpose indicator 102, where the multipurpose indicator 102 is previously positioned on the patient to direct energy towards the targeted nerves. In one embodiment, without accurate placement of the therapeutic transducer 120 over the multipurpose indicator 102, the energy device 100 can be configured to not activate or deliver the therapy as a fail-safe mechanism to avoid the user from delivering therapy to unintended targets, such as by wearing the therapeutic device upside down or higher or below the intended area.

In one embodiment, the sensing circuitry installed within the multipurpose indicator 102 can be an RFID circuit or a plain electrical circuit with contact touch points that are electrically charged when connected to the electrical touch points on the therapeutic device. When they come in contact, this can allow for activation of the therapeutic device 100 for delivery of therapy. The multipurpose indicator 102 and/or receiving area 122 may optionally be magnetic (e.g., either or both components can be magnetic) such that the device 100 and/or controller can include a magnetic sensor that determines magnetic coupling of the multipurpose indicator 102 and transducer prior to allowing for activation of the energy device 100.

In one embodiment, a device 100 may include a sensing capability to monitor a respiration cycle of the patient. The spleen can move 1-4 cm with each breath depending on shallow vs. deep breathing. To account for these variations and to help ensure sufficient therapeutic energy is targeted at the targeted nerve when the therapeutic device is placed over the desired area, the transducer 106 can include one or more actuators that allow "steering" of the transducer 106. The system can further include one or more inertial or displacement sensors that can monitor the patient for movement during breathing. For example, the system can be mechanically steered (i.e. moved in an amount distance d and/or angle A) between 1-4 cm in the direction of the spleen movement using the mechanical actuator. Any number of actuators can be installed within the therapeutic device in various embodiments. Moreover, the actuators and/or sensor can optionally relay information back to the controller such that the controller determines movement of the system.

In one embodiment, mechanical steering can occur in sync with the respiration cycle that is detected by a respiration monitor. For example, in one embodiment during inhalation the spleen can move 1-3 cm or 1-4 cm downwards, and therefore the transducer face can be configured to tilt by similar degrees to account for these changes whose direction of movement and intensity of movement will be detected using a standard respiration monitor. In one embodiment, the steering does not necessarily have to be tied to the respiration monitor. A person's typical breathing pattern can be calibrated within the system and programmed to steer the ultrasound transducer face by certain degrees at a set interval based on that pattern in one embodiment.

In various embodiments, methods and systems can be configured to address the problems of "nerve adaptation" that result from treatment. Nerve adaptation can occur when the neuronal activity starts to decay over time in response to repeated stimulation. When this occurs, the nerve response to stimulation can become erratic, diminish, or ceases. This can also occur on the drug side as well, where the patient's base adapts to a drug and efficacy drops. In this scenario, when the user changes the drug or its dose, or in the case of electrical neuromodulation, they can reprogram the stimulation dosing parameters of the device every few weeks to months to new sets of parameters, and the neuronal activity may restore. The reprogramming or dose change may not occur until the patient's symptoms reappear, and can act as a feedback loop to consider changing the dosage in one embodiment.

In one embodiment, employing automatic alternating pulse/burst pattern of the ultrasound parameters may be used to prevent or reduce "nerve adaptation." Each ultrasound transducer within the therapeutic device may be configured to deliver each burst/pulse of stimulation at a different ultrasound center frequency in an incremental stepwise fashion at a fixed or unfixed value in various embodiments. For example, if the ultrasound stimulation is configured to be delivered, but not limited to, between 500-800 kHz center frequency, then the therapeutic device can optionally sweep from 500-800 kHz in steps (e.g., 5, 10, 20, 25, 30, 50, 100 kHz steps, etc.) every other burst. It can cycle through that range or other ranges in incremental steps during the duration of therapy. The step size can be programmable at a fixed or random step rate within the given range. Additionally, each burst duration, pulsed frequency, and intensity can also be made programmable to increase or decrease within a range at a fixed or random rate in various embodiments. For example, the alternation can occur at every burst or every other or every third etc., or after each therapy.

In various embodiments, a pulsing pattern as described above can be achieved using a single wideband therapeutic transducer or using multi-array transducers that are configured at different center frequencies and allowed to delivering alternating pulse/burst pattern within each element as well as across elements. In one embodiment, an added benefit to the above subsequent alternative burst pattern embodiment in the case of a single-element planar transducer is provided. In certain embodiments, when a single-element planar transducer delivers acoustic energy at a fixed center frequency, there can be a high acoustic intensity variation within the near-field N, i.e., field close to the transducer face. The field can have a high number of peaks and nulls of intensity along with the width of the beam, instead of a uniform normal distribution type intensity beam spread that occurs in the far-field as seen in the figure. These peaks and nulls in the near-field can make the ultrasound therapy less effective and potentially unsafe. The alternating pulse/burst pattern can address this issue in the near-field where spatially every point in the beam spread has a more uniform beam intensity spread in one embodiment.

In several embodiments, a signal generator may be configured to output the electrical signal to the transducer that converts that signal to acoustic energy. For example, the generator can output a signal of center frequency that can range from 100 kHz-1 MHz (e.g., 100, 150, 200, 250, 300, 350, 400, 450, 500, 550, 600, 650, 700, 750, 800, 850, 900, 950 kHz, 1 MHz and any values and ranges therein). In some embodiments, the ultrasound treatment frequency can be provided in a range of 500 kHz-1 MHz. The ultrasound treatment frequency may be provided in a frequency sweep in fixed range, such as 100 kHz-2 MHz (e.g., 100, 150, 200, 250, 300, 350, 400, 450, 500, 550, 600, 650, 700, 750, 800, 850, 900, 950 kHz, 1 MHz, 1.2 MHz, 1.4 MHz, 1.5 MHz, 1.6 MHz, 1.8 MHz, 2 MHz, and any values and ranges therein). For example, the generator can output a signal of center frequency that can range from 100 kHz to 60 MHz (e.g., a frequency within the range of 00 kHz-5 MHz, and 30-50 MHz may be effective to depolarize the nerve fibers and generate an action potential with increased efficacy according to some embodiments. Alternatively, the generator can output a signal of center frequency that can range from 100 kHz to 60 MHz (e.g., a frequency within the range of 500 kHz-5 MHz, and 30-50 MHz may be effective to depolarize the nerve fibers and generate an action potential with increased efficacy according to some embodiments. The generator can modulate the output frequency by delivering a burst of pulses with a duration from range of 1 µs to 100 ms and a pulse repetition frequency (PRF) in range of 1 Hz to 3 kHz in one embodiment. The generator can modulate the output frequency by delivering a burst of pulses with a duration from range of 1 ms to 50 ms and a pulse repetition frequency (PRF) in range of 1 Hz to 200 Hz in one embodiment. The power amplifier can be configured to deliver an output signal voltage to deliver an output RMS pressure from the transducer within range of 100 kPa to 15 MPa (e.g., 100, 200, 300, 400, 500, 600, 700, 800, 900 kPa, 1 MPa, 2, 3, 4, 5, 6, 8, 10, 12, 15 MPa and any values and ranges therein). In some embodiments, the power amplifier can be configured to deliver an output signal voltage to deliver an output RMS pressure from the transducer within range of 200 kPa to 2 MPa (e.g., 100, 200, 300, 400, 500, 600, 700, 800, 900 kPa, 1 MPa, 2 MPa and any values and ranges therein). In some embodiments, the positive peak pressure may remain below a mechanical index of 1-3 (e.g., 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0 and any value or range therein) for a given frequency. In some embodiments, the positive peak pressure may remain below a mechanical index of 1.9 (e.g., 1.0, 1.1, 1.2, 1.3, 1.4, 1.5, 1.6, 1.7, 1.8, 1.9, and any value or range therein) for a given frequency. The mechanical index is determined by a ratio of the peak negative pressure (MPa) to the square root of the frequency (MHz). For example, the mechanical index can be determined by dividing the peak negative pressure by the square root of the frequency. In one embodiment, limiting the mechanical index to 1.9 can prevent or reduce cavitation. In several embodiments, a higher intensity results in better nerve excitation. In various embodiments, the device provides peak to peak pressure levels between 600 kPa-1 MPa (e.g., 600, 700, 800, 900 kPa, 1 MPa and any values and ranges therein). In one embodiment, the device provides peak to peak RMS pressure levels between 600 kPa-1 MPa (e.g., 600, 700, 800, 900 kPa, 1 MPa and any values and ranges therein) at a location of the spleen (e.g., hilum, colic surface, gastric surface, posterior extremity, superior margin, anterior extremity, inferior border, renal surface, etc.) The signal generated by the generator can be a continuous sinusoidal pulses of a single frequency in the range of 100 kHz to 50 MHz with a burst duration in range of 1 μs to 100 ms and PRF from 1 Hz to 3 kHz), or a combination of two sinusoidal frequency where one burst of continuous pulses of a one center frequency and output energy followed by another burst of continuous pulses of a different center frequency and output energy with a different duration of burst and PRF in various embodiments. The burst of sinusoidal pulses can have the same symmetrical positive and negative amplitude, or an asymmetrical higher positive peak amplitude with a smaller negative peak amplitude in some embodiments. This asymmetrical waveform can help with reducing the cavitation effect of the therapy.

In several embodiments, one or more sensors may be used to continuously monitor cytokine levels using electrochemical immunosensors or a continuous glucose monitor or a wearable watch/ring that can track heart rate, heart rate variability, and/or sleep patterns. In one embodiment, a sensor strip may be used on the main unit that can be delivered into the blood vessel or interstitial fluid to perform cytokine measurement. In one embodiment, a sensor that is noninvasive and has an immunosensor that can monitor cytokine levels through saliva, urine or sweat. This sensor can be on a wearable or non-wearable device. In one embodiment, a non-wearable version can be configured for the measurement to be performed by placing small quantities of the samples on the immunosensor transducer. These immunosensors devices can optionally use immunochemical reactions that are coupled with appropriate transducer, such as, but not limited to, potentiometric, impedance, conductometric etc., that provide the electrical signal intensity that is correlated to the levels of cytokines. In one embodiment, a wearable sensor that uses optical sensors that emit light of certain wavelength and looking for the amount of reflections of those wavelengths through a detector. Embodiments of this continuous monitoring of cytokine levels can act as a feedback loop to the therapy generator and adjust the stimulation parameters depending on the detection levels of cytokines. In one embodiment, a closed-loop system can be helpful for efficacious treatment and help ensure that the therapy dose levels are adjusted based on the fluctuations of the pro-inflammatory cytokine levels.

In several embodiments, transmitting ultrasound at lower frequencies (e.g., in the kHz range up to 2 MHz, e.g., 20, 40, 60, 80, 100, 200, 300, 400, 500, 600, 700, 800, 900 kHz, 1 MHz, 1.2 MHz, 1.4 MHz, 1.5 MHz, 1.6 MHz, 1.8 MHz, 2 MHz and values and ranges therein) can be used to neuromodulate and/or sonicate subdermal tissue. For example, ultrasound energy transmitted at lower frequencies (e.g., between 20 kHz and 40 kHz) have larger wavelengths that can vibrate and/or agitate the subdermal tissue. The vibration and/or agitation of the subdermal tissue, such as nerves, can treat chronic conditions such as chronic pain or autoimmune diseases such as rheumatoid arthritis. By comparison, transmitting ultrasound at higher frequencies (e.g., in the MHz range) can be used to non-invasively capture images of subdermal anatomical structures. For example, ultrasound energy transmitted at higher frequencies (e.g., between 2 MHz and 18 MHz) have smaller wavelengths and can be used for imaging and/or visualization purposes to make sonograms with finer details.

In several embodiments, pulses of ultrasound energy can reflect off of and/or be absorbed by tissue having different reflection and/or absorption properties. For example, soft tissues (e.g., muscles, fat, blood, vessels, nerves, tendons, and ligaments) can have a lower reflection and/or absorption properties than hard tissues (e.g., bone, cementum, dentin, and enamel). For example, bone in the human base may be a strong reflector of ultrasound and prevent ultrasound from passing into the base efficiently. Accordingly, hard tissues can reflect and/or absorb more ultrasound energy than soft tissue and block ultrasound energy from passing through the hard tissue and reaching the subdermal target site. Thus, the particular location (e.g., translation and rotation) of the therapy device with respect to the patient can impact the quality of energy application to the subdermal target site. For example, energy transmitted from the therapy device may be intercepted by a patient's hard tissue (e.g., the patient's skeletal structure or ribs) which can prevent the energy from reaching the subdermal target site. Additionally, the absorption of ultrasound energy in human tissue can cause an increase in temperature at the bone.

FIG. 2 illustrates an embodiment of a therapy device 100 configured to apply energy to a tissue at a subdermal target site. In some embodiments, the therapy device 100 can be an ultrasound probe configured to transmit ultrasound energy to the patient's spleen. In one embodiment, the therapy device 100 comprises a base surface 103 with one or more ultrasound transducers 106. The base surface 103 may be coupled to a body fastener 130 (e.g., a strap, belt, elastic band, or other or fixation structure, etc.) that is configured to secure the therapy device 100 to an exterior of the patient. In various embodiments, the body fastener 130 can include one or more interfaces (e.g., snap, attachment, buckle, adhesive regions, hook-and-loop, magnets, etc.) that allow the device 100 to be secured to a patient. In addition, the energy device 100 is configured to removably attach to a multipurpose indicator 102. The base surface 103 may be configured for attachment at an interface with the multipurpose indicator 102. The multipurpose indicator 102 can be configured to be affixed to an exterior of the patient (e.g., via an adhesive, suture, or other temporary fixation means) and can also be configured to couple to a mating surface on the device 100. In several embodiments, the mating surface is located on the device 100 such that when the device 100 and multipurpose indicator 102 are coupled when the multipurpose indicator is affixed to a patient, the one or more ultrasound transducers 106 on the device 100 are automatically oriented towards a target nerve region within the patient. In one embodiment, the multipurpose indicator 102 can be coupled adjacent to the transducer(s) 106 (e.g., on the fastener 130). In one embodiment, the device comprises a non-imaging therapeutic ultrasound transducer. Some embodiments of the device 100 allow for the mating surface to comprise an opening in the transducer(s) 106 to allow seating of the multipurpose indicator 102 within the opening. In some embodiments, the multipurpose indicator 102 is configured to permit ultrasound energy to pass through to the tissue. In one embodiment, one or more ultrasound transducers 106 may be an ultrasound array 104. In one embodiment, one or more ultrasound transducers 106 may be a first ultrasound array 104. In various embodiments, ultrasound transducer 106 may be configured to receive, transmit, and/or receive and transmit ultrasound.

The first transducer array 104 can further include one or more first transducers 106. The one or more first transducers 106 of the first transducer array 104 can be configured for transmitting ultrasound energy. In some embodiments, the one or more first transducers 106 of the first transducer array 104 can be therapy transducers. In such embodiments, the first transducer array 104 may be configured to transmit energy to a tissue. The energy can be configured to modulate nerves within the tissue (i.e., neuromodulation and/or sonication). For example, the first transducer array 104 can be configured to transmit ultrasound energy. In some embodiments, the first transducer array 104 may be configured to neuromodulate nerves within the spleen (such as a splenic nerve). In one embodiment, the first transducer array 104 can be configured to neuromodulate the vagus nerve. In various embodiments, ultrasound transducer 106 may be configured to receive, transmit, and/or receive and transmit ultrasound.

In one embodiment, the first transducer array 104 can be disposable. In some embodiments, the first transducer array 104 can be applied to a patient and worn for an extended period of time. For example, in some embodiments, the first transducer array 104 can be worn by a patient between five and ninety days (e.g., 5, 10, 20, 30, 40, 50, 60, 70, 80, 90 days and any values and ranges therein).

The base surface 103 can include a first dimension and a second dimension. The first dimension can be orthogonal to the second dimension. For example, the first dimension can be a longitudinal dimension extending along the lengthwise direction of the base surface 103 and the second dimension can be a transverse dimension extending along the width of the base surface 103. The base surface 103 can further include a central longitudinal axis L-L. The first dimension can be parallel with the central longitudinal axis L-L. In some embodiments, the first dimension may be colinear with the central longitudinal axis L-L.

As shown in FIG. 2, the first transducer 106 can be a therapy ring transducer. For example, the one or more first transducers 106 can be piezoelectric ceramic rings. The one or more first transducers 106 can have a base defined by an outer radius and an inner radius. The one or more first transducers 106 can be longitudinally arranged. In some embodiments, the one or more first transducers 106 may be equidistantly spaced along a common axis. In some embodiments, the first transducers 106 can be fixed transducers. Fixed transducers can be configured to transmit energy in a fixed direction. Fixed transducers can be simple and cheap to manufacture because the transducers do not adjust the direction of energy transmission. Accordingly, disposing the fixed first transducers 106 can be economical. In some embodiments, the first transducers 106 can be variable transducers. Variable transducers can adjust the direction the energy is transmitted. For example, variable first transducers 106 may implement electronic beam steering and/or mechanical steering.

The first transducer array 104 can be disposed on the base surface 103. The therapy device 100 can be configured to engage a patient and transmit energy to a subdermal target site through the skin. For example, the therapy device 100 can be positioned along a patient's torso and activated to transmit energy, such as ultrasound energy, through the skin to the patient's spleen. In some embodiments, one or more of the first transducers 106 can be angled relative to the contact surface 103. For example, one or more of the first transducers 106 can be angled between 5 and 25 degrees with respect to a line from the center of the first transducer 106 perpendicular to the skin, such that the transmitted energy can sonicate the spleen and avoid major obstacles such as the patient's skeletal structure (e.g., ribs).

In some embodiments, the first transducer array 104 can be removably connected to the base surface 103. For example, the first transducer array 104 may be magnetically coupled to the base surface 103 via magnetic pogo pins. Accordingly, the first transducer array 104 can be removably connected to system electronics and disposed of after use with a patient.

In some embodiments, the first transducer array 104 can be configured to sweep across a fixed range of frequencies. In some embodiments, the first transducer array 104 may be configured to sweep across a range of frequencies spanning between 300 kHz and 2 MHz. In some embodiments, the first transducer array 104 may be configured to sweep across a range of frequencies spanning between 100 kHz-2 MHz (e.g., 100, 150, 200, 250, 300, 350, 400, 450, 500, 550, 600, 650, 700, 750, 800, 850, 900, 950 kHz, 1 MHz, 1.2 MHz, 1.4 MHz, 1.5 MHz, 1.6 MHz, 1.8 MHz, 2 MHz, and any values and ranges therein). Sweeping the frequency with a fixed array and fixed diameter elements can shift the natural focus and side lobes of the first transducer array 104. Shifting the natural focus and side lobes of the first transducer array 104 may advantageously produce a more complete modulation directed toward the region of interest and/or subdermal target site. A wider frequency range can help modulate mechanosensitive channels that have a frequency dependence. In some embodiments, energy transmitted from the first transducer array 104 may be transmitted in pulses. For example, the energy may be transmitted according to a pulsing duty cycle and/or pulse train switching between one or more "on" periods and one or more "off" periods. Each burst of energy transmission during the "on" periods may be transmitted at a different frequency. Additionally, the waveforms of the energy transmitted by the first transducer array 104 can be programmable. In some embodiments, the waveforms may be programmable to be asymmetric. In some embodiments, the peak positive and peak negative waveforms may be optimized using input pulse shaping from the electronics system of the therapy device 100. This enables sharper peak negative pressures which can advantageously improve the strain and improve neuromodulation. Accordingly, the ultrasound energy transmitted from the first transducer array 104 can be sufficiently safe to sonicate more uniformly.

The therapy device 100 can be positioned at an approximate target site on the patient's torso corresponding to a subdermal target site. The approximate target site may be identified during prior target site identification step. For example, the patient may have a tag multipurpose indicator applied to their torso indicating a general position of the subdermal target site. The tag multipurpose indicator can be a sticker, an implanted device, a topical marking, and/or any other biocompatible marking device configured to indicate a general targeting position. The tag multipurpose indicator may be used for repeated therapeutic sessions for applying energy to the same subdermal tissue. In some embodiments, the therapy device 100 may be provided to a patient for home use treatment. In such embodiments, the therapy device 100 may be provided to a general anatomical position identified by the tag multipurpose indicator.

Figure 3A:
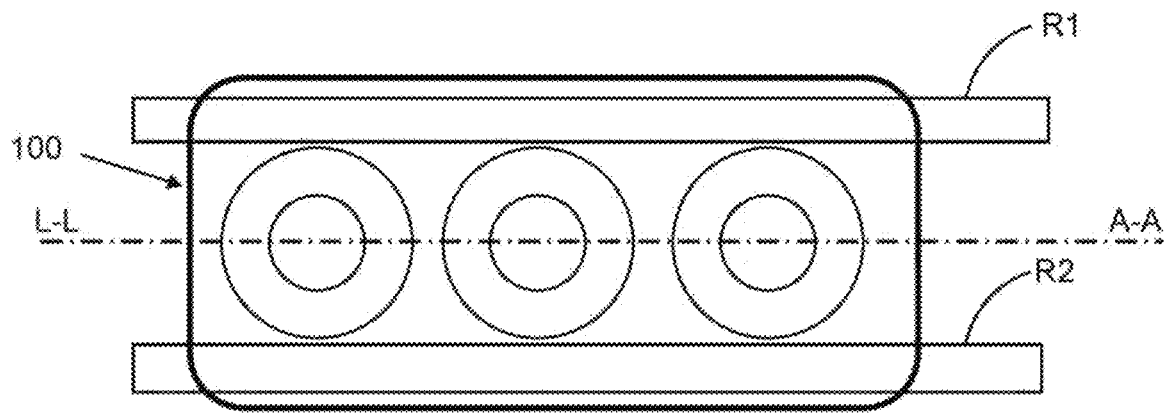
FIGS. 3A-3C illustrates an embodiment of a rotatable therapy device for transmitting energy to the tissue at the subdermal target site between adjacent ribs.
Figure 3B:
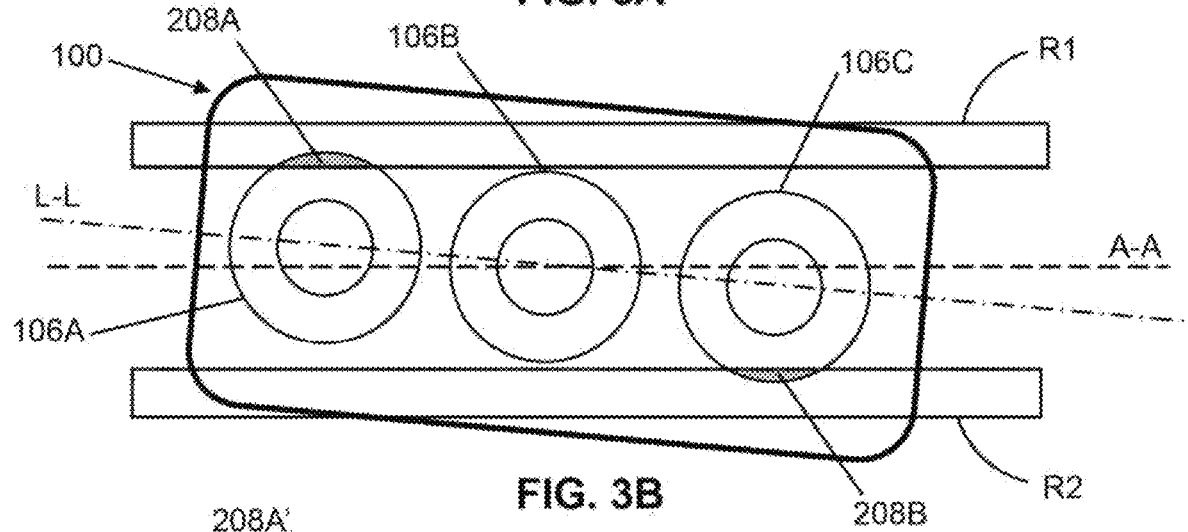
Figure 3C:
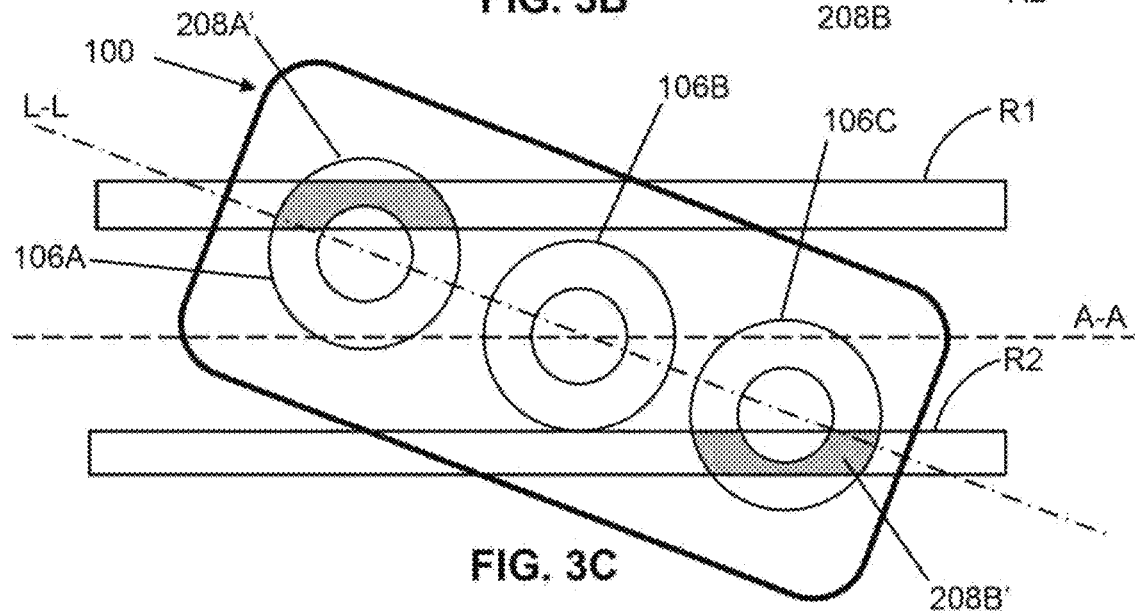

FIGS. 3A-3C illustrate an embodiment of a therapy device 100 with rotational components configured to apply energy to a tissue at a subdermal target site. FIG. 3A illustrates an embodiment of a good or adequate alignment with minimal reflection in which the therapy device 100 is longitudinally oriented between two adjacent ribs R1, R2. In some embodiments, the subdermal target site may be an internal organ positioned within a volume surrounded or proximate a patient's rib cage. For example, the subdermal target site may be the spleen. In such embodiments, the therapy device 100 may be positioned along a patient's torso such that the longitudinal axis L-L of the therapy device 100 extends in parallel with the two adjacent ribs R1, R2. In some embodiments, the longitudinal axis L-L can be colinear with a central axis A-A between the two adjacent ribs R1, R2. In such embodiments, the first transducer array 104 can transmit energy through the patient's skin to the subdermal target site without being intercepted and/or blocked by the patient's skeletal structure (e.g., the two adjacent ribs R1, R2).

FIG. 3B illustrates an embodiment of a slight misalignment with some reflection in which the therapy device 100 is positioned at an angle relative to the central axis A-A between the two adjacent ribs R1, R2. In some embodiments, one or more of the first transducers 106 can overlap with the skeletal structure of the patient. Overlapping the one or more first transducers 106 with the skeletal structure of the patient may result in one or more reflection zones 208 where some of the energy transmitted from the first transducer array 104 can be reflected by the patient's skeletal structure. For example, as shown in FIG. 3B, one or more of the first transducers 106A, 106C can partially overlap with the two adjacent ribs R1, R2 resulting in a first reflection zone 208A and a second reflection zone 208B. In such embodiments, at least a portion of the energy transmitted by the first transducer array 104 can be absorbed and/or blocked by the two adjacent ribs R1, R2 at the reflection zones 208A, 208B and prevent at least the portion of energy from reaching the subdermal target site. FIG. 3B further illustrates one of the first transducers 106B not overlapping with the two adjacent ribs R1, R2. Thus, the energy from the first transducer 106B can be transmitted unimpeded to the subdermal target site.

In some embodiments, the angle of the longitudinal axis L-L relative to the central axis A-A can correlate with the transmission efficiency of the energy from the first transducer array 104 to the target site. For example, FIG. 3C illustrates an embodiment of bad or inadequate alignment with strong reflection in which the therapy device 100 is positioned at an angle relative to the central axis A-A between the two adjacent ribs R1, R2 greater than that shown in FIG. 3B. As further shown in FIG. 3C, a greater portion of the one or more first transducers 106A, 106C can overlap with the two adjacent ribs R1, R2 resulting in larger corresponding reflection zones 208A', 208B' thereby further impeding more of the transmission of energy from the first transducer array 104 to the target site. In one embodiment, a lateral and/or longitudinal displacement of the longitudinal axis L-L from the central axis A-A can correlate with the transmission efficiency of the energy from the first transducer array 104 to the subdermal target site.

FIGS. 4 and 5A-5C illustrate an embodiment of a therapy device 300 for transmitting energy to a subdermal target site. In some embodiments, the therapy device 300 can be an ultrasound probe configured to transmit and receive ultrasound energy. The therapy device 300 can include the base surface 103, the first transducer array 104, and a second transducer array 310. Accordingly, the therapy device 300 can have the same or similar components as the therapy device 100, also having the addition of the second transducer array 310. The therapy device 300 can be used for bone detection to aid in properly locating (e.g., translating and/or rotating) the therapy device 300. In some embodiments, the first transducer array 104 can include variable transducers to adjust the direction the energy is transmitted to avoid the skeletal structure of the patient.

In one embodiment, the second transducer array 310 can be disposable. In some embodiments, the second transducer array 310 can be applied to a patient and worn for an extended period of time. For example, in some embodiments the second transducer array 310 can be worn by a patient between five and ninety days or up to three months at a time. The second transducer array 310 can further include one or more second transducers 312. The one or more second transducers 312 of the second transducer array 310 can be configured for transmitting energy. In some embodiments, the one or more second transducers 312 of the second transducer array 310 can be sensing transducers. In such embodiments, the second transducer array 310 may be configured to transmit and receive energy to detect hard tissue. For example, the second transducer array 310 can be configured to transmit and receive ultrasound energy. In some embodiments, the second transducer array 310 can provide visual images of the detected anatomy. In some embodiments, the second transducer array 310 can provide detection information to a control system.

Figure 4:
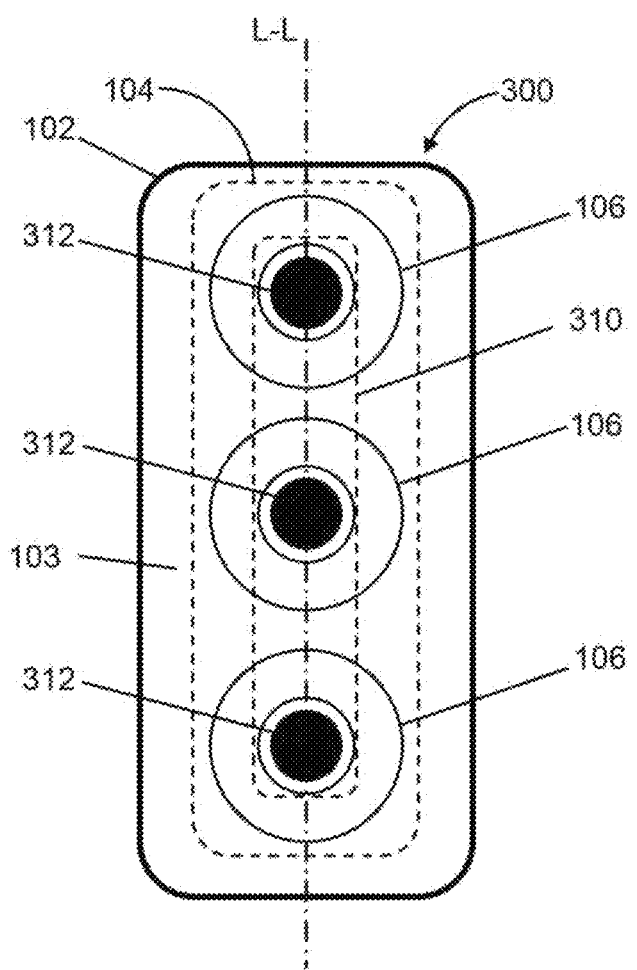
FIG. 4 illustrates an embodiment of a therapy device for transmitting energy to a tissue at a subdermal target site and detecting bone.

In some embodiments, as shown in FIG. 4, the one or more second transducers 312 can be arranged in a first arrangement. The first arrangement may be a linear arranged along a longitudinal axis. The longitudinal axis of the one or more second transducers 312 can be parallel with the axis L-L. In some embodiments, the longitudinal axis of the one or more second transducers 312 can be co-linear with the L-L axis, as shown in FIG. 4. In some embodiments, the one or more second transducers 312 may be equidistantly spaced along a common axis. Furthermore, the one or more second transducers 312 can be aligned with the first transducer array 104. For example, the second transducers 312 can be positioned within the inner radius of a corresponding first ring transducer. In one embodiment, the one or more second transducers 312 can be smaller higher frequency transducers than the first transducers 106. In some embodiments, the second transducers 312 can be fixed transducers as described above. In some embodiments, the second transducers 312 can be variable transducers as described above. Fixed second transducers 312 may be configured to detect the presence of hard tissue (such as bone) in a fixed direction relative to the second transducer array 310.

The second transducer array 310 in the first arrangement may be configured to monitor or detect the reflection intensity in the near field. A strong reflection from any given second transducer 312 can indicate that it partially or fully covers a rib, e.g., R1, R2.

The second transducer array 310 can be disposed within the base surface 103. In one embodiment, the second transducer array 310 can be at least partially disposed on and/or within the contact surface 103 of the base surface 103. The therapy device 300 can be configured to engage a patient, detect the presence of hard tissue for therapy device alignment, and transmit energy to a subdermal target site through the skin. In some embodiments, the second transducer array 310 can be removably connected to the base surface 103. For example, the second transducer array 310 may be magnetically coupled to the base surface 103. In one embodiment, the second transducer array 310 may be coupled to the base surface 103 via pogo pins. Accordingly, the second transducer array 310 can be removably connected to system electronics and disposed of after use with a patient.

In some embodiments, the therapy device 300 may include additional features to indicate to an operator whether the therapy device 300 is properly aligned with respect to the patient's skeletal structure. For example, the therapy device 300 can include one or more feedback systems. The one or more feedback systems can be configured to verify device placement and alignment and to confirm therapeutic dose and efficacy.

In some embodiments, the therapy device 300 may include one or more mechanical feedback systems, such as audio, visual, or haptics, alone or in combination, to guide the operator to an aligned position. In some embodiments, the therapy device 300 may include one or more electromechanical feedback systems to guide the operator to an aligned position. The one or more electro-/mechanical feedback systems can be configured to verify device placement and alignment. For example, the therapy device 300 can provide auditory instructions such as "move left/right and/or up/down" and/or "rotate clockwise/counterclockwise." Additionally and/or alternatively, the therapy device 300 can provide visual signals such as text messages displayed on a display and/or light indicators such as indicating the direction to move. The light indicators could be a light on the therapy device 300 or on an associated control box. Furthermore, the therapy device 300 can provide vibrations or other sensations to guide the user. In some embodiments, the therapy device 300 may prevent the first transducer array 104 from transmitting energy if the second transducer array 310 detects the presence of hard tissue.

In several embodiments, the one or more electro-mechanical feedback systems can be configured to detect and track anatomical features. As described herein with respect to FIG. 4, the therapy device 300 can include ultrasound-based mechanisms, such as the one or more first transducers 106 and/or second transducers 312, to detect anatomical features. For example, the ultrasound-based mechanisms can transmit and receive energy to detect hard tissue such as ribs, bone interfaces, or other relevant tissue landmarks, such as air pockets (e.g., in stomach or lungs) in the treatment region. By analyzing reflected ultrasound signals from these structures, the electro-mechanical feedback system can confirm that the therapy device 300 is positioned accurately relative to the target site. For example, when targeting internal organs (e.g., the spleen or the liver or other organs), the therapy device 300 may detect echoes from adjacent structures like the ribs and compare the feedback to an initial or other calibration performed in the physician's office. Accordingly, the therapy device 300 can ensure the transducer is aligned with the intended treatment site. Furthermore, the therapy device 300 can monitor the position of the target site before, during, and/or after the therapy session and over time. Regular tracking of the target site can be compared against initial calibration settings. If there is significant misalignment from initial calibration, the therapy device 300 may inform the patient to re-calibrate the therapy device 300. For example, the therapy device 300 may inform the patient to visit a physician to re-calibrate the therapy device 300. Additionally, the mechanical feedback system can be used to monitor how the placement of the therapy device may shift over time. Accordingly, the therapy device 300 can track placement and alignment over time to ensure there is sufficient repeatability in proper placement of the device by the patient.

In some embodiments, the therapy device 300 can further include a hybrid tracking system. The hybrid tracking system can further ensure accuracy of the alignment of the one or more first transducers 106 with the target tissue. In such embodiments, the therapy device 300 can include an electromagnetic (EM) and/or optical tracking system. These systems can provide continuous real-time feedback on the position of the therapy device 300 relative to external markers and/or the patient's anatomy. The hybrid tracking system can help maintain consistent positioning throughout treatment. Additionally, the hybrid tracking system can compensate for patient movements.

In some embodiments, the therapy device 300 can further include one or more physiological feedback systems. The one or more physiological feedback systems can be configured to confirm therapeutic dose and efficacy. The one or more physiological feedback systems can monitor physiological changes in the patient. For example, the one or more physiological feedback systems may be configured to monitor blood flow, monitor thermal signatures, detect cavitation, implement acoustic radiation force imaging, and/or monitor physiological responses.

The therapy device 300 can be configured to monitor blood flow with Doppler ultrasound. As described herein with respect to FIG. 4, the therapy device 300 can include ultrasound-based mechanisms, such as the one or more second transducers 312, to transmit and receive energy. In some embodiments, the one or more second transducers 312 can be configured to monitor changes in blood flow within the target site. Continuous-wave Doppler or pulsed-wave Doppler can quantify the magnitude and velocity of blood flow in the treated tissue, serving as a proxy for therapeutic efficacy. For example, an increase in blood flow can indicate that the therapy device 300 is affecting the target tissue as intended.

The therapy device 300 can be configured to monitor thermal signatures of the patient. In some embodiments, the therapy device 300 can include one or more thermal sensors or ultrasound-based thermometry. As described herein, ultrasound energy can induce localized heating. The one or more thermal sensors or ultrasound-based thermometry can be configured to monitor temperature changes in the patient's tissue to ensure that the delivered dose is within therapeutic thresholds. Accordingly, the therapy device 300 can continuously monitor the temperature in the patient's tissue. In some embodiments, the therapy device 300 can adjust the output of ultrasound energy in response to temperature changes in the patient's tissue. For example, the therapy device 300 may continuously adjust the output of ultrasound energy emitted from the one or more first ultrasound transducers 106 and/or the one or more second transducers 312 in response to the real time temperature readings of the one or more thermal sensors.

The therapy device 300 can be configured to monitor cavitation, or formation and collapse of microbubbles, in the patient. In some embodiments, the therapy device 300 can include one or more cavitation detectors. The one or more cavitation detectors can be configured to detect vibrations, pressure fluctuations, and/or acoustics. Stable or inertial cavitation events can provide continuous real-time feedback on whether the ultrasound energy is reaching and impacting the target tissue as desired. Accordingly, monitoring cavitation can further confirm whether the target site is being treated as desired.

The therapy device 300 can be configured to measure the displacement of tissue in response to ultrasound energy. For example, the therapy device 300 can include an acoustic radiation force imaging (ARFI) device. As described herein, the therapy device 300 includes one or more first ultrasound transducers 106 and one or more second transducers 312. The transducers can emit ultrasound energy. The emitted ultrasound energy can create localized tissue displacements. The ARFI device can evaluate the speed of wave propagation through the target tissue. Accordingly, measuring the displacement of tissue in response to ultrasound energy can further confirm whether the target site is receiving sufficient energy to induce the desired therapeutic effect.

The therapy device 300 can be configured to monitor the cardiac system of the patient over time. For example, the therapy device 300 can include a separate heart monitor configured to detect the heart's rhythm. Accordingly, the therapy device 300 can monitor and track heart rate to determine heart rate variability (i.e., the variation in time between heartbeats) and/or glucose. In some embodiments, applying ultrasound energy to the patient may regulate the patient's immune response and induce an anti-inflammatory effect. Regulating the patient's immune response and inducing the anti-inflammatory effect may increase the patient's heart rate variability (i.e., increase the time between heartbeats). Accordingly, increasing the patient's heart rate variability may reduce the patient's heart rate. The therapy device 300 can monitor the change in the patient's heart rate variability over time and after successive treatment sessions during the course of the treatment period. Monitoring heart rate and heart rate variability across multiple treatment sessions can further confirm whether the target site is being treated as desired.

The one or more physiological feedback systems can address existing challenges in ultrasound therapies including temperature.

In some embodiments, the therapy device 300 can include both one or more mechanical feedback systems and one or more physiological feedback systems. In such embodiments, the therapy device 300 can ensure correct placement and instantaneous dose verification. For example, the one or more mechanical feedback systems can ensure that the device is consistently aligned with the anatomical target and the one or more physiological feedback systems can ensure that the administered therapeutic dose achieves the desired outcomes. In such embodiments, the therapy device 300 can provide clinicians, physicians, and patients with real-time feedback mechanisms that reduce the risk of misalignment or ineffective treatment.

Figure 5A:
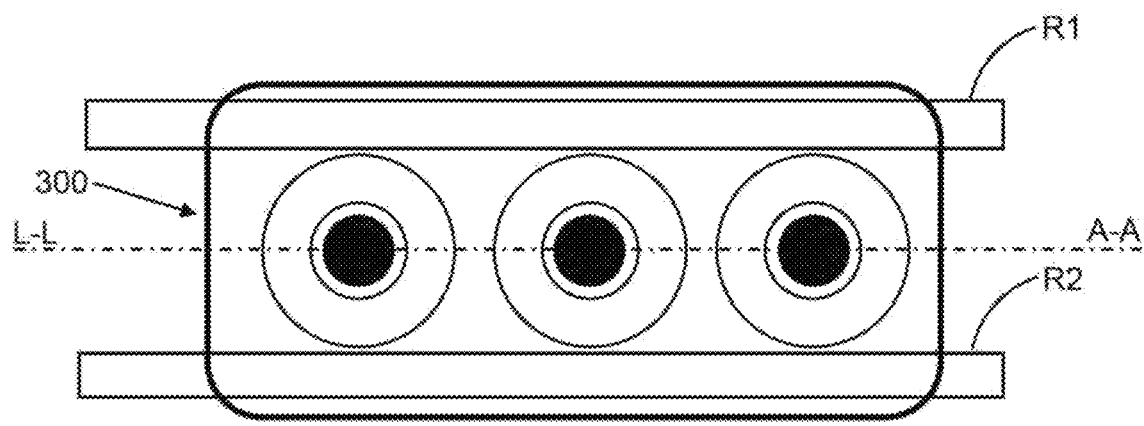
FIGS. 5A-5C illustrate the therapy device of FIG. 4 for transmitting energy to the tissue at the subdermal target site between adjacent ribs and detecting an alignment between the adjacent ribs.

FIG. 5A illustrates an embodiment of a good or adequate alignment with minimal reflection in which the therapy device 300 is longitudinally oriented between two adjacent ribs R1, R2. In such embodiments, the therapy device 300 may be positioned along a patient's torso such that the longitudinal axis L-L of the therapy device 300 extends in parallel with the two adjacent ribs R1, R2. In some embodiments, the longitudinal axis L-L can be colinear with a central axis A-A between the two adjacent ribs R1, R2. In such embodiments, the second transducer array 310 can transmit energy through the skin. The second transducer array 310 may not detect the presence of the hard tissue in the embodiment shown in FIG. 5A because the second transducer array 310 does not overlap with the skeletal structure of the patient. Accordingly, the first transducer array 104 can transmit energy through the patient's skin to a subdermal target site without being intercepted and/or blocked by the patient's skeletal structure (e.g., the two adjacent ribs R1, R2).

Figure 5B:
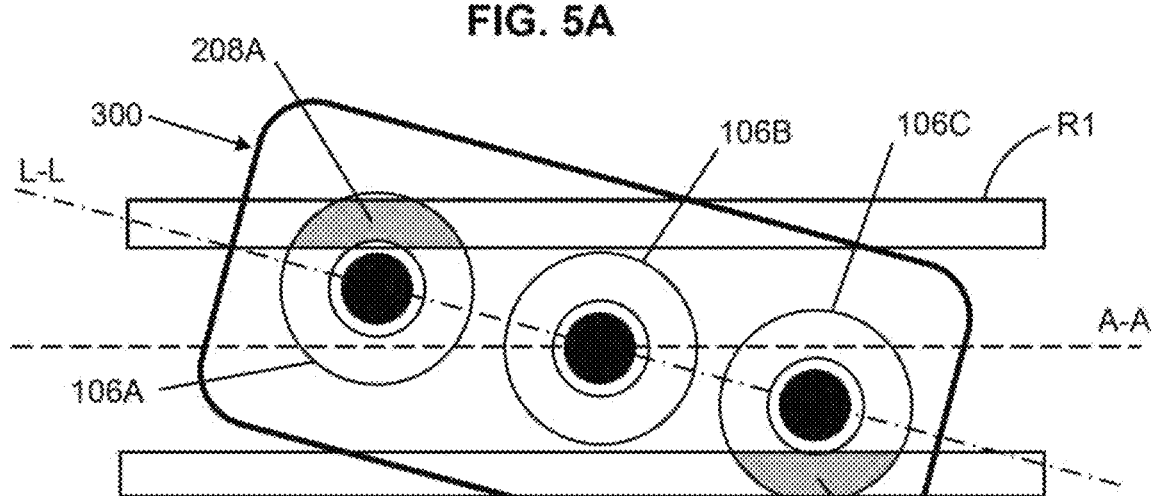

FIG. 5B illustrates an embodiment of a slight misalignment with some reflection in which the therapy device 300 is positioned at an angle relative to the central axis A-A between the two adjacent ribs R1, R2. In some embodiments, one or more of the first transducers 106 can overlap with the skeletal structure of the patient. Overlapping the one or more first transducers 106 with the skeletal structure of the patient may result in one or more reflection zones 208 where energy transmitted from the first transducer array 104 can be reflected by the patient's skeletal structure. For example, as shown in FIG. 5B, one or more of the first transducers 106A, 106C can partially overlap with the two adjacent ribs R1, R2 resulting in a first reflection zone 208A and a second reflection zone 208B. In such embodiments, at least a portion of the energy transmitted by the first transducer array 104 can be reflected by the two adjacent ribs R1, R2 at the reflection zones 208A, 208B and prevent at least the portion of energy from reaching a target site. FIG. 5B further illustrates one of the first transducers 106B not overlapping with the two adjacent ribs R1, R2. Thus, the energy from the first transducer 106B can be transmitted unimpeded to the target site.

Figure 5C:
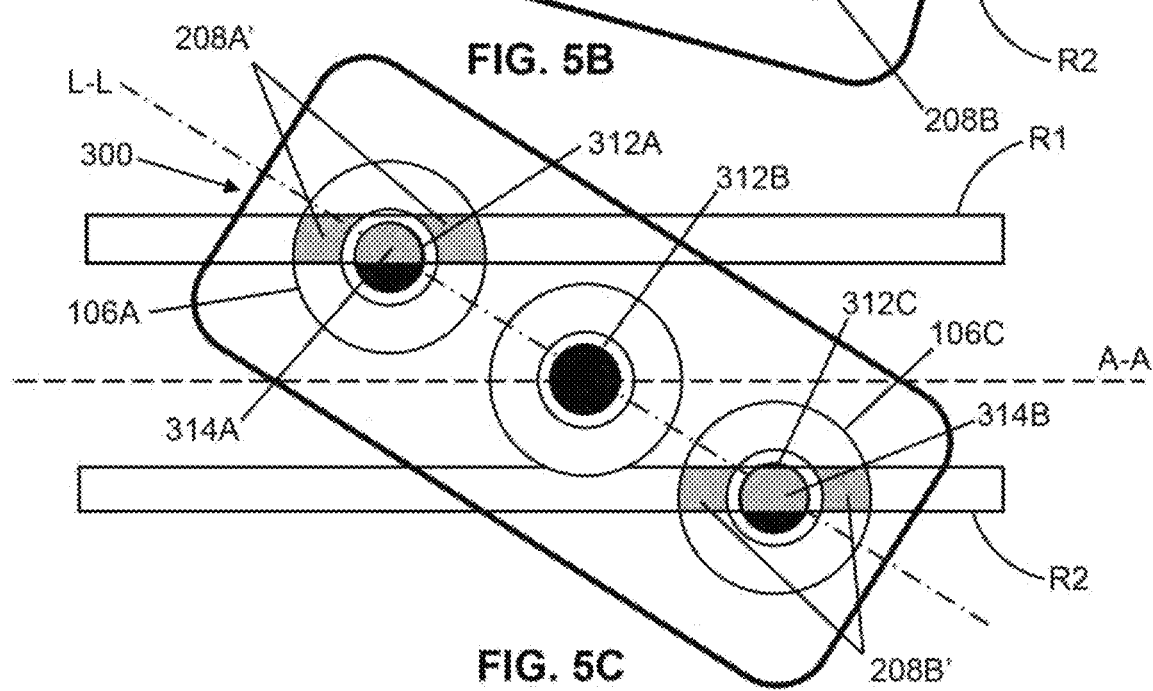

FIG. 5C illustrates an embodiment of bad or inadequate alignment with strong reflection in which the therapy device 300 is positioned at an angle relative to the central axis A-A between the two adjacent ribs R1, R2 greater than that shown in FIG. 5B. As further shown in FIG. 5C, one or more of the second transducers 312 can overlap with the skeletal structure of the patient. Overlapping the one or more second transducers 312 with the skeletal structure of the patient may result in one or more detection zones 314 where energy transmitted from the second transducer array 310 is reflected and/or blocked by the two adjacent ribs R1, R2 and detected by the second transducer array 310. A detection of hard tissue, such as the two adjacent ribs R1, R2, can indicate that the therapy device 300 is not aligned between the two adjacent ribs R1, R2 and that the transmission of energy from the first transducer array 104 may be at least partially impeded. In some embodiments, the therapy device 300 can provide a signal to an operator to adjust the orientation and/or alignment of the therapy device 300.

FIGS. 6 and 7A-7C show an embodiment of a therapy device 500 for transmitting energy to a subdermal target site. In some embodiments, the therapy device 500 can be an ultrasound probe configured to transmit and receive ultrasound energy. The therapy device 500 can include the base surface 103, the first transducer array 104, and a second transducer array 510. Accordingly, the therapy device 500 can be the same or similar to the therapy device 100, with the addition of the second transducer array 510.

Figure 6:
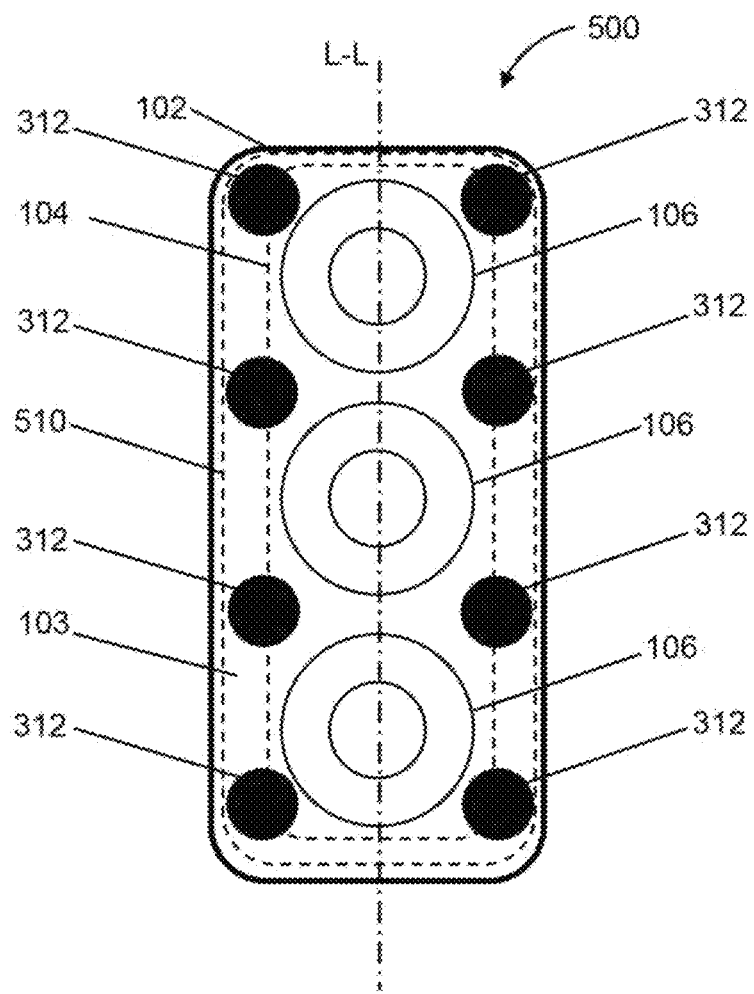
FIG. 6 illustrates an embodiment of a therapy device for transmitting energy to a tissue at a subdermal target site and detecting bone.

The second transducer array 510 can further include one or more second transducers 312. In some embodiments, as shown in FIG. 6, the one or more second transducers 312 can be arranged in a second arrangement. The second transducer array 510 in the second arrangement may be configured for higher resolution in time and space. The one or more second transducers 312 can be strategically placed to ensure ribs R1, R2 do not block the one or more first transducers 106. The second arrangement may be in an "n" by "m" matrix having "n" number of columns and "m" number of rows. In some embodiments, the second arrangement may be a 2 by 4 matrix having two rows of four second transducers 312. In various embodiments, n and/or m may be 1, 2, 3, 4, 5, 6, 7, 8, 9, 10 or more transducers. The rows may extend in parallel with the longitudinal axis L-L. As shown in FIGS. 6 and 7A-7C, the second transducer array 510 can include two sets of linearly arranged second transducers 312. The second transducer array 510 can advantageously scan for reflection on either side of first transducer array 104.

In various embodiments, the one or more second transducers 312 may be equidistantly spaced along one or more common axes. For example, the one or more second transducers 312 may be arranged along two parallel axes. Furthermore, the one or more second transducers 312 can be around the first transducer array 104. For example, the second transducers 312 can be positioned laterally of a corresponding first transducer 106. In some embodiments, each first transducer 106 can be surrounded by four second transducers 312. For example, two second transducers 312 may be positioned on an upper side of the first transducer 106 and two second transducers 312 may be positioned on a lower side of the first transducer 106, as shown in FIG. 6. The second transducer array 510 can be positioned laterally of the first transducer array 104 to detect two adjacent ribs R1, R2. In some embodiments, the therapy device 500 can detect an alignment of the first transducer array 104 when the second transducers 312 of the second transducer array 510 detects hard tissue.

The second transducer array 510 can be disposed on the base surface 103. The therapy device 500 can be configured to engage a multipurpose indicator 102 and/or a patient, detect the presence of hard tissue for system alignment, and transmit energy to a subdermal target site through the skin.

In some embodiments, the therapy device 500 may include additional features to indicate to an operator whether the therapy device 500 is properly aligned with respect to the patient's skeletal structure. For example, the therapy device 500 may include feedback, such as audio, visual, or haptics, alone or in combination, to guide the operator to an aligned position as described above. In some embodiments, the therapy device 500 may prevent the first transducer array 104 from transmitting energy if the second transducer array 510 detects the presence of hard tissue.

Figure 7A:
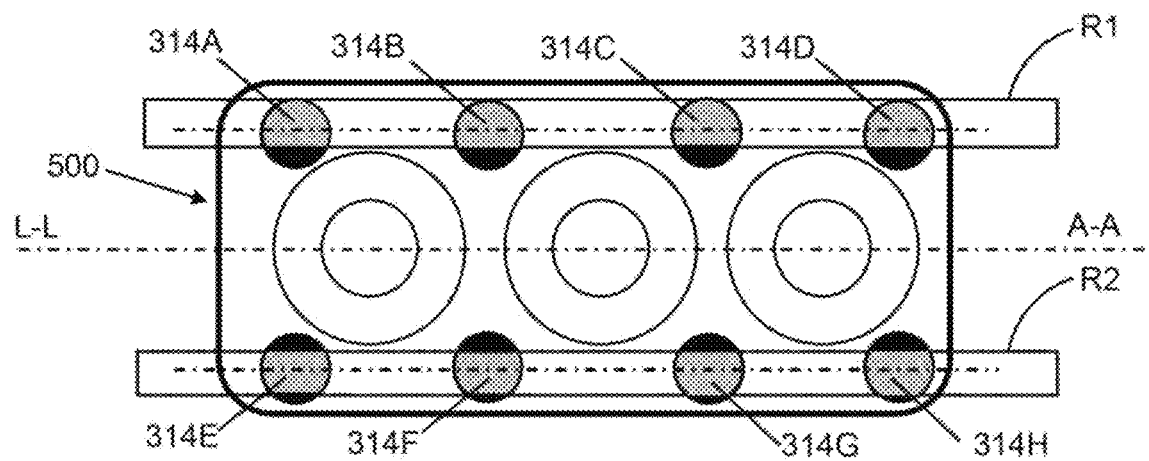
FIGS. 7A-7C illustrate the therapy device of FIG. 6 for transmitting energy to the tissue at the subdermal target site between adjacent ribs and detecting an alignment between the adjacent ribs.

FIG. 7A illustrates an embodiment of a good or adequate alignment with strong reflection in which the therapy device 500 is longitudinally oriented between two adjacent ribs R1, R2. In such embodiments, the therapy device 500 may be positioned along a patient's back such that the longitudinal axis L-L of the therapy device 500 extends in parallel with the two adjacent ribs R1, R2. In some embodiments, the longitudinal axis L-L can be colinear with a central axis A-A between the two adjacent ribs R1, R2. In such embodiments, the second transducer array 510 can transmit energy through the skin. Overlapping the one or more second transducers 312 with the skeletal structure of the patient may result in one or more detection zones 314 where energy transmitted from the second transducer array 510 is reflected and/or blocked by the two adjacent ribs R1, R2 and detected by the second transducer array 510. In some embodiments, the therapy device 500 can detect an alignment with the two adjacent ribs R1, R2 by comparing the corresponding sizes of the detection zones 314. A greater correlation of the sizes of the one or more detection zones 314 may correspond to an alignment of the therapy device 500 with the two adjacent ribs R1, R2. For example, as shown in FIG. 7A, the one or more detection zones 314A-D aligned along a first side of the first transducers 106 can be approximately the same size and the one or more detection zones 314E-H aligned along a second side of the first transducers 106 can be approximately the same size. Thus, the therapy device 500 can detect an alignment of the first transducer array 104 between the two adjacent ribs R1, R2. Accordingly, the first transducer array 104 can transmit energy through the patient's skin to a subdermal target site without being intercepted and/or blocked by the patient's skeletal structure (e.g., the two adjacent ribs R1, R2) when all of the second transducers 312 detect a corresponding detection zone 314.

Figure 7B:
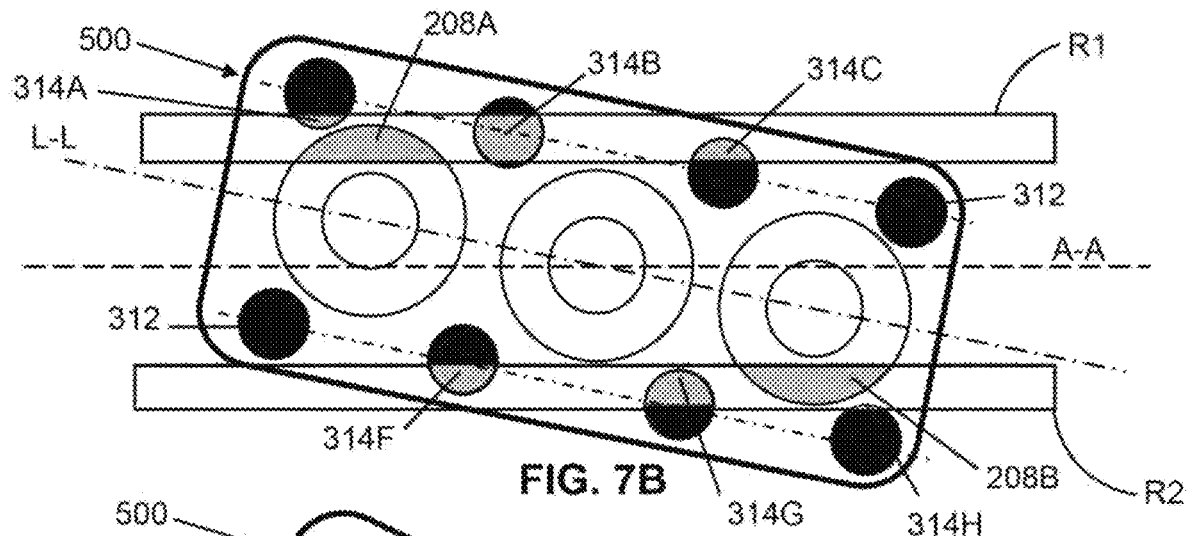

FIG. 7B illustrates an embodiment of a slight misalignment with some reflection in which the therapy device 500 is positioned at an angle relative to the central axis A-A between the two adjacent ribs R1, R2. In some embodiments, one or more of the first transducers 106 can overlap with the skeletal structure of the patient. Overlapping the one or more first transducers 106 with the skeletal structure of the patient may result in one or more reflection zones 208 where energy transmitted from the first transducer array 104 can be reflected by the patient's skeletal structure. For example, as shown in FIG. 7B, one or more of the first transducers 106A, 106C can partially overlap with the two adjacent ribs R1, R2 resulting in a first reflection zone 208A and a second reflection zone 208B. In such embodiments, at least a portion of the energy transmitted by the first transducer array 104 can be reflected by the two adjacent ribs R1, R2 at the reflection zones 208A, 208B and prevent at least the portion of energy from reaching a target site. FIG. 7B further illustrates at least one second transducer 312 not overlapping the skeletal structure of the patient. As described above, the therapy device 500 can detect an alignment with the two adjacent ribs R1, R2 by comparing the corresponding sizes of the detection zones 314. As shown in FIG. 7B, the one or more detection zones 314A-C aligned along a first side of the first transducers 106 do not have the same size and the one or more detection zones 314F-H aligned along a second side of the first transducers 106 do not have the same size. Thus, the therapy device 500 can detect a misalignment of the first transducer array 104 between the two adjacent ribs R1, R2. Additionally and/or alternatively, the therapy device 500 can detect a misalignment with the two adjacent ribs R1, R2 based on whether a corresponding detection zone 314 exists. For example, FIG. 7B illustrates two second transducers 312 without a detection zone 314. A lack of a detection zone 314 by at least one of the second transducers can indicate that the therapy device 500 is not aligned between the two adjacent ribs R1, R2 and that the transmission of energy from the first transducer array 104 may be at least partially impeded.

Figure 7C:
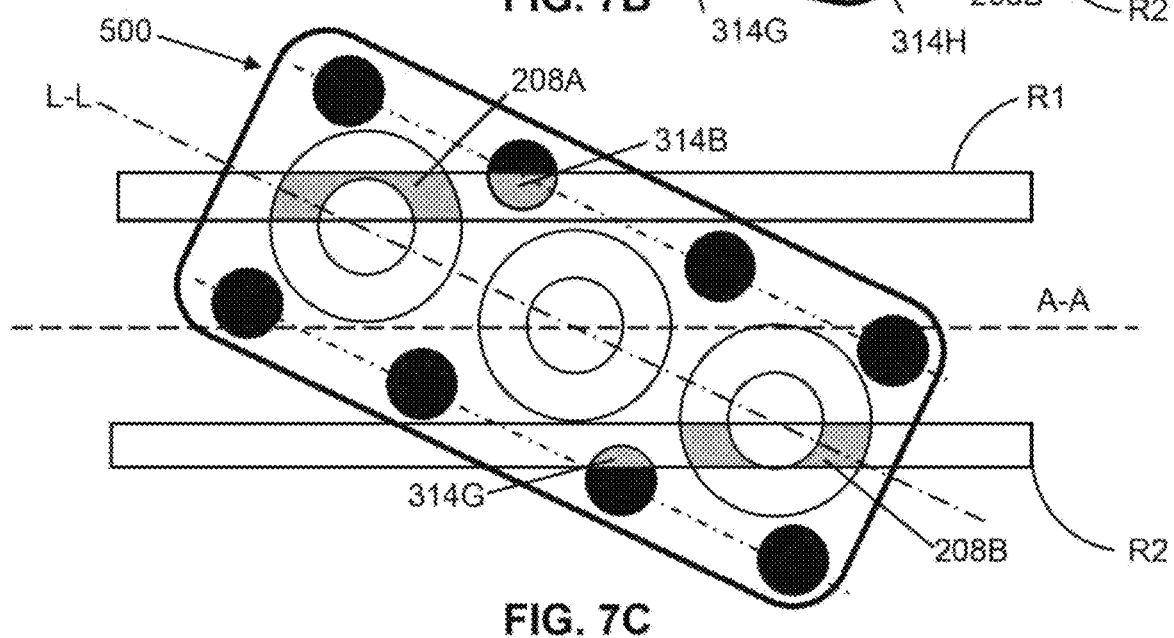

FIG. 7C illustrates an embodiment of bad or inadequate alignment with minimal and/or missing reflection in which the therapy device 500 is positioned at an angle relative to the central axis A-A between the two adjacent ribs R1, R2 greater than that shown in FIG. 7B. As further shown in FIG. 7C, a greater plurality of the second transducers 312 may not overlap with the skeletal structure of the patient compared to FIG. 7B. Accordingly, the one more detection zones 314B aligned along the first side of the first transducers 106 do not have the same size and the one or more detection zones 314G aligned along the second side of the first transducers 106 do not have the same size. Additionally and/or alternatively, fewer detection zones 314 exist. Accordingly, the therapy device 500 can detect that the therapy device 500 is misaligned with the two adjacent ribs R1, R2. In some embodiments, the therapy device 500 can provide a signal to an operator to adjust the orientation and/or alignment of the therapy device 500.

Figure 8:
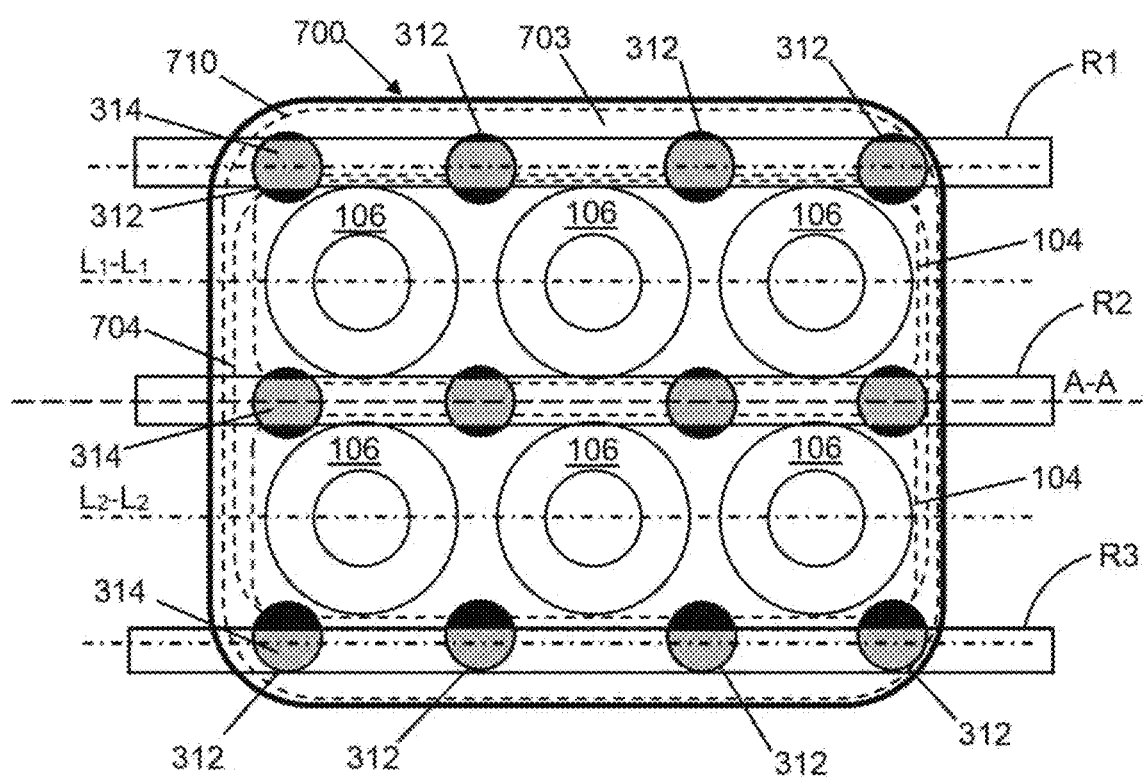
FIG. 8 illustrates an embodiment of a therapy device for transmitting energy to a tissue and detecting bone.

FIG. 8 shows an embodiment of a therapy device 700 for transmitting energy to a subdermal target site. In some embodiments, the therapy device 700 can be an ultrasound probe configured to transmit and receive ultrasound energy.

The therapy device 700 can include a base surface 702, a first transducer array 704, and a second transducer array 710. The therapy device 700 can be configured for transmitting energy through two adjacent intercostal spaces between three adjacent ribs R1, R2, R3. FIG. 8 also illustrates that features of the therapy devices 100, 300, 500 can be extended to include different configurations of first transducer arrays and/or second transducer arrays in some embodiments.

In one embodiment, the base surface 702 is substantially similar to the base surface 103 described herein. The base surface 702 can be larger than the base surface 103 to accommodate more transducers. In some embodiments, the base surface 702 can have the same first dimension as the base surface 103. In some embodiments, the base surface 702 can have a second dimension twice that of the second dimension of the base surface 103. Accordingly, the base 702 may be sized to include two first transducer arrays 104.

In one embodiment, the base surface 702 can further include a first longitudinal axis $L_1$-$L_1$ and a second longitudinal axis $L_2$-$L_2$. The first dimension can be parallel with the first and second longitudinal axes $L_1$-$L_1$, $L_2$-$L_2$.

The first transducer array 704 can include one or more first transducers 106 in several embodiments. For example, the first transducer array 704 may be the same or have similar features to the first transducer array 104 described above. For example, the first transducer array 704 can include two sets of the first transducer array 104. A first set of the first transducer array 104 can be arranged about the first longitudinal axis $L_1$-$L_1$ and a second set of the first transducer array 104 can be arranged about the second longitudinal axis $L_2$-$L_2$.

The second transducer array 710 can include one or more second transducers 312. In some embodiments, as shown in FIG. 8, the one or more second transducers 312 can be arranged in a third arrangement. The third arrangement may be similar to the second arrangement and can be strategically placed to ensure the ribs R1, R2, R3 are not blocking the one or more first transducers 106. As shown in FIG. 8, the first transducer array 704 can position the one or more first transducers 106 on two sides of a rib R2.

In some embodiments, the therapy device 700 may include additional features to indicate to an operator whether the therapy device 700 is properly aligned with respect to the patient's skeletal structure. For example, the therapy device 700 may include feedback, such as audio, visual, or haptics, alone or in combination, to guide the operator to an aligned position as described above. In some embodiments, the therapy device 700 may prevent the first transducer array 104 from transmitting energy if the second transducer array 510 detects the presence of hard tissue.

In some embodiments, an echo response of the ultrasound energy transmitted from the second transducer array 310, 410, 710 from the ribs R1, R2 can be used to selectively activate specific first transducers 106 to avoid modulating or sonicating the ribs R1, R2. In such embodiments, the therapy device 100, 300, 500, 700 can include a plurality of operational modes. For example, the therapy device 100, 300, 500, 700 can include three modes of operation. A first mode of operation can include using a transmission and a reception of acoustic energy from each of the first transducers 106 and the second transducers 312 to determine placement over the rib based on the level of reflection. A second mode of operation can include using the second transducers 312 to determine if the first transducer array 104, 704 is positioned over the patient's ribs. A third mode of operation can include using the first transducer array 104, 704 for transmission or reception with the second transducer array 310, 510, 710 for the other of the transmission or reception not used by the first transducer array 104. For example, the first transducer array 104, 704 may be utilized for transmission and the second transducer array 310, 510, 710 may be utilized for reception.

In some embodiments, the ultrasound energy levels transmitted by the first transducer array 104, 704 may be limited to a frequency in the range between 2 MHz and 18 MHz. In such embodiments, the transmitted ultrasound energy levels of the first transducer array 104, 704 can be limited to lower energy and/or intensity associated with ultrasound imaging. Accordingly, the ultrasound energy transmitted by the first transducer array 104, 704 and/or second transducer array 310, 510, 510 may be sufficiently safe such that the first and/or second transducer arrays can sonicate uniformly. In such embodiments, alignment of the first transducer array 104, 704 with the intercostal space between the patient's ribs is less important and the transmitted ultrasound energy can be applied to the entire region of interest without the risk of injuring the patient. Accordingly, a general alignment between the therapy device 100, 300, 500, 700 and the subdermal target site (e.g., the spleen) and/or tag multipurpose indicator may be sufficient. In such embodiments, the audio, visual, and/or haptic feedback may be unnecessary thereby further reducing costs and complexity of the therapy device 100, 300, 500, 700.

Figure 9:
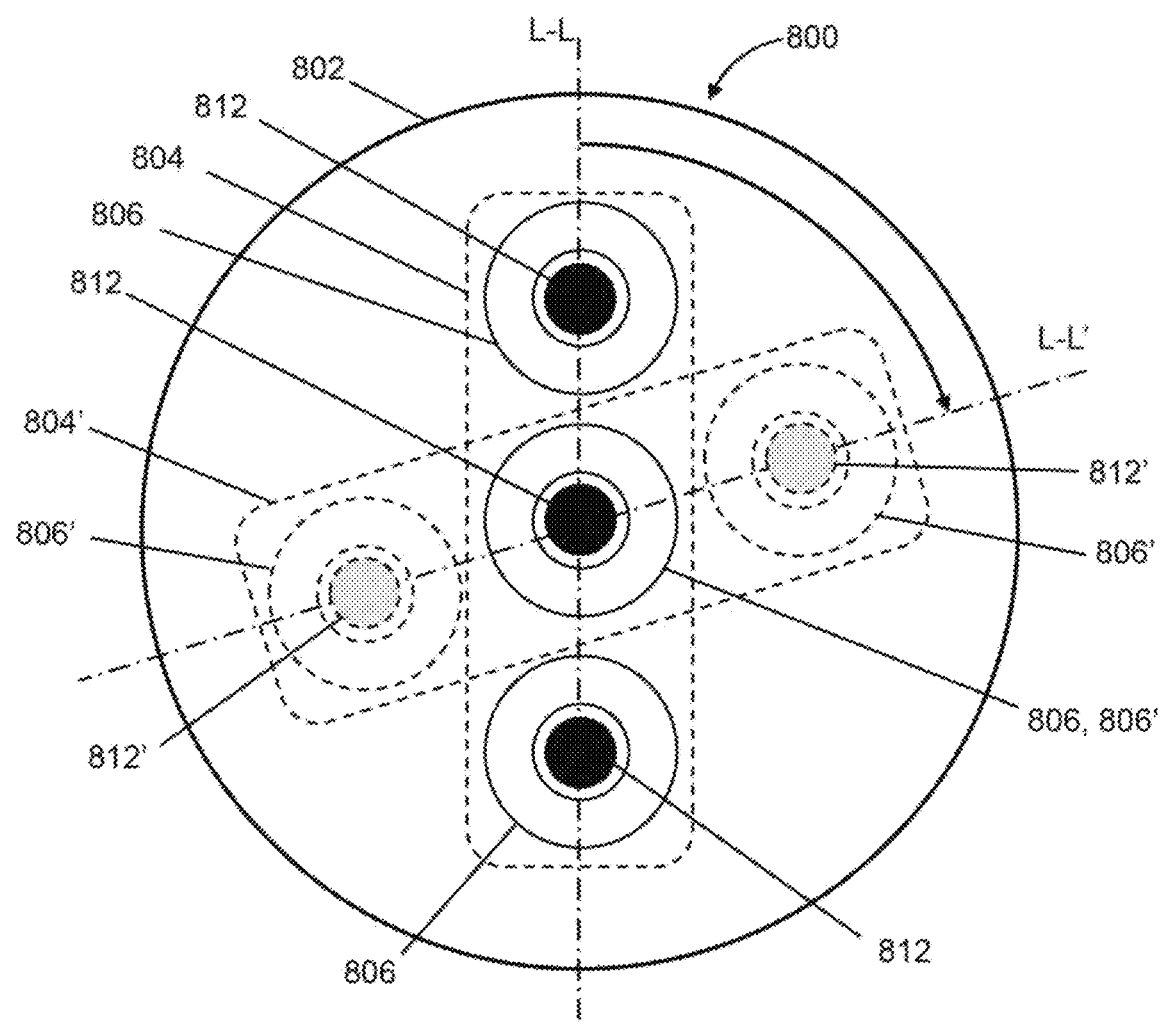
FIG. 9 illustrates an embodiment of a therapy device for transmitting energy to a tissue.

FIG. 9 shows an embodiment of a therapy device 800 with a rotational component for transmitting energy to a region of interest corresponding to a subdermal target site. The therapy device 800 can include any of the features of therapy devices 100, 300, 500, 700. In some embodiments, the therapy device 800 can include the base surface 802, a first transducer array 804, 804' having a set of first transducers 806, 806' and a second transducer array having a set of second transducers 812, 812'. FIG. 9 illustrates a first transducer array 804, 804' and the second transducers 812, 812' rotating from a first position to a second position with respect to the base surface 802. In a first position, the first transducer array 804 and a first set of second transducers 812 can be arranged along line L-L. In a second position, the first transducer array 804' and a second set of second transducers 812' can be arranged along line L-L'. The second transducers 812 can be arranged with any features according to any of the second transducer arrays 310, 510, 710 described above.

In some embodiments, the therapy device 800 can be an ultrasound probe configured to transmit and/or receive ultrasound energy while automatically rotating at least the first transducer array 804, 804' at a prescribed rate. Rotating the first transducer array 804, 804' at a prescribed rate can maximize the therapy over the whole region of interest including the subdermal target site.

In various embodiments, the base surface 802 can have outer dimensions exceeding the largest dimensions of the first transducer array 804, 804'. As shown in FIG. 9, the base 802 can have a circular cross-section having a diameter greater than the length of the first transducer array 804, 804'. In some embodiments, the base 802 can be another shape that can maintain a fixed outer dimension while permitting at least the first transducer array 804, 804' to rotate inside the base 802. This configuration may advantageously allow the therapy device 800 to be secured to a patient via a belt and/or strap while enabling the first transducer array 804, 804' to rotate. Alternatively, the entire therapy device 800 can be configured to rotate. In such embodiments, the base 802 can be the same as base surface 103, 702 or any other desirable shape.

In various embodiments, the first transducer array 804, 804' and/or the second transducer array can be fixed. As the first transducer array 804, 804' is rotated the fixed beam of the first transducer array 804, 804' translates over the region of interest in an embodiment. Accordingly, energy from the first transducer array 804, 804' can modulate the subdermal target site.

In some embodiments, the speed of rotation can be uniform throughout the duration of the treatment session. Rotating the first transducer array 104 uniformly throughout the treatment session may provide a constant angular velocity. The constant angular velocity of the therapy device 800 may result in an energy gradient from the medial portions of the first transducer array 804 to the lateral portions of the first transducer array 804. For example, tissue in line with a first transducer 806 positioned at and/or near the axis of rotation may receive constant exposure to the energy while tissue in line with a first transducer 806 positioned at and/or near an end of the therapy device 800 may receive a temporary exposure to the energy. In some embodiments, the speed of rotation can be varied and/or modulated over the course of the treatment session. Modulating the speed of rotation of the first transducer array 104 may be implemented to optimize treatment.

In various embodiments, rotating the first transducer array 804, 804' may mitigate complications arising from misalignments between the first transducer array 804, 804' and the intercostal space(s). For example, rotating the first transducer array 804, 804' may only transmit energy to the patient's skeletal structure periodically. Accordingly, the thermal effects of applying energy to the skeletal structure can be reduced.

In one embodiment, an acoustic absorbing material may be placed on top of or over the ribs to block stray ultrasound energy. In such embodiments, a medical professional may apply the absorbing material to the skin surface above the ribs. In some embodiments, the medical professional may apply the absorbing material to the skin surface above the ribs at the same time as applying the tag multipurpose indicator to the skin surface corresponding to the subdermal target site. The absorbing material may be an ultrasound masking layer formed from acoustic attenuating regions (e.g., acoustic masking, shielding) to cover the ribs. Applying the absorbing material may advantageously allow for significant misalignment of the therapy device 100, 300, 500, 700, 800 over the ribs as the ribs will be protected from excess ultrasound energy. Additionally, applying the absorbing material to the ribs may advantageously allow for the therapy device 100, 300, 500, 700, 800 to have a full array of transducers that do not positioned to avoid the skeletal structure of the patient.

In some embodiments, the first transducer array 104, 704, 804 and/or the second transducer array 310, 510, 710 can be customized and/or adapted to fit the skeletal structure of the patient. In some embodiments, rapid manufacturing, including computer-controlled manufacturing (e.g., computer numerical control ("CNC") and/or additive manufacturing/3D printing) may be implemented to produce one or more components of a custom personalized therapy devices for a patient.

In one embodiment, rapid manufacturing may be used to make customized medical devices more accessible by reducing manufacturing time and associated costs, and increase patient comfort and treatment efficacy. To manufacture a custom personalized therapy device, a patient may first be scanned. The scan of the patient can be used to determine an optimal interface and location of the first and second transducers 106, 312, 806, 812. For example, the transducers can be positioned and/or spaced within the base surface 103, 702, 802 to avoid the patient's ribs. The scan of the patient can be further used to manufacture a custom base surface 103, 702, 802 where the first and second transducer arrays 104, 704, 804, 310, 510, 710 can be preassembled. For example, the base surface 103, 702, 802 can include inserts produced through additive manufacturing, the base surface 103, 702, 802 can be CNC machined and/or may utilize a grid array for finite adjustments. Accordingly, the therapy device 100, 300, 500, 700 can be a custom made personalized medical device having first and second transducers spaced to avoid the skeletal structure of the patient according to several embodiments.

In some embodiments, a software program may be used to control the therapy device 100, 300, 500, 700, 800. In some embodiments, the software program may be an application that can be run on a mobile operating system (e.g., a mobile application on a mobile operating system). The program may undergo a set up or initialization step when a treatment prescription is entered into the program. The program may be configured to monitor usage of the therapy device 100, 300, 500, 700, 800 in relation to the prescription. In some embodiments, the program may send notifications to the patient and/or medical professional. For example, the program may send a notification to remind the patient to have a therapy session. Sending push notifications can advantageously encourage and help patients to follow the treatment plan for outpatient or home use. Additionally and/or alternatively, the program may send a notification to inform the medical professional of the patient's usage. For example, the program may send a notification to inform the medical professional if the patient fails to successfully undergo one or more therapy sessions or does not undergo the correct therapy session. The program may include a software lock to prevent unprescribed usage. For example, the patient may be a maximum home use per day or treatment period and the program may prevent functionality of the therapy device after the maximum prescribed use is reached. In some embodiments, the program may send a notification to the patient and/or the medical professional if an attempt is made to use the therapy device more than the prescribed amount.

Figure 10:
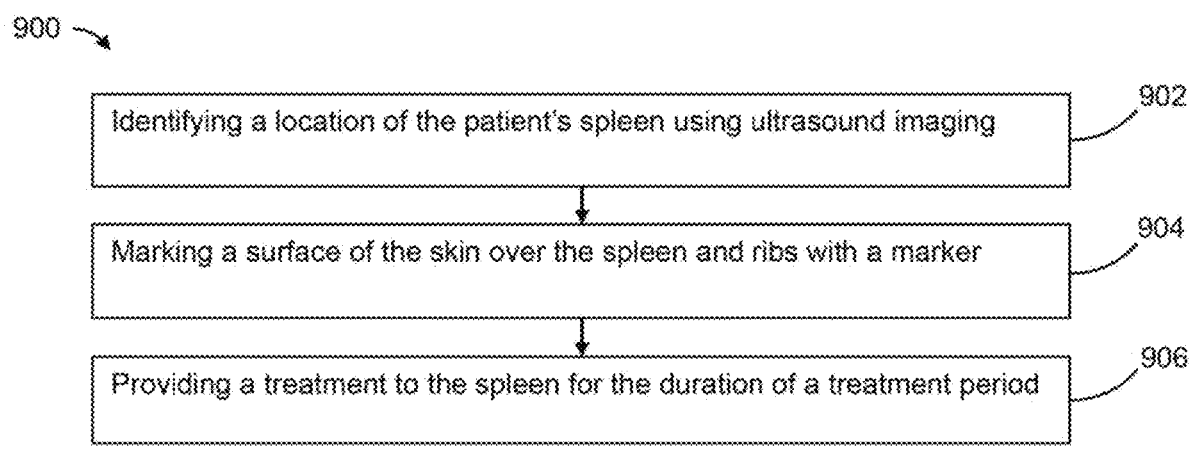
FIG. 10 illustrates a flow chart of a method for treating a subdermal target according to an embodiment.

FIG. 10 is a flow chart illustrating an embodiment of a method 900 for treating a subdermal target site for a treatment period. The method 900 may implement any of the therapy devices 300, 500, 700, 800 described above.

The method 900 may include step 902 in which a subdermal target site in a patient is identified. In one embodiment, the target site is identified using visual and/or touch identification of ribs, and/or imaging (such as ultrasound imaging). The subdermal target site can be an internal organ or nerve selected for treating one or more conditions. For example, the subdermal target site can be the patient's spleen. Modulating the spleen may treat rheumatoid arthritis and/or other inflammatory conditions in the patient. In some embodiments, the subdermal target site may be identified by the sensing transducers of the therapy devices 300, 500, 700, 800. The subdermal target site may be identified by an ultrasound imaging device in one embodiment.

The method 900 may include step 904 in which a surface of the skin positioned over and/or exterior of the spleen and ribs is marked with a tag multipurpose indicator 102. The tag multipurpose indicator can be any device or indicator for identifying the location of the spleen. For example, the tag multipurpose indicator 102 may be a sticker, an implant device, or a topical marking. In some embodiments, the multipurpose indicator 102 can maintain its position relative to the spleen for the duration of the treatment period. The treatment period can be a scheduled and planned duration of time selected by a medical professional for treating the one or more ailments. In some embodiments, the treatment period can be one or more weeks, one or more months, and/or one or more years. For example, the multipurpose indicator 102 may be configured to adhere to the patient for up to three months in various embodiments.

The method 900 may include step 906 in which a treatment is provided to the subdermal target site according to a treatment plan. The treatment plan can include regularly scheduled treatment sessions during the predetermined treatment period. In some embodiments, the treatment period can include one or more weeks, months, and/or years of treatment. The treatment plan can include regularly scheduled sessions of energy during the treatment period. In some embodiments, the treatment plan can include one or more treatment sessions every week for the duration of the treatment period. For example, the treatment plan can include a treatment session every day. In some embodiments, each treatment session may last between 5 and 20 minutes (e.g., 5, 10, 15, 20 minutes and any values or ranges therein).

Figure 11:
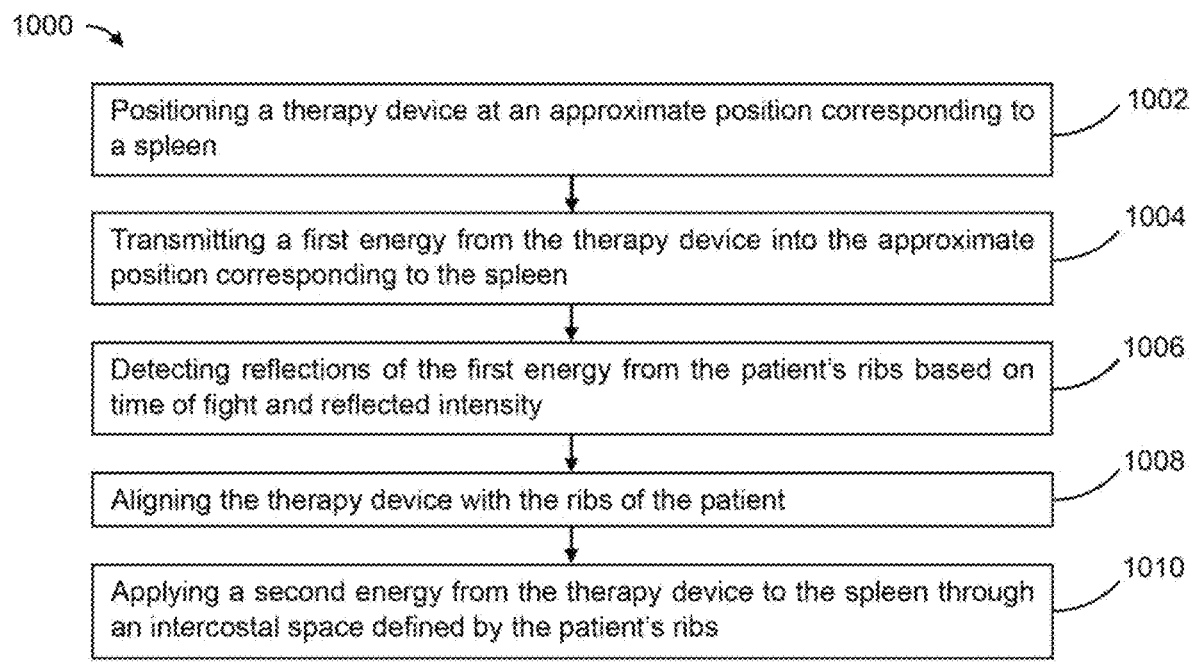
FIG. 11 illustrates a flow chart of a method for aligning a therapy device with the skeletal structure of a patient according to an embodiment.

In various embodiments, step 906 can include steps as illustrated in FIG. 11. FIG. 11 is a flow chart illustrating an embodiment of a method 1000 for positioning a therapy device and applying energy to a subdermal target site. The method 1000 may similarly implement any of the therapy devices 300, 500, 700, 800 described above. In some embodiments, the method 1000 can be performed for each treatment session. Accordingly, method 1000 may be repeated throughout the duration of a treatment period.

The method 1000 may include step 1002 in which a therapy device is positioned at an approximate position corresponding to the spleen. The approximate position may be marked with the tag multipurpose indicator applied to the patient in step 904. As described above, the multipurpose indicator 102 may be a sticker, an implant device, or a topical marking. The therapy device of any of the embodiments disclosed herein can be positioned along the patient's back such that one or more therapy transducers are configured to transmit energy through the patient's skin toward the subdermal target site.

In some embodiments, the therapy device can be secured at the approximate location. For example, the therapy device may connect to the multipurpose indicator via a male/female mechanical connector. In some embodiments, the therapy device may be configured to rotate about the connection between the therapy device and the multipurpose indicator.

The method 1000 may include step 1004 in which a first ultrasound energy is transmitted from the therapy device into the approximate position corresponding to the subdermal target site. The first ultrasound energy can be an ultrasound energy configured to generate an image. In some embodiments, the first ultrasound energy can be transmitted from an imaging transducer. For example, the energy transmitted from the second transducer array of the therapy devices 300, 500, 700, 800 described above.

The method 1000 may include step 1006 in which reflections of the first ultrasound energy from the patient's skeletal structure are detected based on time of flight and reflected intensity. In some embodiments, the detected skeletal structure may be one or more ribs defining an intercostal area. The detected signals can be correlated to correct positioning of the therapy device in a binary method. For example, the therapy device may be oriented at an angle relative to the intercostal space between two adjacent ribs and the first ultrasound energy may detect the presence of one or more ribs between the subdermal target site and the therapy device.

The method 1000 may include step 1008 in which the therapy device is aligned with the skeletal structure of the patient. In some embodiments, the therapy device may provide feedback to the patient and/or operator to guide the therapy device into alignment with the one or more ribs to minimize the amount of hard tissue positioned between the spleen and the therapy device. For example, the therapy device may provide auditory instructions such as "move left/right/up/down" and/or "rotate clockwise/counterclockwise;" visual cues such as text messages provided on a display and/or light indicators indicating the direction to move the therapy device; and/or haptic feedback in the form of vibrations or other sensations.

In some embodiments, the therapy device can be configured to automatically rotate. For example, the therapy device can automatically rotate at a prescribed rate so that the therapy device will shift transmitted energy to maximize the therapy over the whole subdermal target site. In some embodiments, the therapy device may rotate about the connection with the tag multipurpose indicator. In such embodiments, step 1008 may be skipped since alignment of the therapy device with the ribs is not essential.

In some embodiments, the therapy device can be secured to the patient in proper alignment with the subdermal target site and the patient's skeletal structure. For example, the therapy device may include a belt and/or strap configured to extend around the patient's torso and/or back to secure the therapy device in place. In some embodiments, the therapy device can be secured in place after aligning the therapy device with the patient's skeletal structure as described in step 1008.

The method 1000 may include step 1010 in which a second ultrasound energy from the therapy device is applied to the spleen through an intercostal space defined by the patient's skeletal structure. The second ultrasound energy can be ultrasound energy configured to neuromodulate a tissue at the spleen. For example, the second ultrasound energy can be energy transmitted from the first transducer array described above. In some embodiments, the transmitted energy can be configured to stimulate a nerve through an intercostal space. For example, the transmitted second ultrasound energy can be configured to stimulate the patient's vagus and/or splenic nerve at the spleen through the patient's ribs at a depth of 1-2 cm below the skin surface. The second ultrasound energy can be configured to stimulate only the targeted tissue and/or nerves without stimulating neighboring cells. For example, the second ultrasound energy may stimulate the vagus and/or splenic nerve without stimulating the general spleen cells. In some embodiments, the second ultrasound energy can stimulate the vagus and/or splenic nerve via a mechanical force with low duty cycle. In such embodiments, the mechanical force with low duty cycle can cause a more uniform sonication to reduce heating, cavitation effects, and ablation. Accordingly, the first transducer array can be activated after the therapy device is aligned with the intercostal space.

The second ultrasound energy can be applied according to a pulsing duty cycle. The pulsing duty cycle can alternate between one or more "on" periods and one or more "off" periods. The pulsing duty cycle and/or pulse train can alternate between one or more "on" periods having a pulse duration and one or more "off" periods corresponding to the periods between respective pulses. In some embodiments, the one or more "on" periods may be shorter than the one or more "off" periods. In some embodiments, the one or more pulse durations may be shorter than the one or more periods between respective pulses. For example, the one or more "on" periods can last between 1 ms and 5 ms (e.g., 1, 2, 3, 4, 5 ms and any ranges and values therein) and the one or more "off" periods can last between 9 ms and 15 ms (e.g., 9, 10, 11, 12, 13, 14, 15 ms and any ranges and values therein). In some embodiments, the one or more pulse durations may be shorter than the one or more periods between respective pulses. For example, the one or more "on" periods can last between 1 ms and 50 ms (e.g., 1, 2, 3, 4, 5 ms, 6-50 ms and any ranges and values therein) and the one or more "off" periods can last between 10 ms and 800 ms (e.g., 9, 10, 11, 12, 13, 14, 15 ms, 16-800 ms and any ranges and values therein). In various embodiments, the therapy includes a duty cycle with on period in a range of 1 ms-5 ms (e.g., 1, 2, 3, 4, 5 ms and any values and ranges therein) and an off period in range of 4 ms-50 ms (e.g., 4, 5, 6, 7, 8, 9, 10, 12, 15, 20, 25, 30, 35, 40, 45, 50 ms, 5 ms-20 ms, 9 ms-15 ms, 10 ms-30 ms, 15 ms-45 ms, and any values and ranges therein). In various embodiments, the therapy includes a duty cycle with on period in a range of 1 ms-50 ms (e.g., 1, 2, 3, 4, 5 ms, 6-50 ms and any values and ranges therein) and an off period in range of 10 ms-800 ms (e.g., 4, 5, 6, 7, 8, 9, 10, 12, 15, 20, 25, 30, 35, 40, 45, 50 ms, 5 ms-20 ms, 9 ms-15 ms, 10 ms-30 ms, 15 ms-45 ms, 45-800 ms and any values and ranges therein). In some embodiments, the pulsing duty cycle can be static for the duration of the treatment session and/or the treatment period. For example, the one or more pulse durations can last between 10 microseconds (µs)-500 milliseconds (ms) (e.g., 10, 100 µs, 1, 10, 100, 200, 300, 400, 500 ms, 10 µs-100 µs, 10 µs-1 ms, 10 µs-10 ms, 10 µs-100 ms, 10 µs-200 ms, 10 µs-300 ms, 10 µs-400 ms, 10 µs-500 ms, and any values and ranges therein). and the one or more periods between respective pulses can last between 10 µs-10 sec (e.g., 10, 100 µs, 1, 10, 100 ms, 1, 10 sec, 10 µs-100 µs, 10 µs-1 ms, 10 µs-10 ms, 10 µs-100 ms, 10 µs-1 sec, 10 µs-10 sec and any values and ranges therein). In various embodiments, the therapy includes a pulse train with an "on" period having a pulse duration in a range of 10 µs-500 ms (e.g., 10, 100 µs, 1, 10, 100, 200, 300, 400, 500 ms, and any values and ranges therein) and an "off" period with a duration between respective pulses in range of 10 µs-10 sec (e.g., 10, 100 µs, 1, 10, 100 ms, 1, 10 sec, 10 µs-100 µs, 10 µs-1 ms, 10 µs-10 ms, 10 µs-100 ms, 10 µs-1 sec, 10 µs-10 sec and any values and ranges therein). In some embodiments, the pulse train can be static for the duration of the treatment session and/or the treatment period.

In one embodiment, a burst pattern includes intermittently sending a burst of stimulation every few seconds. For example, a burst of 10 pulses with each pulse 1 ms "on" and 9 ms "off" can be delivered, and after 10 such pulses are delivered, there can be an "off" time of 5-30 seconds (e.g., 5, 10, 15, 20, 25, 30 seconds and any values and ranges therein) and then this pattern is repeated for a duration of therapy (e.g., 1, 2, 3, 4, 5, 8, 10, 12, 15, 20 minutes and any values and ranges therein). In one embodiment, a duty cycle of 20% or less (e.g., 20%, 15%, 10% or other values and ranges therein) can help in avoiding a heating effect of energy transmission to the ribs, and can also allow the target nerve(s) to undergo a resting period for a more effective therapy.

The second ultrasound energy can be applied according to a frequency. The frequency of the second energy can be between 100 kHz and 500 kHz. In some embodiments, the frequency of the second energy can be between 300 kHz and 1 MHz. In some embodiments, the frequency can be static. In some embodiments, the frequency can sweep through the ranges of frequencies identified above.

In several embodiments, ultrasound energy can be focused to a single point to maximize the emitted energy directed to a focal volume or focal pattern. Under traditional approaches, the focal volume or focal pattern can be predicted based upon the wavelength. For example, the focal volume or focal pattern can be inversely related to the frequency of the energy's wavelength.

Specialized focal patterns or focal patterns can be created using custom lenses—or kinoform—for single or multi-element arrays. In several embodiments, a connection or relationship between a lens and physical angling of the elements (as determined via the torsional focusing approach) may provide improved results. In one embodiment either or both approaches can be used to direct the energy along the desired path to achieve the desired focal volume, and that the lens can be any layer of the device beyond the transducer elements themselves. Element shape can be disc (e.g., circular), hexagonal, square, rectangular, or triangle. The custom lenses can create an arbitrary shape within a field customized to a patient's specific anatomy resulting in a tight focus, focal volume, or focal pattern. Accordingly, the custom lenses may be designed for a particular individual's specific anatomy and do not focus energy to the same desired location for another individual having different anatomy. In several embodiments, ultrasound alignment is precise and accurate to effectively treat a patient. For example, in one embodiment the margin of error is about 10 mm. Because there is a high degree of anatomical variability (e.g., location of the spleen), the custom lenses provide a solution for a particular patient that is designed for their anatomy.

The following discussion relates to devices to generate an acoustic field capable of focusing and/or adjusting a resulting focal volume or focal pattern of ultrasound energy over a large, uniform target volume. Accordingly, the following devices can apply ultrasound energy to a target site without considering the patient's specific anatomy.

In several embodiments, applying ultrasound energy from the therapy device to the organ can include outputting ultrasound energy having a center frequency between 400 and 800 kHz. In one embodiment, each channel is programmed to one of the frequencies in this range configured for providing an unstructured waveform and the broad beam (multi-foci) which allows for simultaneous stimulation of multiple areas. Applying ultrasound energy from the therapy device to the organ can include outputting ultrasound energy having an RMS pressure between 350 and 600 kPa. Applying ultrasound energy from the therapy device to the organ can include outputting ultrasound energy in pulses having a duration between 10 and 150 ms. Applying ultrasound energy from the therapy device to the organ can include outputting ultrasound energy in pulses having a duration between 50 and 150 ms. The therapy device can have a duty cycle between 5% and 15%. Applying ultrasound energy from the therapy device to the organ can include alternating between an active state and an inactive state. The active state can have a duration between 10 and 30 seconds and the inactive state has a duration between 20 and 30 seconds. In several embodiments, these parameters are effective for nerve stimulation while avoiding generating significant heating (e.g., >4 C) around the bone for safety reasons as well as avoiding nerve inhibition.

As disclosed herein, a therapy device can include one or more ultrasound transducers. In some embodiments, the one or more ultrasound transducers can be a plurality of ultrasound transducers 1202. The plurality of ultrasound transducers 1202 can be the same or similar to the one or more ultrasound transducers 106 described above. In some embodiments, the plurality of ultrasound transducers 1202 can be arranged in an array 1200. The array 1200 can be in one of a plurality of patterns, shapes, orientations, and/or arrangements. FIGS. 12A-14D illustrate examples of different patterns, shapes, orientations, and/or arrangements of the array 1204. For example, FIGS. 12A-12D illustrate the array 1200A having a hexagonal pattern, FIGS. 13A-13D illustrate an embodiment of an array 1200B having a square pattern, and FIGS. 14A-14D illustrate an embodiment of an array 1200C having a spiral pattern.

Each of the plurality of ultrasound transducers 1202 can be arranged along a first plane. As shown in FIGS. 12A-14D, each of the plurality of ultrasound transducers 1202 can be arranged along a first plane positioned in a vertical orientation. In some embodiments, the first plane may be aligned along a first y-z plane corresponding to a cartesian coordinate frame.

In some embodiments, the therapy device can further include one or more targets 1204. The one or more targets 1204 can be a focusing point for a corresponding one of the plurality of ultrasound transducers 1202. Accordingly, the one or more targets 1204 can have the same number of targets as the number of ultrasound transducers 1202. In some embodiments, the targets 1204 can have the same pattern, shape, orientation, and/or arrangement as the array 1200. For example, FIGS. 12A-12D illustrate the one or more targets 1204 arranged in a hexagonal array or pattern. FIGS. 13A-13D illustrate an embodiment of the one or more targets 1204 arranged in a square array or pattern. FIGS. 14A-14D illustrate an embodiment of the one or more targets 1204 arranged in a spiral array or pattern. In some embodiments, the array or pattern of the one or more targets 1204 may scaled relative to the array 1200 of the plurality of ultrasound transducers 1202. For example, the array or pattern of the one or more targets 1204 may be scaled down and/or reduced relative to the array 1200 of ultrasonic transducers 1202. Accordingly, ultrasound energy emitted from the plurality of ultrasound transducers is directed inward. In some embodiments, the array or pattern of the one or more targets 1204 can be scaled down to a single point thereby focusing emitted ultrasound energy to a single point. In some embodiments, the array or pattern may be scaled down from the array 1200 but wider than a single point which may deepen the focus.

The one or more targets 1204 may be aligned along a second plane or focusing plane. The second plane can be parallel to the first plane. As shown in FIGS. 12A-14D, each of the one or more targets 1204 can be aligned along a second plane positioned in a vertical orientation. The second plane may be axially displaced from the first plane. For example, as shown in FIGS. 12A-14D, the second plane can be displaced 50 mm or about 50 mm from the first plane. In some embodiments, the array or pattern of the one or more targets 1204 may scaled relative to the array 1200 of the plurality of ultrasound transducers 1202. For example, the array or pattern of the one or more targets 1204 may be scaled down and/or reduced relative to the array 1200 of ultrasonic transducers 1202.

Each of the plurality of ultrasound transducers 1202 can be configured to emit a corresponding ray 1206 of ultrasound energy. As shown in FIGS. 12A-14D, each of the plurality of ultrasound transducers 1200 can emit the corresponding ray 1206 of ultrasound energy in a direction non-parallel to the first plane. For example, as shown in FIGS. 12A-14D, each ray 1206 of ultrasound energy emitted from the plurality of ultrasound transducers 1202 can be emitted in a direction having at least an "x" component relative to the y-z plane. In some embodiments, each ray 1206 emitted from the plurality of ultrasound transducers 1202 may be configured to intersect one of the one or more targets 1204. Emitting the rays 1206 of ultrasound energy can form a focal pattern 1208. Accordingly, each individual ultrasound transducer 1202 can emit a corresponding ray 1206 to a unique location. In some embodiments, the two-dimensional array 1202 can target unique locations with overlapping directivity within a volume to achieve a desired focal pattern 1208.

The array or pattern of the one or more targets 1204 can be oriented in one of multiple possible annular orientations about a central longitudinal axis. In some embodiments, the array or pattern of the one or more targets 1204 can be rotated about the central longitudinal axis. Rotating the array or pattern of the one or more targets 1204 can concentrate the ultrasound energy from the corresponding rays 1206 over a volume thereby enabling less precise targeting. Accordingly, a larger range of ultrasonic wavelengths can safely pass through the body. In some embodiments, rotating the array or pattern of the one or more targets 1204 can adjust the focal volume or focal pattern 1208 to target areas within the body. For example, areas that would normally require surgery or pharmaceutical intervention can be effected by adjusting the focal volume or focal pattern 1208 via rotation of the array or pattern of the one or more targets 1204.

Figure 13A:
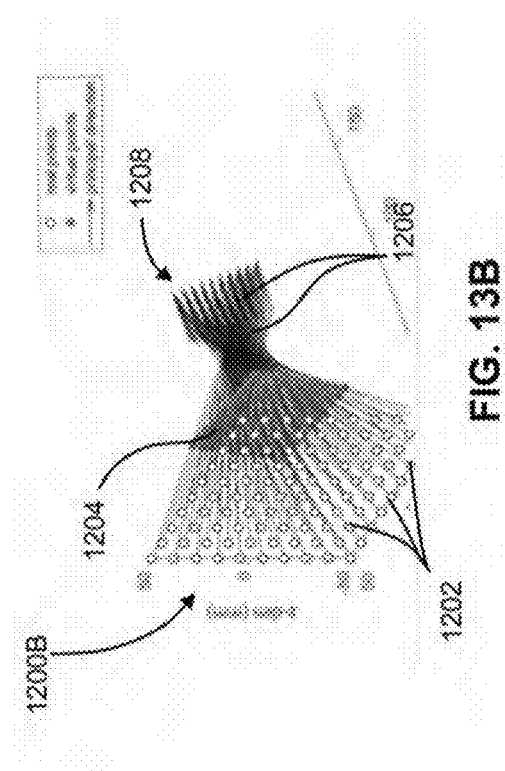
FIGS. 13A-13D illustrate square packed ultrasonic array elements with emitted ray lines traced through square packed targets.
Figure 13B:
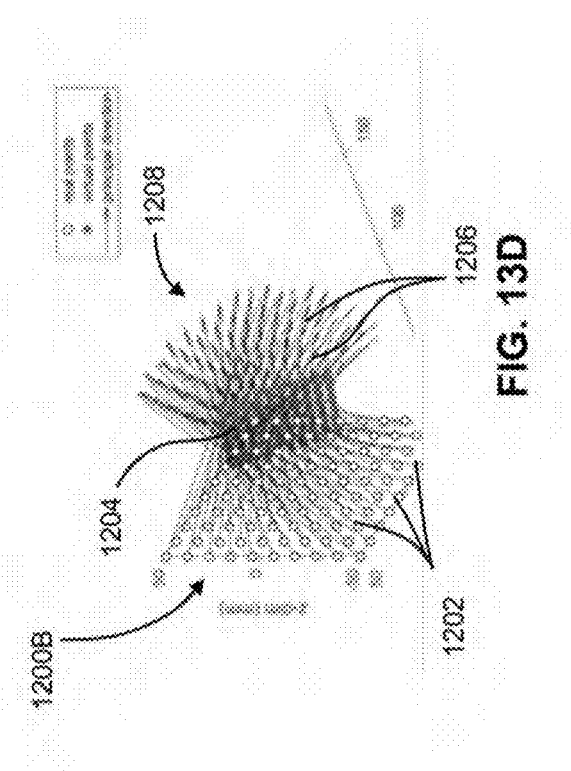
Figure 13C:
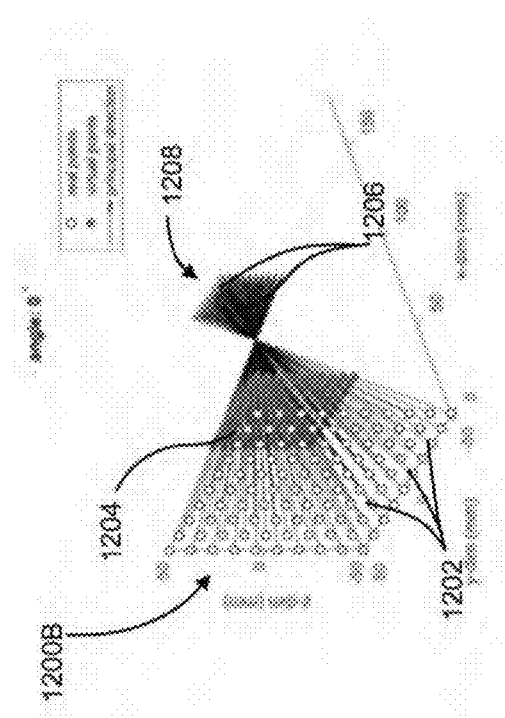
Figure 13D:
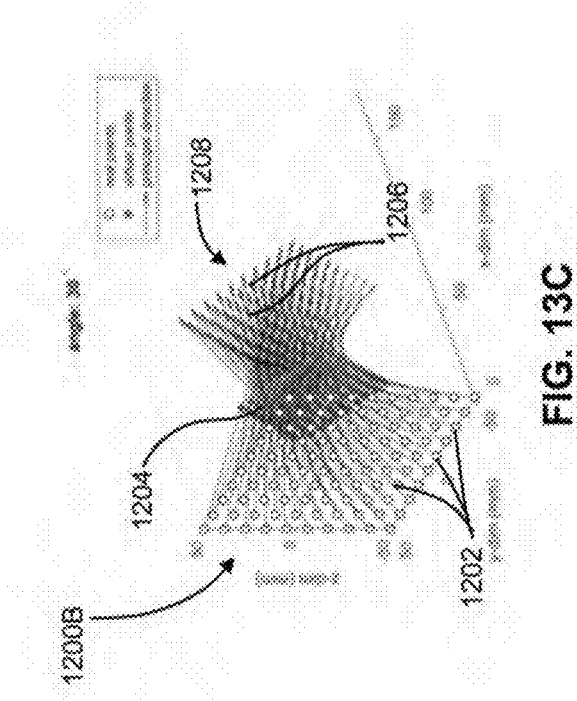
Figure 14A:
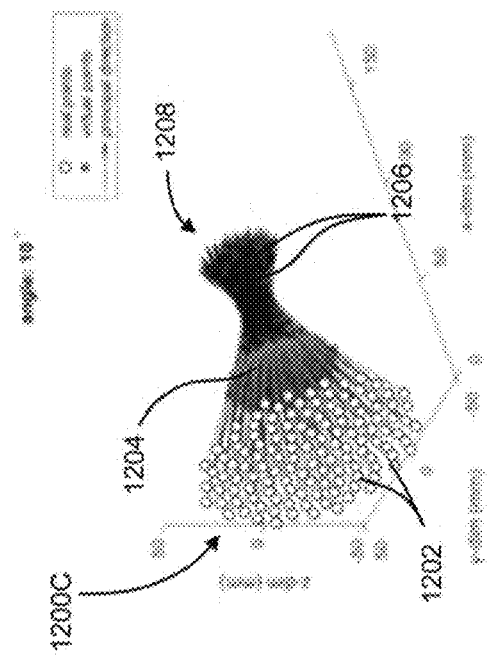
FIGS. 14A-14D illustrate spiral packed ultrasonic array elements with emitted ray lines traced through spiral packed targets.
Figure 14B:
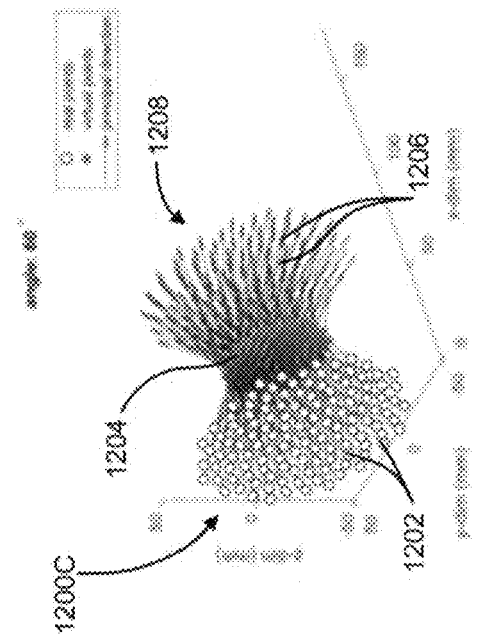
Figure 14C:
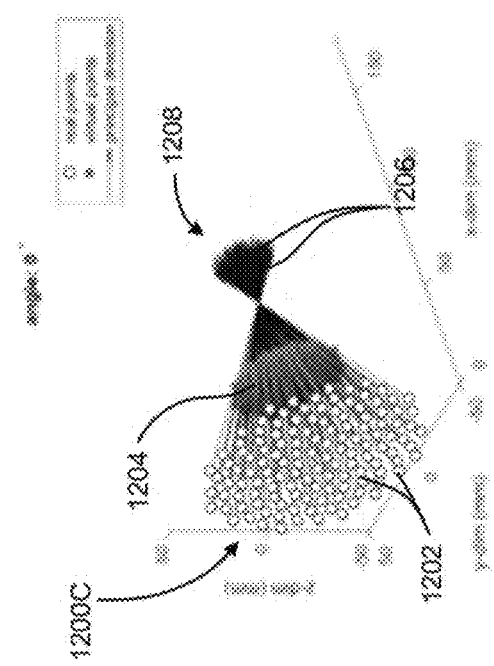
Figure 14D:
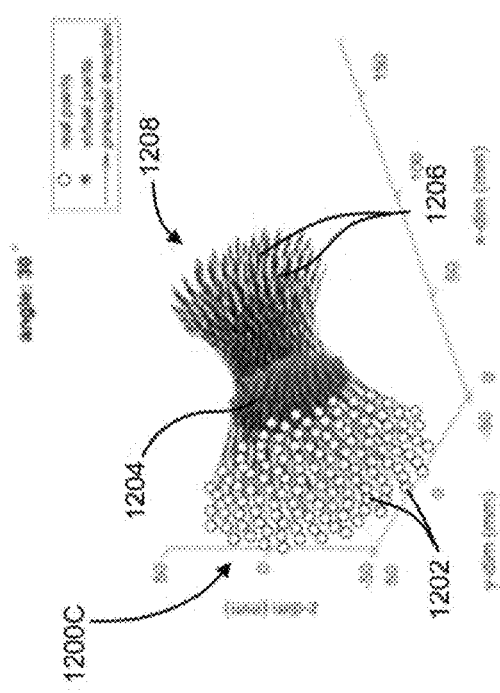

As shown in FIGS. 12A, 13A, and 14A, the array or pattern of the one or more targets 1204 can be in an initial annular orientation corresponding to zero degrees of rotation about a central longitudinal axis extending in the x-direction. In the initial position, the array or pattern of the one or more targets 1204 can correspond to the orientation of the array 1200. In the initial position, the emitted ultrasound energy can be focused to a concentrated point. For example, as shown in FIGS. 12A, 13A, and 14A, the corresponding rays 1206 converge at a common intersection. As shown in FIGS. 12B, 13B, and 14B, the array or pattern of the one or more targets 1204 can be in a second position corresponding to ten degrees of rotation about the central longitudinal axis extending in the x-direction. In the second position, the corresponding rays 1206 do not converge at a common intersection. Instead, the intersection is spread across a greater area. As shown in FIGS. 12C, 13C, and 14C, the array or pattern of the one or more targets 1204 can be in a third position corresponding to thirty degrees of rotation about the longitudinal axis extending in the x-direction. As shown in FIGS. 12D, 13D, and 14D, the array or pattern of the one or more targets 1204 can be in a fourth position corresponding to sixty degrees of rotation about the longitudinal axis extending in the x-direction. Accordingly, as shown in FIGS. 12A-14D, the focal pattern 1208 can be adjusted based on the angular position of the one or more targets 1204. In some embodiments, the focal pattern 1208 can be most compact in the initial position corresponding to the orientation of the array 1200. The focal pattern 1208 may be increasingly diffused as the array or pattern of the one or more targets 1404 rotate about the central longitudinal axis.

The array 1200 of ultrasound transducers 1202 and the scaled rotational position of the one or more targets 1204 can widen the acoustic field and allow for a large controlled focal area that can cover a desired volume while maintaining safe ultrasound energy through heterogenous media. For example, through bones. In some embodiments, the array 1200 can active all of the ultrasound transducers 1202 simultaneously. In some embodiments, the array 1200 can activate the ultrasound transducers 1202 according to a unique pulse duration, pulse repetition interval (i.e., duty cycle), or pulse train duration as described above. In some embodiments, the array 1200 can implement an unstructured focusing scheme as described herein. The unstructured focusing scheme can provide each ultrasound transducer 1202 with a random or pseudo random unique frequency and/or phase. Providing each ultrasound transducer 1202 with a random unique frequency and/or phase can cause an unstructured wave propagation that results in a diffuse focus.

Figure 15B:
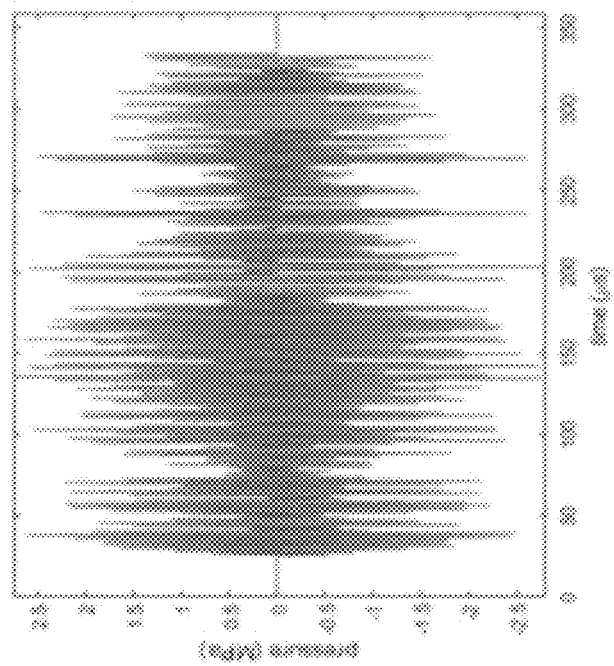
FIGS. 15A-15B illustrate an unstructured pressure waveform at a location in the acoustic field.
Figure 15A:
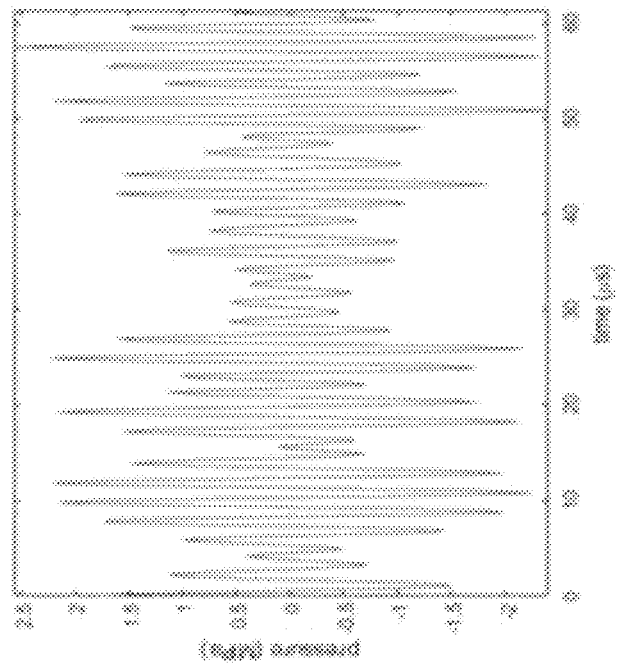

FIGS. 15A-15B illustrate an asymmetrical pressure waveform at a location in the acoustic field pulsed for a duration of time according to some embodiments. FIG. 15A illustrates a pulse having a duration of 300 µs. FIG. 15B illustrates a segment of the pulse illustrated in FIG. 15B. In particular FIG. 15B shows a 60 µs segment of the pulse shown in FIG. 15A. As shown by FIGS. 15A-15B the waveform does not have a pure one frequency sinusoid. Thus, due to the unstructured wave propagation by providing each ultrasound transducer 1202 with a random unique frequency and/or phase, the resulting pressure waveform is not periodic and has peaks (maximum pressures) and valleys (minimum pressures) that are unique to the stimulation. In some embodiments, the maximum pressure may be maintained while the typical RMS pressure will be lower than that of a typical periodic sinusoidal pressure wave. For example, the RMS pressure may be 30-50% of the maximum pressure compared to 70% of the maximum pressure of a typical periodic sinusoidal pressure wave. In some embodiments, the applied pressure may be restricted to limit the mechanical index to 1.9. As discussed above, the mechanical index is a ratio of peak negative pressure to the square root of the frequency. In some embodiments, the therapy device can maintain a root-mean square (RMS) pressure level that keeps the spatial-peak, temporal-average intensity below 720 mW/cm$^2$. To achieve a diffused focus, as illustrated in FIGS. 15A-15B, the acoustic field or directivity of each individual ultrasound transducer 1202 must overlap to some degree for the constructive and deconstructive interference to occur.

Figure 16:
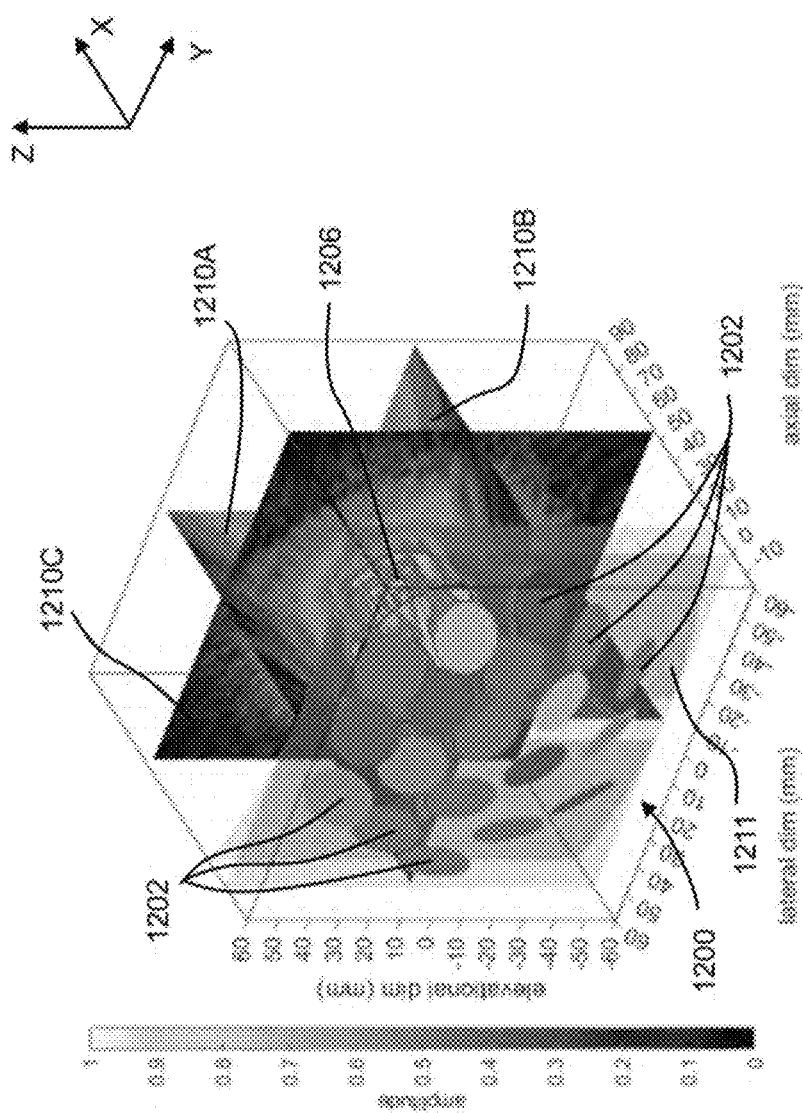
FIG. 16 illustrates a 3D pressure plot.

FIG. 16 illustrates a three-dimensional plot of the array 1200 of ultrasound transducers 1202. As shown in FIG. 16, the array 1200 can include a plurality of ultrasound transducers 1202 (e.g., 2, 4, 6, 8, 10, 12, 14, 16, 18, 20, 22, 24, 26, 28, 30 or more and any values or ranges therein). As described above, the array 1200 can be arranged along a first plane 1211. The first plane 1211 can be the same or similar to the first plane described above. The ultrasound transducer 1202 can emit a corresponding ray 1206. As further shown in FIG. 16, each of the ultrasound transducers 1202 can be non-planar along the first plane 1211. For example, the ultrasound transducers 1202 can face a corresponding one of the targets described above.

FIG. 16 further illustrates a plurality of two-dimensional pressure plots. The plurality of two-dimensional pressure plots can include a first pressure plot 1210A, a second pressure plot 1210B, and a third pressure plot 1210C. The first pressure plot 1210A, the second pressure plot 1210B, and the third pressure plot 1210C can be mutually orthogonal. In some embodiments, the first pressure plot 1210A, the second pressure plot 1210B, and the third pressure plot 1210C, may be arranged along three respectively orthogonal planes in a cartesian frame. For example, the first pressure plot 1210A can be arranged along an axial-vertical plane (i.e., x-z plane), the second pressure plot 1210B can be arranged along an axial-lateral plane (i.e., x-y plane), and the third pressure plot 1210C can be arranged along a lateral-vertical plane (i.e., y-z plane). The third pressure plot 1210C can be axially offset from the first plane 1211. For example, the third pressure plot 1210C can be axially offset by 50 mm or about 50 mm. FIGS. 17A-17C illustrate the plurality of two-dimensional pressure plots described above. FIG. 17A illustrates the first pressure plot 1210A, FIG. 17B illustrates the second pressure plot 1210B, and FIG. 17C illustrates the third pressure plot 1210C. Each of the two-dimensional pressure plots illustrate a cross section of the pressure fields produced using a torsional focusing technique (e.g., bijective torsional focusing) with unstructured phasing via the ultrasound transducers 1202. As shown in FIGS. 17A-17C, the torsional focusing technique (e.g., bijective torsional focusing) can form a volume experiencing a higher amplitude of pressure. In various embodiments, the torsional focusing technique has the benefit of reducing or eliminating points of extreme constructive or destructive interference which are undesirable when the goal is a broad and uniform focal area. In several embodiments, the torsional focusing approach can be used to reduce or eliminate points of extreme constructive or destructive interference (e.g., 'hot spots'), as determined by the frequency and phase of the emitted waves, as well as the geometry of the transducer element(s). In some embodiments, the volume can be a cylindrical concentration. For example, as shown in FIGS. 17A-17C, the volume can have a first rectangular cross section 1214A, a second rectangular cross section 1214B, and a circular cross section 1214C. Combining the three orthogonal two-dimensional cross sections can form a cylindrical three-dimensional shape.

As shown in FIGS. 17A-17C, the delivered energy from the plurality of ultrasound transducers 1202 can be concentrated in the focal pattern 1208 corresponding to the volume experiencing the higher amplitude of pressure. In some embodiments, the delivered energy can be capable of being directed over inhomogeneous media without a large effect on the shape and location of the volume. For example, the delivered energy may be directed over bones (e.g., ribs) without having a large effect on the focal pattern 1208. Creating a spatially diffused focus as described above, can achieve a wider or larger target focal volume or focal pattern.

Figure 18B:
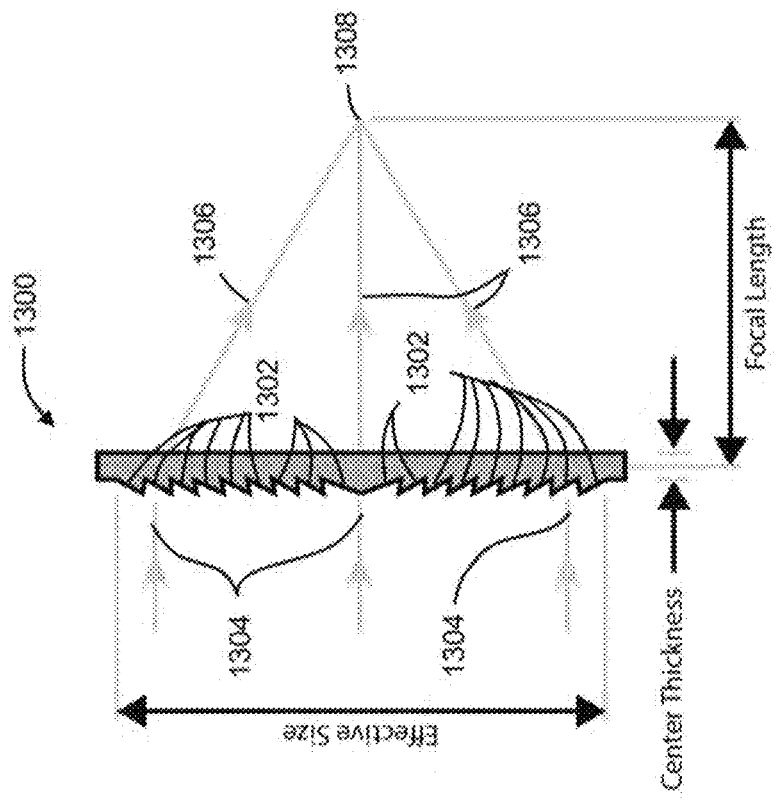
FIGS. 18A-18B illustrate views of an array lens.
Figure 18A:
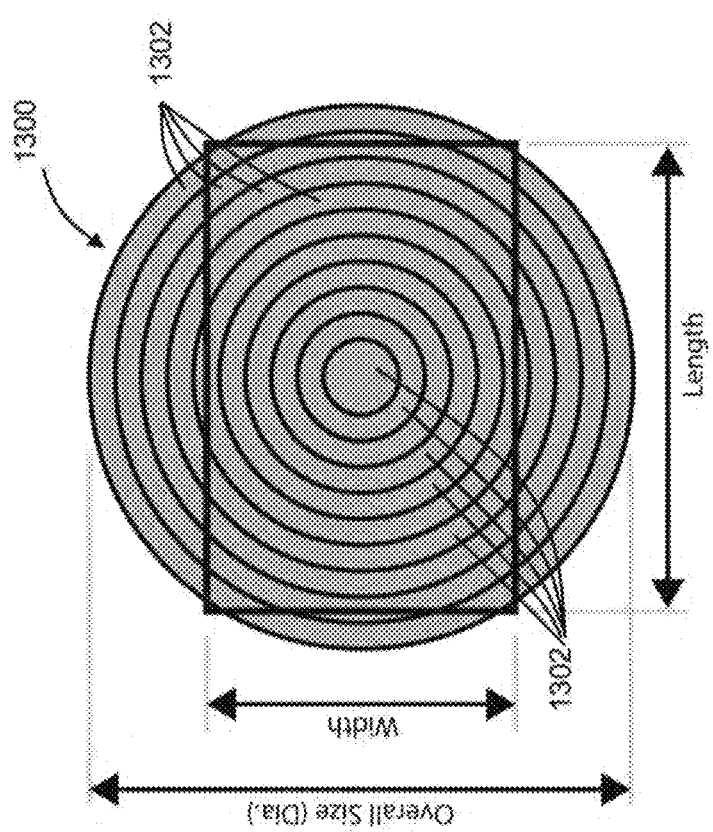

FIGS. 18A-18B illustrate an embodiment of an array lens 1300. In several embodiments, each of the ultrasound transducers 1202 can include a lens. In some embodiments, the lens can be natural or synthetic. The array lens 1300 can be configured to direct beams and/or rays to a focal point (or plurality of focal points). This method of directing beams and/or rays can be used as an alternative or in addition to geometric angling of the physical transducer(s). In some embodiments, the array lens 1300 can include a plurality of array elements 1302 that can be individually addressed to be driven by different excitation frequencies. Individually driving the array elements 1302 by different excitation frequencies can enable frequency and phase unstructured focusing.

FIG. 18A illustrates a front view of the array lens 1300. As shown in FIG. 18A, the array lens 1300 can include a plurality of array elements 1302. Each of the plurality of array elements 1302 can be distinct. In some embodiments, the plurality of array elements 1302 can be oriented at an angle relative to the front face of the array lens 1300. The plurality of array elements 1302 can be radially nested along a face of the array lens 1300. Accordingly, each of the plurality of array elements 1302 can have an annular structure defining a distinct radial width. In some embodiments, each of the plurality of array elements 1302 may be angled toward a center point of the array lens 1300.

FIG. 18B illustrates a side view of the array lens 1300. As shown in FIG. 18B, the array lens 1300 can receive one or more incoming beams and/or rays 1304 on a first side and output a redirected beam and/or ray 1306 on a second side. For example, a plurality of parallel incoming beams and/or rays 1304 may be directed toward the plurality of array elements 1302. The plurality of elements 1302 can be angled and redirect the plurality of parallel incoming beams and/or rays 1304 into a plurality of redirected beams and/or rays 1306. The plurality of redirected beams and/or rays 1306 can have a common intersection point or focal point 1308.

In some embodiments, the array lens 1300 can be similar to a Frensel lens or honeycomb lens. Accordingly, the plurality of array elements 1302 can be a plurality of prismatic elements. Each of the array elements 1302 can use reflection and refraction to capture and/or redirect the beam and/or ray.

FIGS. 19A-19M illustrate aspects of an embodiment of a therapy device 1402. The therapy device 1402 can include a device configured to position ultrasound transducers 1405 toward a target site. In some embodiments, the therapy device 1402 can be the same or similar to the therapy devices described above. The device be a harness, a garment, a vest, and/or a chest strap. For example, the therapy device 1402 can further include a harness 1404 configured to position ultrasound transducers 1405 toward a target site. In some embodiments, the therapy device 1402 can include and/or be electrically coupled to a power supply unit. The therapy device 1402 can be electrically coupled to the power supply unit via a power cable.

Figure 19A:
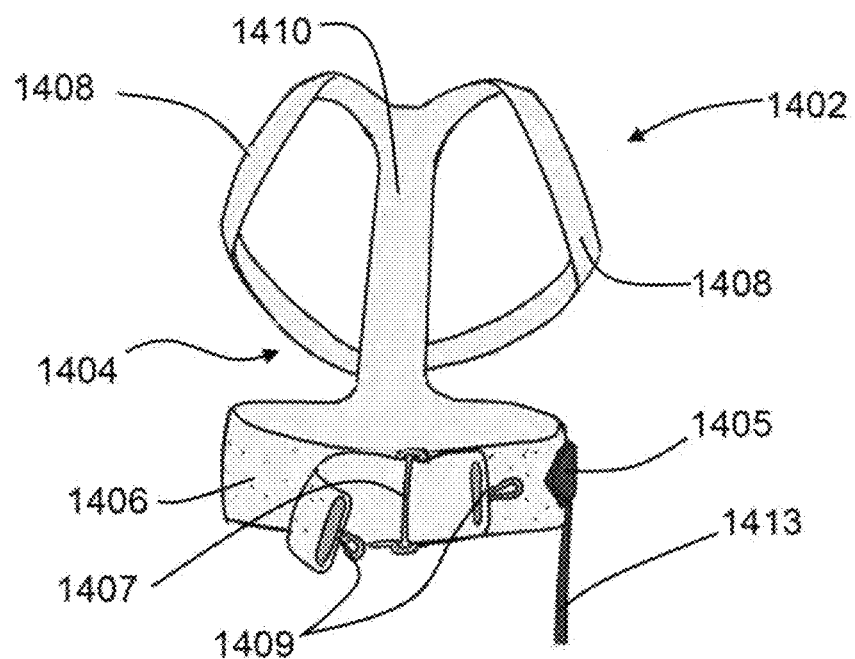
FIGS. 19A-19M illustrate an embodiment of a therapy device.

FIG. 19A illustrates an example of the harness 1404. The harness 1404 can include ultrasound transducers 1405, a torso strap 1406, one or more shoulder straps 1408, and a back strap 1410. In some embodiments, the harness 1404 can further include one or more fasteners. For example, the harness 1404 can include a torso fastener 1407 configured to secure the torso strap 1406 in a secured state. The torso strap 1406 can further include a grasping mechanism 1409 to aid in closing and/or tightening the torso strap 1406 in the secured state.

As shown in FIG. 19A, the one or more shoulder straps 1408 can extend from the back strap 1410 at a first position and return to the back strap 1410 at a second position. In some embodiments, the one or more shoulder straps 1408 can extend from the torso strap 1406. In some embodiments, the one or more shoulder straps 1408 can be configured to extend along the chest of the patient, over the shoulders of the patient, and along the back of the patient to the torso strap 1406. The torso strap 1406, the one or more shoulder straps 1408 and/or back strap 1410 may be adjustable as described in greater detail below. The harness 1404 can be used for alignment. For example, the ultrasound transducers 1405 can be integrated within and positioned at a predetermined location within the harness 1404, such that when the harness is donned, the ultrasound transducers 1405 are directed toward a target site. A power cable 1413 can be coupled to the ultrasound transducers 1405.

Figure 19B:
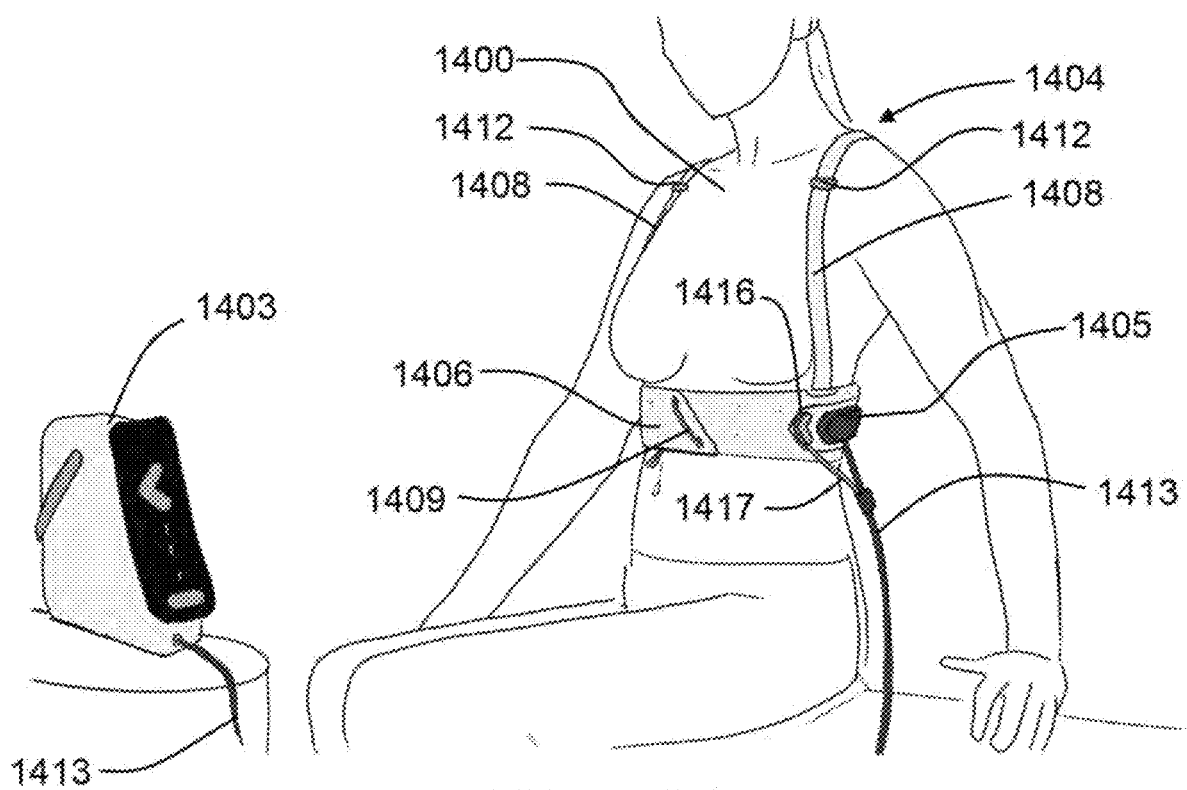

As shown in FIG. 19B, the harness 1404 can be donned by a patient 1400 to position the ultrasound transducers 1405 toward a target site positioned behind the patient's rib cage. Thus, energy can be applied from the ultrasound transducers 1405 to the target site of the patient 1400 during a therapy session. In some embodiments, the harness 1404 can further include a rib location sensor. The rib location sensors can be the same or similar to those described above. Because the location of a target site (e.g., spleen or liver) can be different for every patient, the harness 1404 can be adjustable to provide an individualized fit that accurately targets the target site of the patient 1400. In some embodiments, the harness 1404 can be donned by the patient 1400 for a prolonged period. For example, the harness 1404 can be donned for weeks, months, or years. Accordingly, the harness 1404 may be regularly adjusted by a physician to ensure proper alignment. For example, the harness 1404 may be adjusted quarterly at a physician's office. Accordingly, the harness 1404 may provide semi-permanent adjustments. In some embodiments, the therapy device 1402 can include and/or be electrically coupled to a power supply unit 1403 via a power cable 1413. In some embodiments, the harness 1404 can further include an engagement element 1416 configured to engage with a tag multipurpose indicator and/or marker as described herein. In some embodiments, the engagement element 1416 can be coupled to the power supply unit 1403 via a cable 1417.

FIGS. 19C-19F illustrate embodiments of applying the torso strap 1406 to the patient 1400. The torso strap 1406 can be applied by wrapping the torso strap 1406 around the patient's torso and securing a first end of the torso strap 1406 to a second end of the torso strap 1406. Some patients may have low dexterity. In some embodiments, the torso strap 1406 can include a grasping mechanism 1409 that can provide a patient greater leverage to fully close the torso strap 1406.

In some embodiments, the patient 1400 may have a tag multipurpose indicator 1414 or other marker corresponding to the location of a subdermal target site. The tag multipurpose indicator 1414 can be any of the tag multipurpose indicators or markers described above. In some embodiments, the tag multipurpose indicator 1414 can be configured to engage with a corresponding engagement element 1416 of the harness 1404. For example, the tag multipurpose indicator 1414 can be a ferrous and/or magnetic material and the engagement element can be a corresponding ferrous and/or magnetic material. Accordingly, the torso strap 1406 can be applied to the patient 1400 to guarantee the positioning of the ultrasound transducers 1405 relative to a subdermal target site. In some embodiments, the engagement element 1416 can require a less careful donning process of the harness 1404. Accidental connections between the tag multipurpose indicator 1414 and the engagement element 1416 can be avoided by providing axially polarized magnets at the far ends of the elements. A first side can have a magnetic north pole facing the patient's body and a second side can have a magnetic south pole facing away from the patient's body. Thus, there is only one orientation in which the elements can connect. In some embodiments, a therapy session may start only if the magnets are attached and may pause the therapy session if the magnets detach.

Figure 19C:
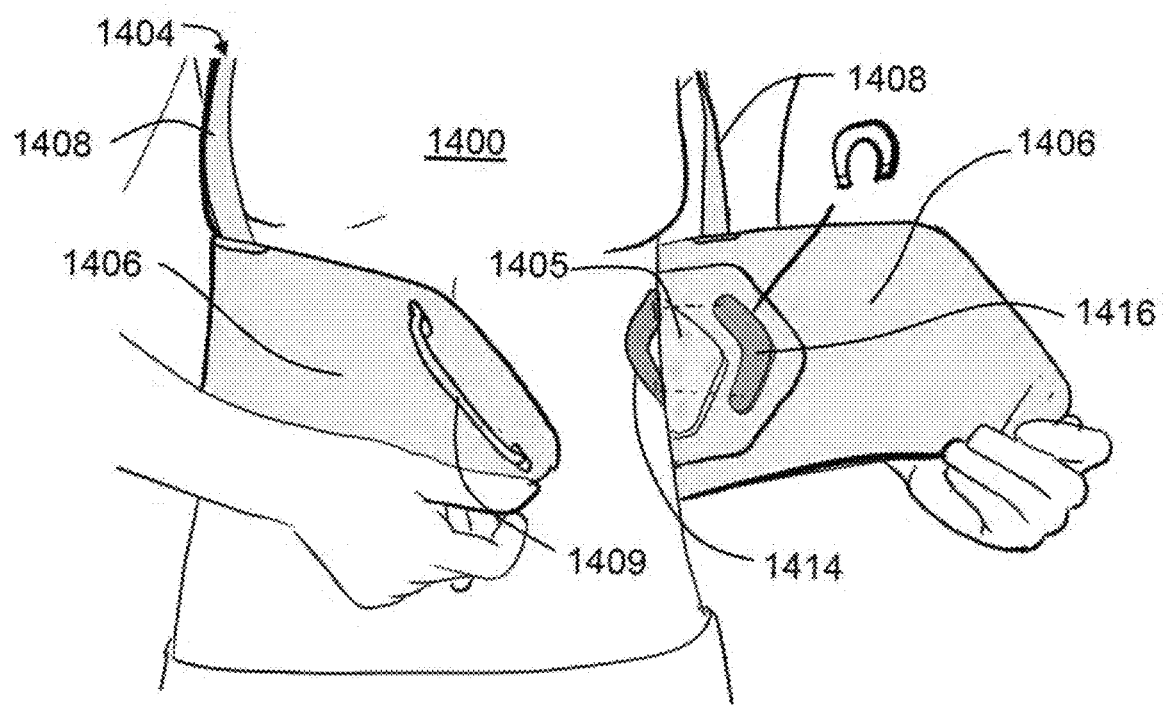

FIG. 19C illustrates an embodiment of a torso strap 1406 having an elongated grasping mechanism 1409. The elongated grasping mechanism 1409 shown in FIG. 19C can be sized to allow all of the fingers of the patient 1400 or another operator to fit within the elongated grasping mechanism 1409. The torso strap 1406 can be secured in place such that the engagement element 1416 overlaps and engages with the tag multipurpose indicator 1414 and the ultrasound transducers 1405 are directed to the target site of the patient 1400.

Figure 19D:
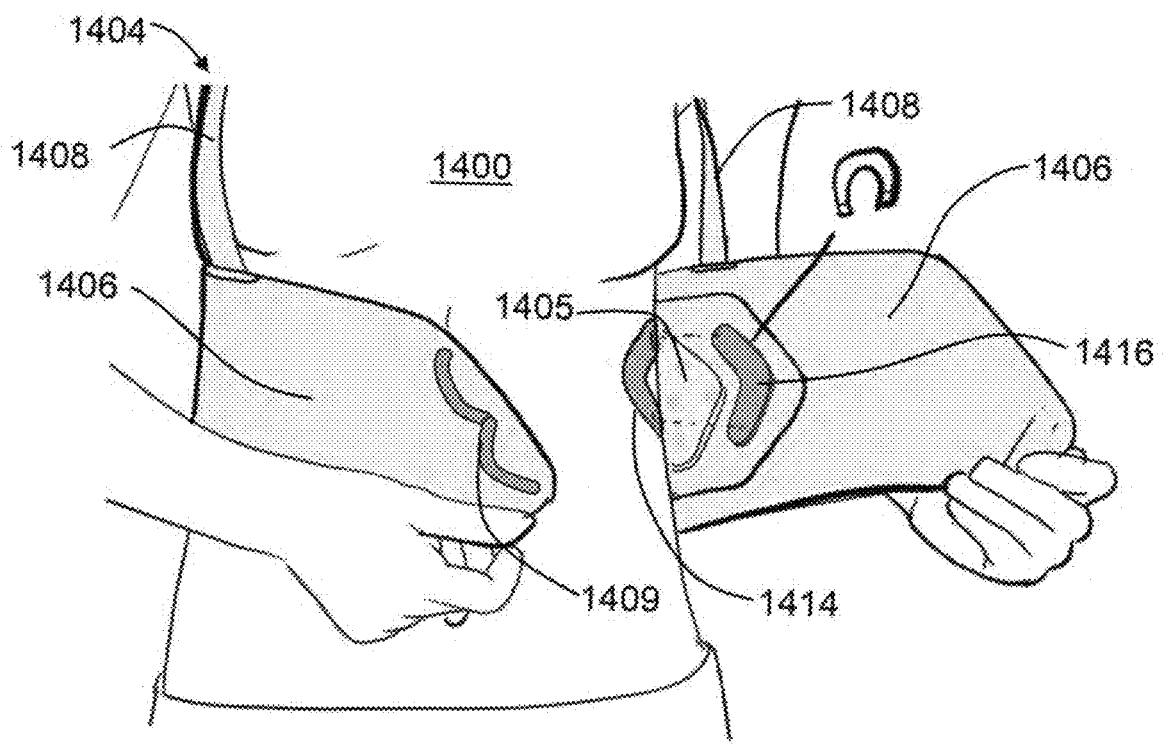

FIG. 19D illustrates an embodiment of a torso strap 1406 having two or more grasping mechanisms 1409. The two or more grasping mechanisms 1409 shown in FIG. 19D can be sized to allow fewer than all of the fingers of the patient 1400 or another operator to fit within one of the two or more grasping mechanisms 1409. The torso strap 1406 can be secured in place such that the engagement element 1416 overlaps and engages with the tag multipurpose indicator 1414 and the ultrasound transducers 1405 are directed to the target site of the patient 1400.

Figure 19E:
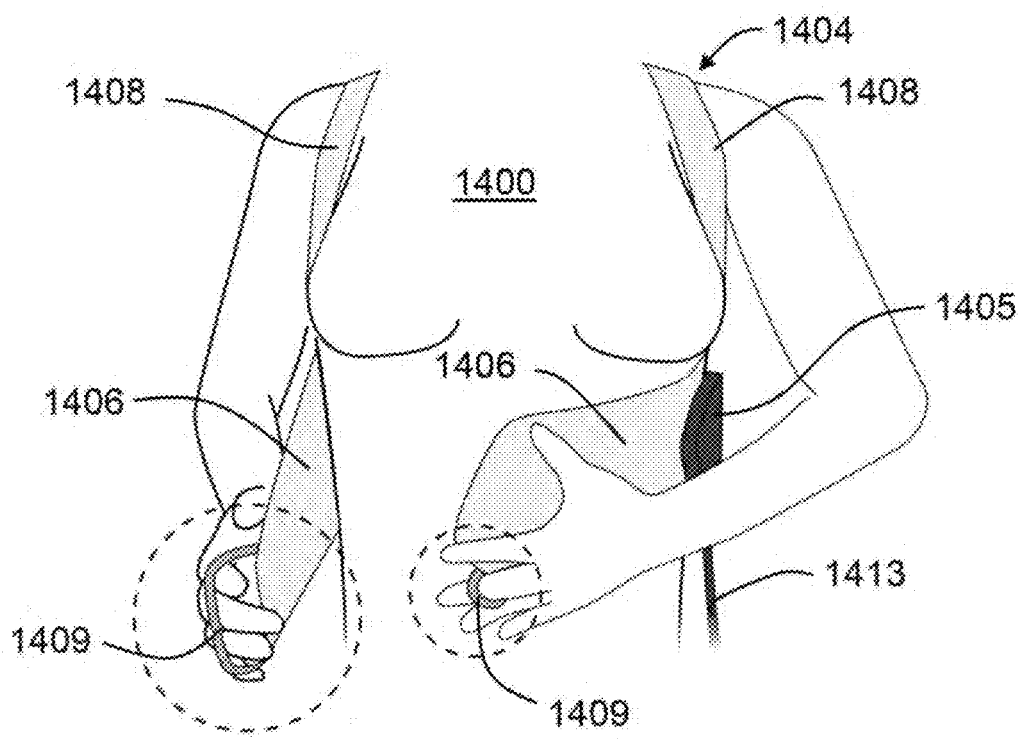

FIG. 19E illustrates an embodiment of torso strap 1406 having a first grasping mechanism 1409A and a second grasping mechanism 1409B. The first grasping mechanism can be positioned at a first end of the torso strap 1406 and the second grasping mechanism 1409B can be positioned at a second end of the torso strap 1406 opposite the first end. In some embodiments, the first grasping mechanism 1409A can be elongated as shown in FIG. 19C. In some embodiments, the first grasping mechanism 1409A can have two or more grasping mechanisms as shown in FIG. 19D. For example, two fingers can fit within each of the two or more grasping mechanisms. The second grasping mechanism 1409B can be sized to receive one finger, as shown in FIG. 19E.

Figure 19F:
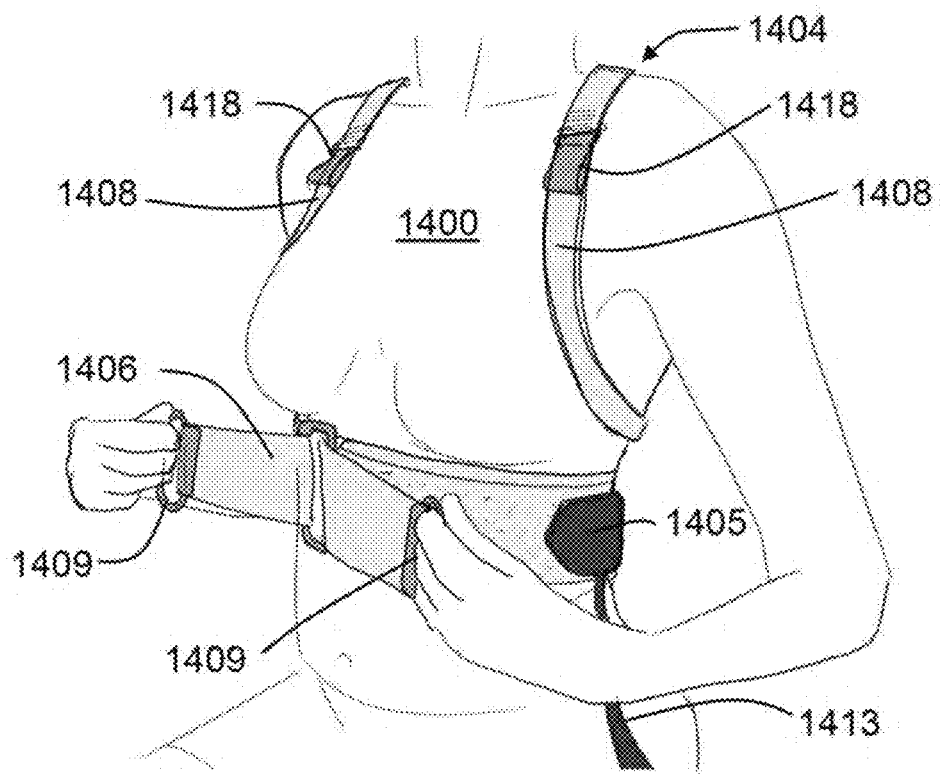

FIG. 19F illustrates an embodiment of the torso strap 1406 having a first grasping mechanism 1409A and a second grasping mechanism 1409B. The first grasping mechanism can be positioned at a first end of the torso strap 1406 and the second grasping mechanism 1409B can be positioned at a second end of the torso strap 1406 opposite the first end. In some embodiments, the first grasping mechanism 1409A can be elongated as shown in FIG. 19C. For example, all of the fingers of a first hand of the patient 1400 can fit within the first grasping mechanism 1409A grasping mechanisms. The second grasping mechanism 1409B can also be elongated as shown in FIG. 19C. The ends of the torso strap 1406 can be pulled laterally away from one another to tighten the torso strap 1406. The opposing members (e.g., the first end and the second end) can also provide a low dexterity closure for fastening the harness 1404 to the patient 1400. The opposing members can be wrapped around the patient's torso, guided through a buckle, and pulled laterally away from one another to tighten the torso strap 1406 around the patient's torso. FIG. 19F further illustrates an adjustment strap 1421 configured to adjust the shoulder straps 1408.

Figure 19G:
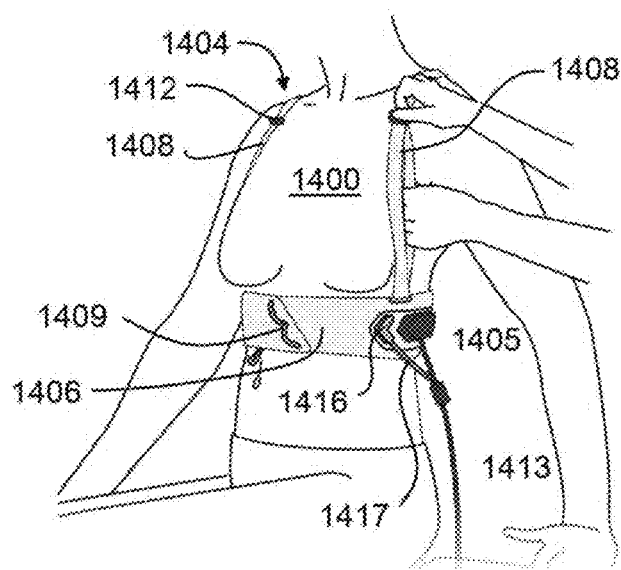
Figure 19H:
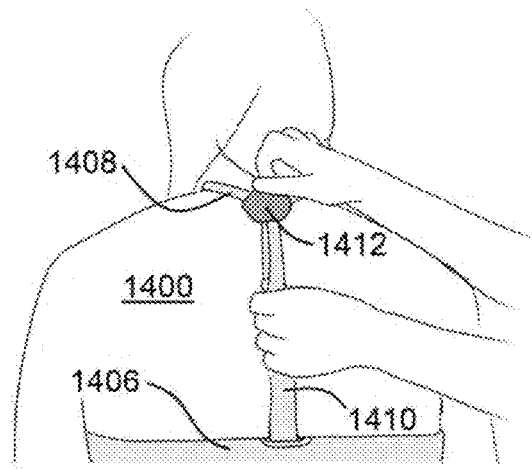
Figure 19I:
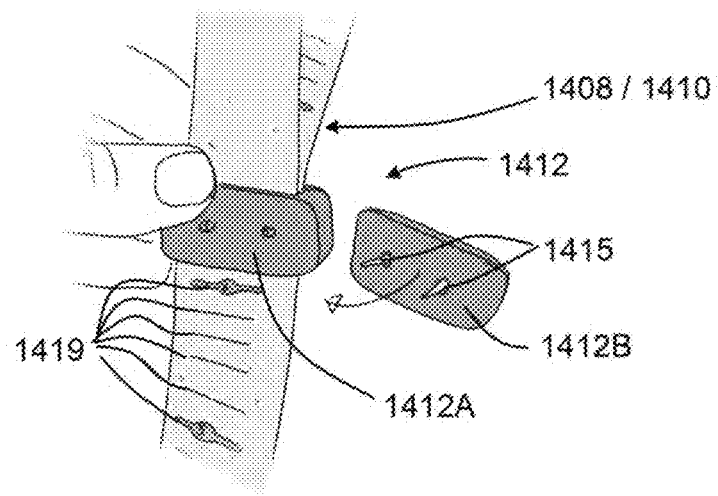

FIGS. 19G-19I illustrate embodiments for adjusting the harness 1404 on a patient 1400. In some embodiments, an adjustment can be made to the shoulder straps 1408 and/or the back strap 1410.

FIG. 19G illustrates an embodiment for adjusting the harness 1404 via the shoulder straps 1408. The shoulder straps 1408 can have a length exceeding the length of the patient's chest. In some embodiments, the shoulder straps 1408 can have a length approximately twice the length of the patient's chest. A first end of the shoulder straps 1408 can be coupled to a first side of the torso strap 1406 and a second end of the shoulder straps 1408 can be coupled to a second side of the torso strap 1406. The first end and the second end of the shoulder straps 1408 can be coupled at the same position along the torso strap 1406 but on opposite sides of the torso strap 1406. Accordingly, the shoulder straps 1408 can be folded in half. The shoulder straps 1408 can be fed through a securement feature 1412. The securement feature 1412 can be further secured to the back strap 1410. The securement feature can adjust the effective length of the shoulder straps 1408.

FIG. 19H illustrates an embodiment for adjusting the harness 1404 via the back strap 1410. As shown in FIG. 19H, the back strap 1410 can be configured to connect to the one or more shoulder straps 1408 at a position corresponding to the base of the patient's neck and is configured to extend along the back of the patient 1400 to the torso strap 1406. The back strap 1410 can have a length exceeding the length of the patient's back. In some embodiments, the back strap 1410 can have a length approximately twice the length of the patient's chest. A first end of the back strap 1410 can be coupled to a first side of the torso strap 1406 and a second end of the back strap 1410 can be coupled to a second side of the torso strap 1406. The first end and the second end of the back strap 1410 can be coupled at the same position along the torso strap 1406 but on opposite sides of the torso strap 1406. Accordingly, the back strap 1410 can be folded in half. The back strap 1410 can be fed through a securement feature 1412. The securement feature 1412 can be further secured to the shoulder straps 1408. The securement feature can adjust the effective length of the back strap 1410.

FIG. 19I illustrates an embodiment of an adjustable strap including a plurality of markers 1419. The adjustable strap can be a shoulder strap 1408 and/or a back strap 1410 as described herein. The adjustable strap can be an adjustment strap configured to adjust in length. The plurality of markers 1419 can identify fixed distances and/or sizes. For example, the plurality of markers 1419 can include regularly spaced markings along the adjustable strap. In some embodiments, the harness 1404 can include a securement feature 1412. The securement feature 1412 can be a clamp configured to maintain the harness 1404 in a desired state. The securement feature 1412 can include a first portion 1412A and a second portion 1412B. In some embodiments, the second portion 1412B can engage the first portion 1412A through the adjustable strap. For example, the second portion 1412B can include one or more protruding elements 1415 configured to penetrate and pass through the adjustable strap and engage with the first portion 1412A. Thus, the securement feature 1412 can secure the adjustment strap in a desired length.

Figure 19K:
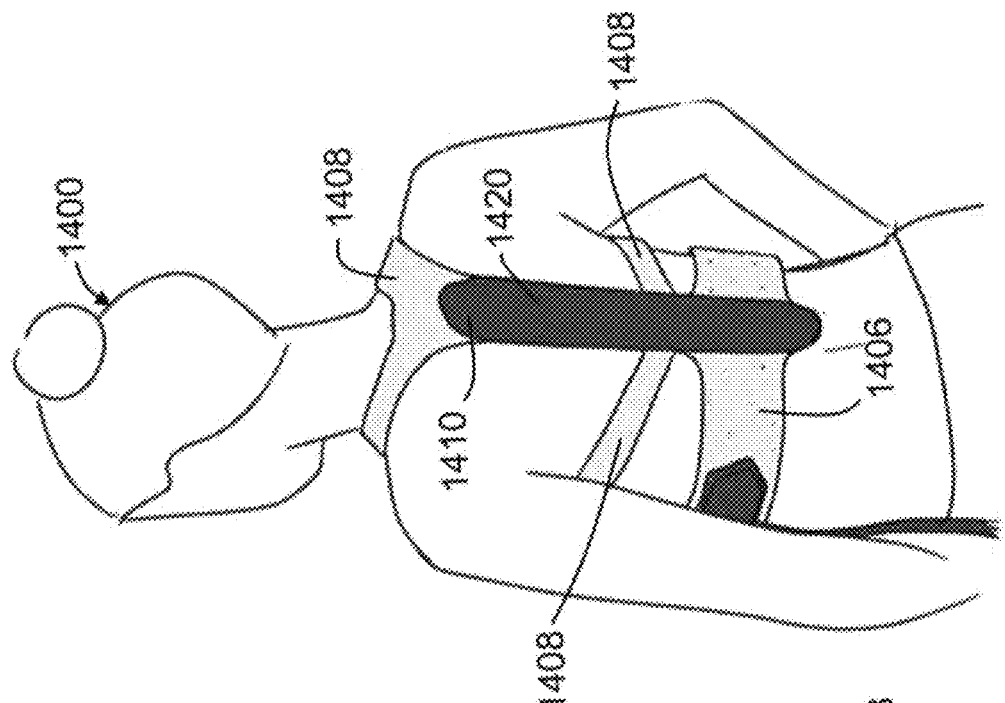
Figure 19J:
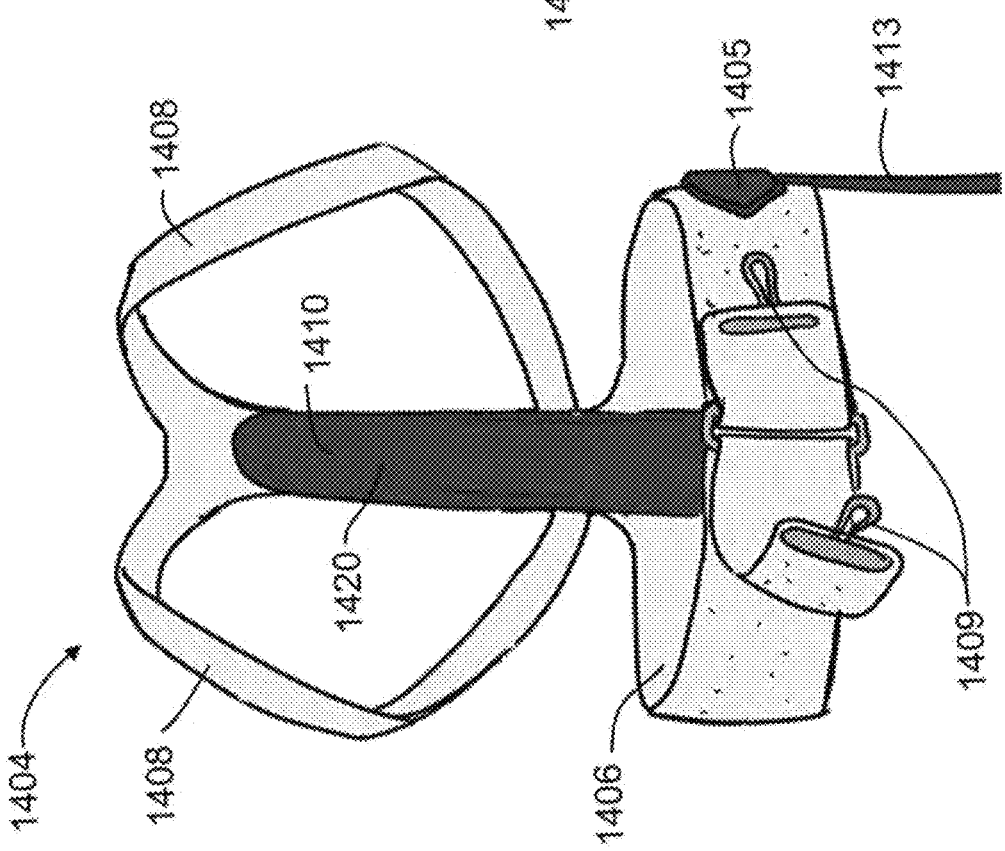

FIGS. 19J-19K illustrate another embodiment of a harness 1404 having an alignment bar 1420. As shown in FIGS. 19J and 19K, the back strap 1410 can further include an alignment bar 1420. The alignment bar 1420 can have a convex structure. The convex structure can align with the spine and keep the harness 1404 centered and properly aligned. In some embodiments, the alignment bar 1420 can be formed of a rigid material. Accordingly, the back strap 1410 can hold additional slack taken in from the torso strap 1406 and can be used as a brace. In some embodiments, the back strap 1410 can limit slouching and maintain the patient's posture during a therapy session to avoid movement of the target site relative to the ultrasound transducers.

Figure 19M:
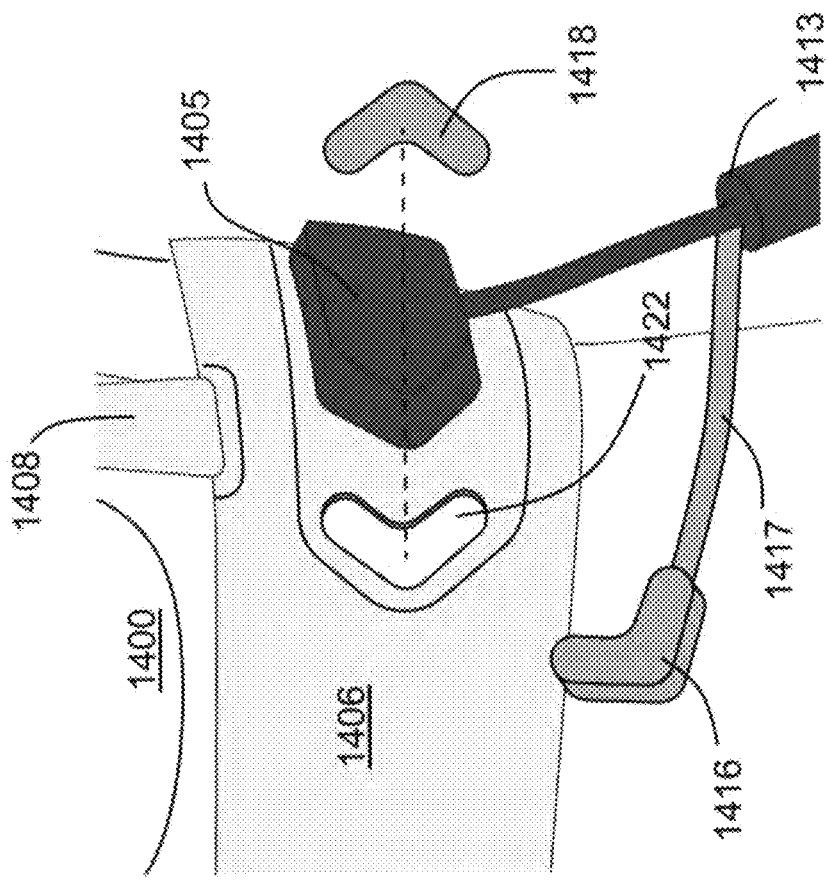
Figure 19L:
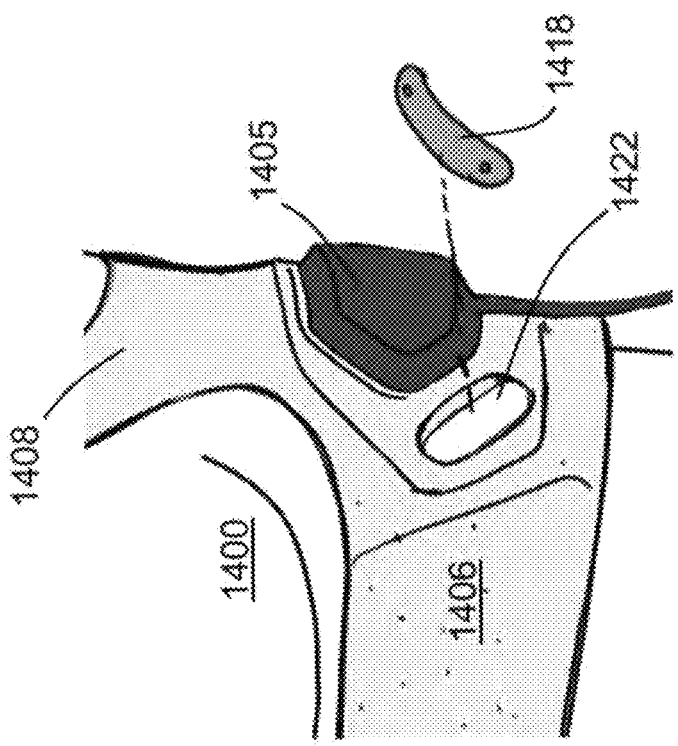

FIGS. 19L-19M illustrate embodiments of the harness 1404 having an alignment sensor 1418. In some embodiments, an alignment sensor 1418 can be positioned within a predetermined opening in the harness 1404. The alignment sensor 1418 can be removed to reveal a slot or opening 1422 in the harness 1404. The slot or opening can be the predetermined opening described herein. Revealing the slot or opening 1422 can ensure exact or precise placement of an alignment sticker or tag multipurpose indicator 1414. In some embodiments, a replacement tool can be placed within the slot or opening 1422 to replace or correct the alignment sticker or tag multipurpose indicator. The replacement tool can be offset and/or extruded to provide a grab feature on the back. In some embodiments, the replacement tool can have weak magnets on one face to hold a replacement. The alignment sensor 1418 can be configured to sense a corresponding detectable object positioned on the patient 1400. For example, the detectable object can be a marker, tag, or other object as described herein. In some embodiments, the alignment sensor 1418 can be an acoustic alignment sensor.

FIG. 19L illustrates an alignment sensor 1418 that is substantially linear. The alignment sensor can be configured to be placed in a corresponding substantially linear slot or opening 1422.

FIG. 19M illustrates an alignment sensor 1418 that has a chevron shape. The alignment sensor 1418 can be configured to be placed in a corresponding chevron shaped slot or opening 1422. As further shown in FIG. 19M, the engagement element 1416 can also have a chevron shape.

FIGS. 20A-20D illustrate another embodiment of a harness 1502. The harness 1502 can be similar to the harness 1404 described above. For example, the harness 1502 can include a torso strap, one or more shoulder straps, and a back strap. In some embodiments, the ultrasound transducers may not be integrated within the harness 1502. In several embodiments, a secondary therapy device 1508 having the ultrasound transducers 1510 can be provided. The harness 1502 can include a connection element 1504. The connection element 1504 can include a sticker and/or sensor 1505 configured to sense a detectable object on the patient 1400. In some embodiments, the connection element 1504 can include an engagement element 1506. For example, the engagement element 1506 can be a ferrous and/or magnetic element. The connection element 1504 can be configured to couple to an ultrasonic transducers 1510 of the secondary therapy device via the engagement element 1506.

Figure 20A:
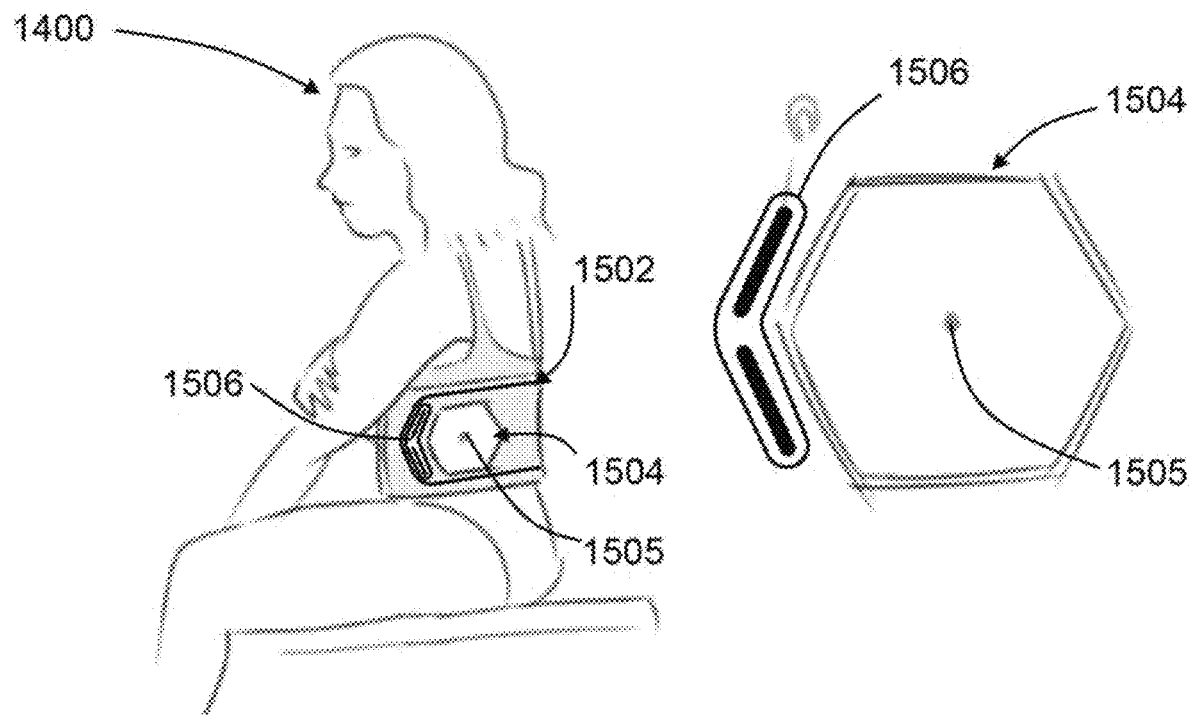
FIGS. 20A-20D illustrate an embodiment a therapy device.

FIG. 20A illustrates a patient 1400 donning the harness 1502. In some embodiments, the patient 1400 can don the harness 1502 in a similar fashion to the harness 1404 such that the connection element 1504 may be positioned over a subdermal target site.

Figure 20B:
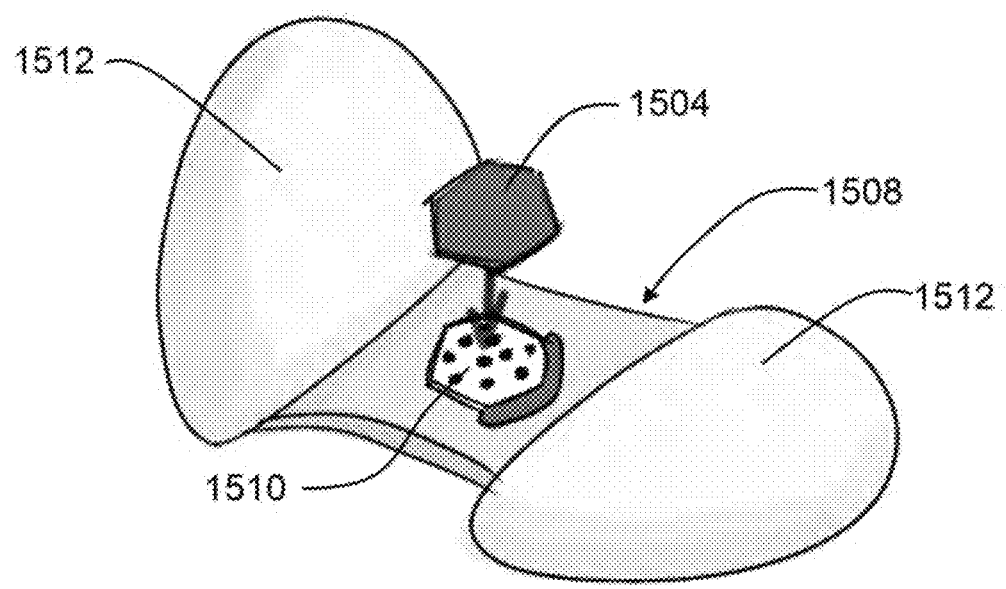

FIG. 20B illustrates that the connection element 1504 can engage with the secondary therapy device 1508. As shown in FIG. 20B, the secondary therapy device 1508 can include one or more pillows 1512 and a connection element including an ultrasound array having one or more ultrasound transducers 1510. The one or more pillows 1512 can be configured to be placed on a side of the patient 1400 and support the patient 1400 during a therapy session. In some embodiments, the secondary therapy device 1508 can be similar to a maternity or wedge pillow. Accordingly, the secondary therapy device 1508 can support the patient during a therapy session. As shown in FIG. 20B, the connection element 1504 can have a shape configured to engage with and secure within the shape of the ultrasound transducers 1510.

Figure 20C:
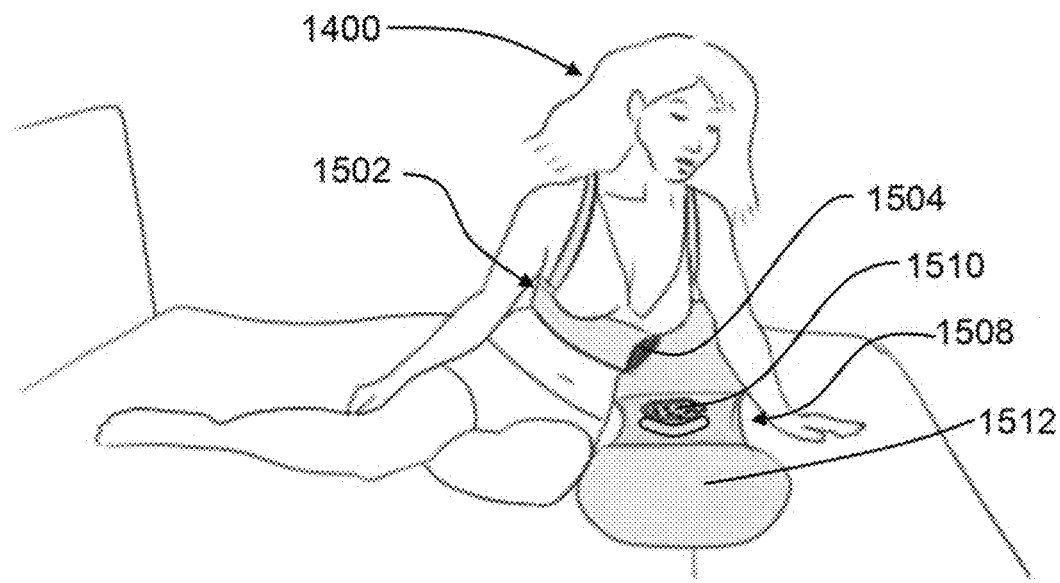

FIG. 20C illustrates a patient 1400 preparing to engage a secondary therapy device 1508. As described above, the harness 1502 may not have ultrasound transducers. Accordingly, the harness 1502 may be configured to pair with a secondary therapy device 1508 including an ultrasound transducer array having one or more ultrasound transducers 1510. The ultrasound transducer array can be positioned along the secondary therapy device 1508 to receive a patient 1400 laying down. As further shown in FIG. 20C, the patient can align the ultrasound array with a subdermal target site by laying down over the secondary therapy device 1508.

The patient 1400 can position the secondary therapy device 1508 with the connection element 1504 of the harness 1502. For example, as shown in FIG. 20B, the patient 1400 can lay on the secondary therapy device 1508 such that the ultrasound transducer array 1510 engages with the connection element 1504. In some embodiments, the secondary therapy device 1508 can include a ferrous or magnetic material to engage with the engagement element 1506. Additionally and/or alternatively, audio alignment feedback can be provided to guide the patient in aligning the secondary therapy device 1508 with the harness 1502. For example, the audio feedback can indicate whether the devices are becoming more or less aligned.

Figure 20D:
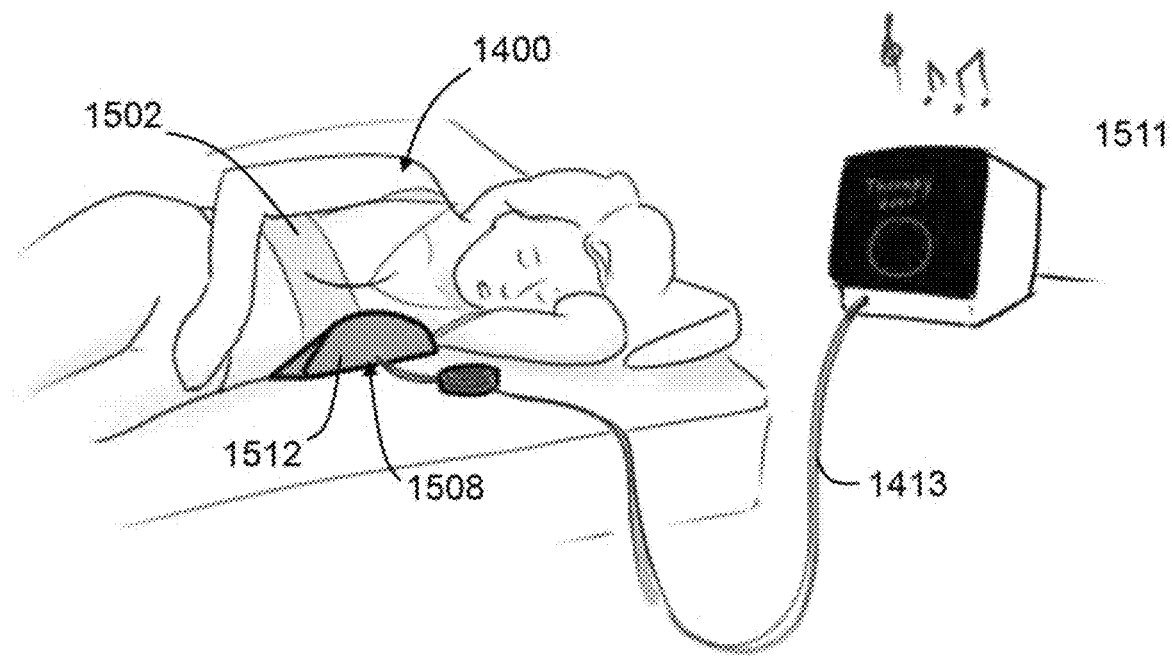

FIG. 20D illustrates an embodiment of a therapy system 1500. In various embodiments, the therapy system 1500 may include any of the devices, transducers, components, and/or subcomponents described herein. In one embodiment, a patient 1400 experiencing a therapy session with the harness 1502 and the secondary therapy device 1508. As shown in FIG. 20D, the secondary therapy device 1508 is engaged with the connection element 1504. In one embodiment, the secondary therapy device 1508 may further be connected to a power supply and/or processor console 1511. The power supply 1511 can be the same or similar to the power supply unit 1403. In some embodiments, the ultrasound transducer array can automatically start after a predetermined time after reaching a stable position. The stable position can correspond to when the alignment between the harness 1502 and the secondary therapy device 1508 is within a predetermined threshold.

The technology described herein, including ultrasound based neurostimulation of a nerve are used in several embodiments including the technology described in International Patent Application No. PCT/US2023/024133 filed Jun. 1, 2023, entitled Methods And Systems For Treatment Of Systemic Inflammatory Disorders, and the technology described in U.S. Patent Ser. No. 63/347,860 filed Jun. 1, 2022, entitled Methods And Systems For Treatment Of Systemic Inflammatory Disorders Using Acoustic Wave Energy, all herein incorporated by reference and attached expressly as Appendices A-B. The Appendices are wholly incorporated herein and are part of the disclosure.

As described herein, the second ultrasound energy can be applied according to a treatment plan in some embodiments. The treatment plan may be a static treatment plan providing uniform treatment sessions throughout the duration of the treatment period. In various embodiments, the treatment plan may be a dynamic treatment plan providing non-uniform treatment sessions throughout the duration of the treatment period. For example, the treatment plan may specify applying varying energy amplitudes and frequencies for varying durations for each treatment session in several embodiments.

EXAMPLE

The example below is a non-limiting embodiment.

Example 1. Duty Cycle Effects on Rib Heating Simulation

In an experiment, simulations of treatments using different duty cycles are performed. Application of treatments with different duty cycles are applied through ribs directed to a spleen with a spatial-peak pulse-average intensity (Isppa) of 3 W/cm^3.

In one embodiment, a burst pattern intermittently sends a burst of stimulation every few seconds. For example, a burst of 10 pulses with each pulse 1 ms "on" and 9 ms "off" is delivered, and after 10 such pulses are delivered, there is an "off" time of 10 seconds and then this pattern is repeated for a duration of therapy, such as 10 minutes.

In one embodiment, a burst pattern intermittently sends a burst of stimulation every few seconds. For example, a burst pattern with each pulse 1 ms-5 ms "on" and 4 ms-50 ms "off" is delivered with a duty cycle of the burst being 20% or less (e.g., 20%, 18%, 16%, 15%, 13%, 12%, 10%, 8%, 6%, 5%, 3%, 1% and any ranges or values therein).

At 50% duty cycle, temperature rise is 11° C. at the rib.
At 20% duty cycle, temperature rise is 4° C. at the rib.
At 10% duty cycle, temperature rise is 1.5° C. at the rib.
At 5% duty cycle, there is no temperature rise at the rib.

Alternative duty cycles and intensities may be used in other embodiments.

In an embodiment, a duty cycle of 20% or less (e.g., 20%, 15%, 10% or other values and ranges therein) helps in avoiding the heating effect of energy transmission to the ribs, and also allows the target nerve(s) to undergo a resting period for more effective therapy. In one embodiment, a duty cycle over 20% may cause significant heating issues at the bone/tissue.

The following list of numbered examples provide further description of embodiments disclosed herein, which can be used in combination with each other, or in combination with other embodiments disclosed herein.

Example 1 can include or use a patient-external ultrasound therapy system for providing therapeutic ultrasound toward a spleen of a human patient to activate a Cholinergic Anti-Inflammatory Pathway (CAP) while maintaining a desired internal body temperature of the spleen and of nearby organs and bones. For example, the system can comprise a base. The base can be sized and shaped and configured to be located on the patient, such as with a center of the base aligned within an intercostal space between adjacent underlying ribs of the patient. The system can also include or use a therapeutic ultrasound transducer array. The ultrasound transducer array can be arranged to be positioned using the base, such as to direct composite therapeutic ultrasound energy from the transducer array toward the spleen, such as via the intercostal space between adjacent underlying ribs of the patient. The system can include controller circuitry. The controller circuitry can be coupled to individual therapeutic ultrasound transducer elements within the transducer array. The controller circuitry can be configured to deliver one or more control signals to the individual therapeutic ultrasound transducer elements to produce corresponding individual therapeutic ultrasound output signals that, in combination, can provide a composite signal that directs the composite therapeutic ultrasound energy. For example, the controller circuitry can provide control signals such that the composite therapeutic ultrasound energy includes individual therapeutic ultrasound output signals from corresponding individual ones of the therapeutic ultrasound transducer elements at corresponding individual selected frequencies in a range of 250 kHz to 2 MHz. The composite signal can be delivered in pulses during a treatment therapy session. A duty cycle of a pulse of the composite signal can be greater than or equal to 5% and less than or equal to 20% to reduce heating at a bone. The duty cycle can also comprise an "on" period in a range of 1 millisecond to 50 milliseconds, and an "off" period in a range of 4 milliseconds to 200 milliseconds. A treatment therapy session can have a duration in a range of 5 minutes to 20 minutes, inclusive, such as during which treatment therapy can be delivered via the composite signal. The treatment therapy can comprise recurring bursts of "n" pulses. Each pulse in the burst can comprise the "on" period in the range of 1 millisecond to 50 milliseconds on and the "off" period in the range of 4 milliseconds to 200 milliseconds, such as wherein n can be an integer in a range of 2 to 900 pulses, and such as wherein sequential bursts can be separated by a delay time m, during which ultrasound energy is not applied, that is in a range of 15 seconds to 60 seconds.

Example 2 can include or use, or can optionally be combined with the subject matter of Example 1 (or any of the other numbered Examples) such as to include or use the controller circuitry being configured to deliver the one or more control signals to the individual therapeutic ultrasound transducer elements such that the transducer array directs the composite therapeutic ultrasound energy in the composite signal such as to be configured to sonicate at least one volumetric region. For example, the at least one volumetric region can start at a depth in a range of 0.5 cm to 3 cm below an external skin surface of the patient, the at least one volumetric region can have a volume in a range of 5 $cm^3$ to 130 $cm^3$. For example, the volumetric region can have a lateral width and depth in range of 2 cm to 6 cm. The at least one volumetric region can have one or more of: a pressure in a range of 100 kPa RMS to 750 kPa RMS; a peak negative rarefaction pressure of less than 1.5 MPa; and a Mechanical Index (MI) of less than 1.9.

Example 3 can include or use, or can optionally be combined with the subject matter of any of Examples 1 or 2 (or any of the other numbered Examples) such as can comprise at least one acoustic lens. The at least one acoustic lens can be located between at least a portion of the therapeutic ultrasound transducer array and the external skin surface of the patient. The at least one acoustic lens and the at least the portion of the therapeutic ultrasound transducer array can be arranged to provide torsional focusing of the therapeutic ultrasound energy to sonicate the at least one volumetric region.

Example 4 can include or use, or can optionally be combined with the subject matter of any of Examples 1 through 3 (or any of the other numbered Examples) such as with the controller circuitry being configured to deliver the one or more control signals to corresponding ones of the individual therapeutic ultrasound transducer elements such that the transducer array can direct the composite therapeutic ultrasound energy in the composite signal such as to provide the bursts of "n" pulses at a pulse repetition frequency that can be in a range of 1 Hz to 100 Hz.

Example 5 can include or use, or can optionally be combined with the subject matter of any of Examples 1 through 4 (or any of the other numbered Examples), such as wherein the controller circuitry can be configured to deliver the one or more control signals to corresponding ones of the individual therapeutic ultrasound transducer elements at different corresponding individual selected frequencies, such as in a range of 250 kHz to 2 MHz, such that the transducer array can direct the composite therapeutic ultrasound energy in the composite signal in an unstructured focusing to be non-convergent at a single focus, such as to sonicate in at least one volumetric region. For example, the at least one volumetric region can start at a depth in a range of 0.5 cm to 3 cm below an external skin surface of the patient. The at least one volumetric region can have a volume in a range of 5 $cm^3$ to 130 $cm^3$.

Example 6 can include or use, or can optionally be combined with the subject matter of any of Examples 1 through 5 (or any of the other numbered Examples), such that the controller circuitry can be configured to deliver individual control signals to corresponding ones of the individual therapeutic ultrasound transducer elements. For example, the individual control signals can have at least one of: (1) a frequency that is individually variable for a corresponding transducer element; or (2) a phase that is individually variable for a corresponding transducer element.

Example 7 can include or use, or can optionally be combined with the subject matter of any of Examples 1 through 6 (or any of the other numbered Examples), such that the individual therapeutic ultrasound transducer elements in the therapeutic ultrasound transducer array can be arranged to include overlapping directivities providing interference between individual therapeutic ultrasound output signals from respective corresponding individual therapeutic ultrasound transducer elements, such as for producing a uniformly distributed pressure field, e.g., within 3 decibels (dB), such as throughout the at least one volumetric region.

Example 8 can include or use, or can optionally be combined with the subject matter of any of Examples 1 through 7 (or any of the other numbered Examples), such that the controller circuitry can be configured to deliver the one or more control signals to corresponding ones of the individual therapeutic ultrasound transducer elements such that the transducer array can direct the composite therapeutic ultrasound energy in the composite signal and sonicate using bijective torsional unstructured focusing and phasing to sonicate in at least one volumetric region. For example, the at least one volumetric region can start at a depth in a range of 0.5 cm to 3 cm below an external skin surface of the patient. The at least one volumetric region can have a volume in a range of 5 cm$^3$ to 130 cm$^3$.

Example 9 can include or use, or can optionally be combined with the subject matter of any of Examples 1 through 8 (or any of the other numbered Examples), such as with at least one ultrasound transducer element being configured to detect at least one of: a shift or displacement in the ultrasound transducer array from a previous position; or voltage or power data from individual ones of the ultrasound transducer elements in the transducer array by computing at least one of phase or time delay corresponding to the individual ones of the ultrasound transducer elements. The system can be configured to adjust positioning or directivity or aiming of the transducer array based thereupon.

Example 10 can include or use, or can optionally be combined with the subject matter of any of Examples 1 through 8 (or any of the other numbered Examples), such as comprising at least one ultrasound transducer element that can be configured to detect at least one of bone or an air pocket. The system can be configured to adjust positioning or directivity or aiming of the transducer array based thereupon.

Example 11 can include or use, or can optionally be combined with the subject matter of any of Examples 1 through 9 (or any of the other numbered Examples), such as can include or use an end-user operable magnetic connection, such as between the base and the therapeutic ultrasound transducer array, such as for guiding end-user alignment and rotation therebetween such as to target sonication via the composite therapeutic ultrasound energy toward the spleen.

Example 12 can include or use, or can optionally be combined with the subject matter of any of Examples 1 through 11 (or any of the other numbered Examples), such as can include or use a patient-wearable or patient-affixable ambulatory device comprising the base. A secondary therapy device can be removably engageable to the ambulatory device. The secondary therapy device can include the therapeutic ultrasound transducer array.

Example 13 can include or use, or can optionally be combined with the subject matter of any of Examples 1 through 12 (or any of the other numbered Examples), such as wherein the secondary therapy device includes a pillow (e.g., a wedge pillow) that can be configured to engage with the ambulatory device when the patient is lying prone or on a side.

Example 14 can include or use, or can optionally be combined with the subject matter of any of Examples 1 through 13 (or any of the other numbered Examples), such as wherein the individual therapeutic ultrasound transducer elements can be arranged along a first plane. A plurality of corresponding targets can be arranged along a second plane, parallel to the first plane. The plurality of corresponding targets can be configured to be rotated about a longitudinal axis such as to adjust a focal pattern produced by the individual transducer elements.

Example 15 can include or use, or can optionally be combined with the subject matter of any of Examples 1 through 14 (or any of the other numbered Examples), such as can include an array lens. The array lens can comprise a plurality of radially nested array lens elements, such as which can be respectively configured to direct ultrasound energy to a plurality of focal points, such as to provide an unstructured focusing scheme, such as to target at least one volumetric region. For example, the at least one volumetric region can start at a depth in a range of 0.5 cm to 3 cm below an external skin surface of the patient.

Example 16 can include or use, or can optionally be combined with the subject matter of any of Examples 1 through 15 (or any of the other numbered Examples), such as with the controller circuitry being configured such as to deliver the one or more control signals to corresponding ones of the individual therapeutic ultrasound transducer elements such that the transducer array can direct the composite therapeutic ultrasound energy in the composite signal. The directed composite therapeutic ultrasound energy can be configured, e.g., using the control signals, such as to sonicate at least one volumetric region with at least one of a non-uniform or an asymmetrical sinusoidal pressure waveform.

Example 17 can include or use, or can optionally be combined with the subject matter of any of Examples 1 through 16 (or any of the other numbered Examples), such as can include or use a method of using patient-external ultrasound therapy system for providing therapeutic ultrasound toward a spleen of a human patient to activate a Cholinergic Anti-Inflammatory Pathway (CAP) while maintaining a desired internal body temperature of the spleen and of nearby organs and bones. For example, the system can comprise: a base, such as which can be sized and shaped and configured to be located on the patient such as with a center of the base aligned within an intercostal space between adjacent underlying ribs of the patient; a therapeutic ultrasound transducer array can be arranged to be positioned using the base to direct composite therapeutic ultrasound energy from the transducer array toward the spleen via the intercostal space between adjacent underlying ribs of the patient; and controller circuitry can be coupled to individual therapeutic ultrasound transducer elements within the transducer array, such as with the controller circuitry configured such as to deliver one or more control signals to the individual therapeutic ultrasound transducer elements such as to produce corresponding individual therapeutic ultrasound output signals that, in combination, can provide a composite signal that can direct the composite therapeutic ultrasound energy. The method can include, using the system: providing individual therapeutic ultrasound output signals from corresponding individual ones of the therapeutic ultrasound transducer elements such as at corresponding individual selected frequencies in a range of 250 kHz to 2 MHz; delivering the composite signal in pulses during a treatment therapy session, a duty cycle of a pulse of the composite signal being greater than or equal to 5% and less than or equal to 20% to reduce heating at a bone, wherein the duty cycle also can also comprise an "on" period in a range of 1 millisecond to 50 milliseconds, and an "off" period in a range of 4 milliseconds to 200 milliseconds; and providing the treatment therapy session such as having a duration in a range of 5 minutes to 20 minutes, inclusive, such as during which treatment therapy can be delivered via the composite signal, such as with the treatment therapy comprising recurring bursts of "n" pulses, wherein each pulse in the burst comprises the "on" period in the range of 1 millisecond to 50 milliseconds on and the "off" period in the range of 4 milliseconds to 200 milliseconds, wherein n is an integer in a range of 2 to 900 pulses, and wherein sequential bursts are separated by a delay time m, during which ultrasound energy is not applied, that is in a range of 15 seconds to 60 seconds.

Example 18 can include or use, or can optionally be combined with the subject matter of any of Examples 1 through 17 (or any of the other numbered Examples), such as can include or use a method of using patient-external ultrasound therapy system for sonicating at least one volumetric region. For example, the at least one volumetric region can start at a depth in a range of 0.5 cm to 3 cm below an external skin surface of the patient. The at least one volumetric region can have a volume in a range of 5 cm$^3$ to 130 cm$^3$. The at least one volumetric region can have one or more or all of a pressure in a range of 100 kPa RMS to 750 kPa RMS; a peak negative rarefaction pressure of less than 1.5 MPa; and a Mechanical Index (MI) of less than 1.9.

Example 19 can include or use, or can optionally be combined with the subject matter of any of Examples 1 through 18 (or any of the other numbered Examples), such as can include or use a method of using patient-external ultrasound therapy system such as for torsionally focusing the therapeutic ultrasound energy to sonicate the at least one volumetric region.

Example 20 can include or use, or can optionally be combined with the subject matter of any of Examples 1 through 19 (or any of the other numbered Examples), such as can include or use a method of using patient-external ultrasound therapy system such as for providing the bursts of "n" pulses at a pulse repetition frequency that can be in a range of 1 Hz to 100 Hz.

Example 21 can include or use, or can optionally be combined with the subject matter of any of Examples 1 through 20 (or any of the other numbered Examples), such as can include or use a method of using patient-external ultrasound therapy system such as for directing the composite therapeutic ultrasound energy in the composite signal in an unstructured focusing such as to be non-convergent at a single focus such as to sonicate in at least one volumetric region. For example, the at least one volumetric region can start at a depth in a range of 0.5 cm to 3 cm below an external skin surface of the patient. The at least one volumetric region can have a volume in a range of 5 cm$^3$ to 130 cm$^3$.

Example 22 can include or use, or can optionally be combined with the subject matter of any of Examples 1 through 21 (or any of the other numbered Examples), such as can include or use a method of using patient-external ultrasound therapy system such as for providing at least one of: (1) a frequency that can be individually variable for a corresponding transducer element; or (2) a phase that can be individually variable for a corresponding transducer element.

Example 23 can include or use, or can optionally be combined with the subject matter of any of Examples 1 through 22 (or any of the other numbered Examples), such as can include or use a method of using patient-external ultrasound therapy system such as for providing overlapping directivities of individual therapeutic ultrasound elements such as for providing interference between individual therapeutic ultrasound output signals from respective corresponding individual therapeutic ultrasound transducer elements such as to sonicate in at least one volumetric region such as for producing uniformly distributed peak pressure such as within 3 decibels (dB) throughout the at least one volumetric region.

Example 24 can include or use, or can optionally be combined with the subject matter of any of Examples 1 through 23 (or any of the other numbered Examples), such as can include or use a method of using patient-external ultrasound therapy system such as for directing the composite therapeutic ultrasound energy in the composite signal and sonicating, such as using bijective torsional unstructured focusing and phasing, at least one volumetric region. For example, the at least one volumetric region can start at a depth in a range of 0.5 cm to 3 cm below an external skin surface of the patient. The at least one volumetric region can have a volume in a range of 5 cm$^3$ to 130 cm$^3$.

Example 25 can include or use, or can optionally be combined with the subject matter of any of Examples 1 through 24 (or any of the other numbered Examples), such as can include or use a method of using patient-external ultrasound therapy system such as with at least one ultrasound transducer element being configured to detect at least one of: a shift or displacement in the ultrasound transducer array from a previous position; or voltage or power data from individual ones of the ultrasound transducer elements in the transducer array such as by computing at least one of phase or time delay corresponding to the individual ones of the ultrasound transducer elements. The method can include using the system being configured to adjust positioning or directivity or aiming of the transducer array based thereupon.

Example 26 can include or use, or can optionally be combined with the subject matter of any of Examples 1 through 25 (or any of the other numbered Examples), such as can include or use a method of using patient-external ultrasound therapy system such as can include using an end-user operable magnetic connection such as between the base and the therapeutic ultrasound transducer array, such as for guiding end-user alignment and rotation therebetween such as to target sonication via the composite therapeutic ultrasound energy toward the spleen.

Example 27 can include or use, or can optionally be combined with the subject matter of any of Examples 1 through 26 (or any of the other numbered Examples), such as can include or use a method of using patient-external ultrasound therapy system such as can employ a patient-wearable or patient-affixable ambulatory device comprising the base. The method can include removably engaging a secondary therapy device to a patient-wearable or patient-affixable ambulatory device comprising the base. The secondary therapy device can include the therapeutic ultrasound transducer array.

Example 28 can include or use, or can optionally be combined with the subject matter of any of Examples 1 through 27 (or any of the other numbered Examples), such as can include or use a method of using patient-external ultrasound therapy system such as wherein the secondary therapy device can include or use a pillow. The method can include engaging the pillow with the ambulatory device such as when the patient is lying prone or on a side.

Example 29 can include or use, or can optionally be combined with the subject matter of any of Examples 1 through 28 (or any of the other numbered Examples), such as can include or use a method of using patient-external ultrasound therapy system such as wherein the individual therapeutic ultrasound transducer elements can be arranged along a first plane, and comprising a plurality of corresponding targets that can be arranged along a second plane, parallel to the first plane, the method can comprise rotating the plurality of corresponding targets about a longitudinal axis such as to adjust a focal pattern such as can be produced by the individual transducer elements.

Example 30 can include or use, or can optionally be combined with the subject matter of any of Examples 1 through 29 (or any of the other numbered Examples), such as can include or use a method of using patient-external ultrasound therapy system such as for delivering one or more control signals to corresponding ones of the individual therapeutic ultrasound transducer elements such that the transducer array directs the composite therapeutic ultrasound energy in the composite signal to sonicate at least one volumetric region with at least one of a non-uniform or an asymmetrical sinusoidal pressure waveform.

Changes and modifications in the embodiments described herein can be carried out without departing from the principles of the present disclosure. Each of the disclosed aspects and examples of the present disclosure may be considered individually or in combination with other aspects, examples, and variations of the disclosure.

While the methods, devices and systems described herein may be susceptible to various modifications and alternative forms, specific examples thereof have been shown in the drawings and are herein described in detail. Embodiments are not to be limited to the particular forms or methods disclosed, but rather intended is to cover modifications, equivalents, and alternatives falling within the spirit and scope of the various examples and embodiments described herein and/or in the claims. Further, the disclosure herein of any particular feature, aspect, method, property, characteristic, quality, attribute, element, or the like in connection with an example can be used in all other examples and embodiments set forth herein. In addition, unless otherwise specified, none of the steps of the methods of the present disclosure are confined to any particular order of performance. Any methods disclosed herein need not be performed in the order recited. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some examples may be performed using the sequence of operations described herein, while other examples may be performed following a different sequence of operations.

Conditional language used herein, such as, among others, "can," "might," "may," "e.g.," and the like, unless specifically stated otherwise, or otherwise understood within the context as used, is generally intended to convey that some examples include, while other examples do not include, certain features, elements, and/or states. Thus, such conditional language is not generally intended to imply that features, elements, blocks, and/or states are in any way required for one or more examples or that one or more examples necessarily include logic for deciding, with or without author input or prompting, whether these features, elements and/or states are included or are to be performed in any particular example. Where devices or methods "comprise" certain features or steps, such devices or methods may also "consist essentially of" such features or steps if identified as such in the claims. Where devices or methods "comprise" certain features or steps, such devices or methods may also "consist" of such features or steps if identified as such in the claims.

The methods disclosed herein may include certain actions taken by a practitioner; however, the methods can also include any user or third-party instruction of those actions, either expressly or by implication. For example, actions such as "positioning a device" include "instructing positioning of a device."

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonable under the circumstances, for example ±5%, ±10%, ±15%, etc.). For example, "about 2 inches" includes "2 inches." Phrases preceded by a term such as "substantially" include the recited phrase and should be interpreted based on the circumstances (e.g., as much as reasonably possible under the circumstances). For example, "substantially linear" includes "linear." Unless stated otherwise, all measurements are at standard conditions including temperature and pressure. The phrase "at least one of" is intended to require at least one item from the subsequent listing, not one type of each item from each item in the subsequent listing. For example, "at least one of X, Y, and Z" can include X; Y; Z; X and Y; X and Z; Y and Z; or X, Y, and Z.

What is claimed is:

1. A patient-external ultrasound therapy system for providing therapeutic ultrasound toward a spleen of a human patient to activate a Cholinergic Anti-Inflammatory Pathway (CAP) while maintaining a desired internal body temperature of the spleen and of nearby organs and bones, the system comprising:

a base, sized and shaped and configured to be located on the patient with a center of the base aligned within an intercostal space between adjacent underlying ribs of the patient;

a therapeutic ultrasound transducer array, arranged to be positioned using the base to direct composite therapeutic ultrasound energy from the transducer array toward the spleen via the intercostal space between adjacent underlying ribs of the patient; and controller circuitry, coupled to individual therapeutic ultrasound transducer elements within the transducer array, the controller circuitry configured to deliver one or more control signals to the individual therapeutic ultrasound transducer elements to produce corresponding individual therapeutic ultrasound output signals that, in combination, provide a composite signal that directs the composite therapeutic ultrasound energy including:

individual therapeutic ultrasound output signals from corresponding individual ones of the therapeutic ultrasound transducer elements at corresponding individual selected frequencies in a range of 250 kHz to 2 MHz;

the composite signal being delivered in pulses during a treatment therapy session, a duty cycle of a pulse of the composite signal being greater than or equal to 5% and less than or equal to 20% to reduce heating at a bone, wherein the duty cycle also comprises an "on" period in a range of 1 millisecond to 50 milliseconds, and an "off" period in a range of 4 milliseconds to 200 milliseconds; and the treatment therapy session having a duration in a range of 5 minutes to 20 minutes, inclusive, during which treatment therapy is delivered via the composite signal, the treatment therapy comprising:
recurring bursts of "n" pulses, wherein each pulse in the burst comprises the "on" period in the range of 1 millisecond to 50 milliseconds on and the "off" period in the range of 4 milliseconds to 200 milliseconds, wherein n is an integer in a range of 2 to 900 pulses, and wherein sequential bursts are separated by a delay time m, during which ultrasound energy is not applied, that is in a range of 15 seconds to 60 seconds.

2. The system of claim 1, wherein the controller circuitry is configured to deliver the one or more control signals to the individual therapeutic ultrasound transducer elements such that the transducer array directs the composite therapeutic ultrasound energy in the composite signal and configured to sonicate at least one volumetric region starting at a depth in a range of 0.5 cm to 3 cm below an external skin surface of the patient, the at least one volumetric region having a volume in a range of 5 cm$^3$ to 130 cm$^3$ with lateral width and depth in range of 2 cm to 6 cm with the at least one volumetric region having:
a pressure in a range of 100 kPa RMS to 750 kPa RMS;
a peak negative rarefaction pressure of less than 1.5 MPa; and
a Mechanical Index (MI) of less than 1.9.

3. The system of claim 2, further comprising at least one acoustic lens, located between at least a portion of the therapeutic ultrasound transducer array and the external skin surface of the patient, the at least one acoustic lens and the at least the portion of the therapeutic ultrasound transducer array arranged to provide torsional focusing of the therapeutic ultrasound energy to sonicate the at least one volumetric region.

4. The system of claim 1, wherein the controller circuitry is configured to deliver the one or more control signals to corresponding ones of the individual therapeutic ultrasound transducer elements such that the transducer array directs the composite therapeutic ultrasound energy in the composite signal to provide the bursts of "n" pulses at a pulse repetition frequency that is in a range of 1 Hz to 100 Hz.

5. The system of claim 1, wherein the controller circuitry is configured to deliver the one or more control signals to corresponding ones of the individual therapeutic ultrasound transducer elements at different corresponding individual selected frequencies in a range of 250 kHz to 2 MHz such that the transducer array directs the composite therapeutic ultrasound energy in the composite signal in an unstructured focusing to be non-convergent at a single focus to sonicate in at least one volumetric region starting at a depth in a range of 0.5 cm to 3 cm below an external skin surface of the patient, the at least one volumetric region having a volume in a range of 5 cm$^3$ to 130 cm$^3$.

6. The system of claim 5, wherein the controller circuitry is configured to deliver individual control signals to corresponding ones of the individual therapeutic ultrasound transducer elements, the individual control signals having at least one of: (1) a frequency that is individually variable for a corresponding transducer element; or (2) a phase that is individually variable for a corresponding transducer element.

7. The system of claim 5, wherein the individual therapeutic ultrasound transducer elements in the therapeutic ultrasound transducer array are arranged to include overlapping directivities providing interference between individual therapeutic ultrasound output signals from respective corresponding individual therapeutic ultrasound transducer elements for producing a uniformly distributed pressure field within 3 decibels (dB) throughout the at least one volumetric region.

8. The system of claim 1, wherein the controller circuitry is configured to deliver the one or more control signals to corresponding ones of the individual therapeutic ultrasound transducer elements such that the transducer array directs the composite therapeutic ultrasound energy in the composite signal and sonicates using bijective torsional unstructured focusing and phasing to sonicate in at least one volumetric region starting at a depth in a range of 0.5 cm to 3 cm below an external skin surface of the patient, the at least one volumetric region having a volume in a range of 5 cm$^3$ to 130 cm$^3$.

9. The system of claim 1, comprising:
at least one ultrasound transducer element being configured to detect at least one of:
a shift or displacement in the ultrasound transducer array from a previous position; or
voltage or power data from individual ones of the ultrasound transducer elements in the transducer array by computing at least one of phase or time delay corresponding to the individual ones of the ultrasound transducer elements; and
wherein the system is configured to adjust positioning or directivity or aiming of the transducer array based thereupon.

10. The system of claim 1, comprising at least one ultrasound transducer element being configured to detect at least one of bone or an air pocket, and wherein the system is configured to adjust positioning or directivity or aiming of the transducer array based thereupon.

11. The system of claim 1, comprising an end-user operable magnetic connection, between the base and the therapeutic ultrasound transducer array, guiding end-user alignment and rotation therebetween to target sonication via the composite therapeutic ultrasound energy toward the spleen.

12. The system of claim 1, comprising:
a patient-wearable or patient-affixable ambulatory device comprising the base; and
a secondary therapy device, removably engageable to the ambulatory device, the secondary therapy device including the therapeutic ultrasound transducer array.

13. The system of claim 12, wherein the secondary therapy device includes a pillow configured to engage with the ambulatory device when the patient is lying prone or on a side.

14. The system of claim 1, wherein the individual therapeutic ultrasound transducer elements are arranged along a first plane, and comprising a plurality of corresponding targets arranged along a second plane, parallel to the first plane, wherein the plurality of corresponding targets are configured to be rotated about a longitudinal axis to adjust a focal pattern produced by the individual transducer elements.

15. The system of claim 14, comprising an array lens, the array lens comprising a plurality of radially nested array lens elements, respectively configured to direct ultrasound energy to a plurality of focal points to provide an unstructured focusing scheme to target at least one volumetric region starting at a depth in a range of 0.5 cm to 3 cm below an external skin surface of the patient.

16. The system of claim 1, wherein the controller circuitry is configured to deliver the one or more control signals to corresponding ones of the individual therapeutic ultrasound transducer elements such that the transducer array directs the composite therapeutic ultrasound energy in the composite signal and configured to sonicate at least one volumetric region with at least one of a non-uniform or an asymmetrical sinusoidal pressure waveform.

17. A method of using patient-external ultrasound therapy system for providing therapeutic ultrasound toward a spleen of a human patient to activate a Cholinergic Anti-Inflammatory Pathway (CAP) while maintaining a desired internal body temperature of the spleen and of nearby organs and bones, the system comprising: a base, sized and shaped and configured to be located on the patient with a center of the base aligned within an intercostal space between adjacent underlying ribs of the patient; a therapeutic ultrasound transducer array, arranged to be positioned using the base to direct composite therapeutic ultrasound energy from the transducer array toward the spleen via the intercostal space between adjacent underlying ribs of the patient; and controller circuitry, coupled to individual therapeutic ultrasound transducer elements within the transducer array, the controller circuitry configured to deliver one or more control signals to the individual therapeutic ultrasound transducer elements to produce corresponding individual therapeutic ultrasound output signals that, in combination, provide a composite signal that directs the composite therapeutic ultrasound energy, the method including, using the system:

providing individual therapeutic ultrasound output signals from corresponding individual ones of the therapeutic ultrasound transducer elements at corresponding individual selected frequencies in a range of 250 kHz to 2 MHz;

delivering the composite signal in pulses during a treatment therapy session, a duty cycle of a pulse of the composite signal being greater than or equal to 5% and less than or equal to 20% to reduce heating at a bone, wherein the duty cycle also comprises an "on" period in a range of 1 millisecond to 50 milliseconds, and an "off" period in a range of 4 milliseconds to 200 milliseconds; and providing the treatment therapy session having a duration in a range of 5 minutes to 20 minutes, inclusive, during which treatment therapy is delivered via the composite signal, the treatment therapy comprising:

recurring bursts of "n" pulses, wherein each pulse in the burst comprises the "on" period in the range of 1 millisecond to 50 milliseconds on and the "off" period in the range of 4 milliseconds to 200 milliseconds, wherein n is an integer in a range of 2 to 900 pulses, and wherein sequential bursts are separated by a delay time m, during which ultrasound energy is not applied, that is in a range of 15 seconds to 60 seconds.

18. The method of claim 17, comprising, using the system, sonicating at least one volumetric region starting at a depth in a range of 0.5 cm to 3 cm below an external skin surface of the patient, the at least one volumetric region having a volume in a range of 5 cm$^3$ to 130 cm$^3$ with the at least one volumetric region having:

a pressure in a range of 100 kPa RMS to 750 kPa RMS;
a peak negative rarefaction pressure of less than 1.5 MPa; and
a Mechanical Index (MI) of less than 1.9.

19. The method of claim 18, further comprising, using the system, torsionally focusing the therapeutic ultrasound energy to sonicate the at least one volumetric region.

20. The method of claim 17, comprising, using the system, providing the bursts of "n" pulses at a pulse repetition frequency that is in a range of 1 Hz to 100 Hz.

21. The method of claim 17, comprising, using the system, directing the composite therapeutic ultrasound energy in the composite signal in an unstructured focusing to be non-convergent at a single focus to sonicate in at least one volumetric region starting at a depth in a range of 0.5 cm to 3 cm below an external skin surface of the patient, the at least one volumetric region having a volume in a range of 5 cm$^3$ to 130 cm$^3$.

22. The method of claim 17, comprising, using the system, providing at least one of: (1) a frequency that is individually variable for a corresponding transducer element; or (2) a phase that is individually variable for a corresponding transducer element.

23. The method of claim 17, comprising, using the system, providing overlapping directivities of individual therapeutic ultrasound elements for providing interference between individual therapeutic ultrasound output signals from respective corresponding individual therapeutic ultrasound transducer elements to sonicate in at least one volumetric region for producing uniformly distributed peak pressure within 3 decibels (dB) throughout the at least one volumetric region.

24. The method of claim 17, comprising, using the system, directing the composite therapeutic ultrasound energy in the composite signal and sonicating, using bijective torsional unstructured focusing and phasing, at least one volumetric region starting at a depth in a range of 0.5 cm to 3 cm below an external skin surface of the patient, the at least one volumetric region having a volume in a range of 5 cm$^3$ to 130 cm$^3$.

25. The method of claim 17, comprising:
at least one ultrasound transducer element being configured to detect at least one of:
a shift or displacement in the ultrasound transducer array from a previous position; or
voltage or power data from individual ones of the ultrasound transducer elements in the transducer array by computing at least one of phase or time delay corresponding to the individual ones of the ultrasound transducer elements; and
wherein the system is configured to adjust positioning or directivity or aiming of the transducer array based thereupon.

26. The method of claim 17, comprising, using an end-user operable magnetic connection between the base and the therapeutic ultrasound transducer array, guiding end-user alignment and rotation therebetween to target sonication via the composite therapeutic ultrasound energy toward the spleen.

27. The method of claim 17, comprising:
a patient-wearable or patient-affixable ambulatory device comprising the base; and
removably engaging a secondary therapy device to a patient-wearable or patient-affixable ambulatory device comprising the base, the secondary therapy device including the therapeutic ultrasound transducer array.

28. The method of claim 27, wherein the secondary therapy device includes a pillow, the method including engaging the pillow with the ambulatory device when the patient is lying prone or on a side.

29. The method of claim 17, wherein the individual therapeutic ultrasound transducer elements are arranged along a first plane, and comprising a plurality of corresponding targets arranged along a second plane, parallel to the first plane, the method comprising rotating the plurality of corresponding targets about a longitudinal axis to adjust a focal pattern produced by the individual transducer elements.

30. The method of claim 17, comprising, using the system, delivering one or more control signals to corresponding ones of the individual therapeutic ultrasound transducer elements such that the transducer array directs the composite therapeutic ultrasound energy in the composite signal to sonicate at least one volumetric region with at least one of a non-uniform or an asymmetrical sinusoidal pressure waveform.

\* \* \* \* \*